United States Patent
McBride et al.

(10) Patent No.: US 8,667,792 B2
(45) Date of Patent: Mar. 11, 2014

(54) DEAD-VOLUME MANAGEMENT IN COMPRESSED-GAS ENERGY STORAGE AND RECOVERY SYSTEMS

(71) Applicants: Troy O. McBride, Norwich, VT (US); Benjamin R. Bollinger, Topsfield, MA (US); Joel Berg, Bolton, MA (US)

(72) Inventors: Troy O. McBride, Norwich, VT (US); Benjamin R. Bollinger, Topsfield, MA (US); Joel Berg, Bolton, MA (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/754,243

(22) Filed: Jan. 30, 2013

(65) Prior Publication Data
US 2013/0139500 A1 Jun. 6, 2013

Related U.S. Application Data

(63) Continuation of application No. 13/650,999, filed on Oct. 12, 2012.

(60) Provisional application No. 61/547,353, filed on Oct. 14, 2011, provisional application No. 61/569,528, filed on Dec. 12, 2011, provisional application No. 61/620,018, filed on Apr. 4, 2012.

(51) Int. Cl.
| | |
|---|---|
| F01K 21/04 | (2006.01) |
| F02G 1/04 | (2006.01) |
| F16D 31/02 | (2006.01) |
| F01K 1/00 | (2006.01) |
| F01K 3/00 | (2006.01) |

(52) U.S. Cl.
USPC .................. 60/511; 60/508; 60/408; 60/415; 60/659

(58) Field of Classification Search
USPC .......... 60/369–383, 508–512, 650, 659, 682, 60/641.12–641.14; 91/392–410; 92/358 R–389
See application file for complete search history.

(56) References Cited

U.S. PATENT DOCUMENTS

| | | | |
|---|---|---|---|
| 114,297 | A | 5/1871 | Ivens et al. |
| 224,081 | A | 2/1880 | Eckart |
| 233,432 | A | 10/1880 | Pitchford |
| 1,353,216 | A | 9/1920 | Carlson |
| 1,635,524 | A | 7/1927 | Aikman |
| 2,141,703 | A | 12/1938 | Bays |
| 2,280,100 | A | 4/1942 | SinQleton |
| 2,280,845 | A | 4/1942 | Parker |
| 2,404,660 | A | 7/1946 | Rouleau |

(Continued)

FOREIGN PATENT DOCUMENTS

| | | |
|---|---|---|
| BE | 898225 | 3/1984 |
| BE | 1008885 | 8/1996 |

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Christopher Jetton
(74) *Attorney, Agent, or Firm* — Bingham McCutchen LLP

(57) ABSTRACT

In various embodiments, coupling losses between a cylinder assembly and other components of a gas compression and/or expansion system are reduced or eliminated via valve-timing control.

18 Claims, 16 Drawing Sheets

(56) References Cited

U.S. PATENT DOCUMENTS

| | | | |
|---|---|---|---|
| 2,420,098 A | 5/1947 | Rouleau | |
| 2,486,081 A | 10/1949 | Weenen | |
| 2,539,862 A | 1/1951 | Rushinq | |
| 2,628,564 A | 2/1953 | Jacobs | |
| 2,632,995 A | 3/1953 | Noe | |
| 2,712,728 A | 7/1955 | Lewis et al. | |
| 2,813,398 A | 11/1957 | Wilcox | |
| 2,829,501 A | 4/1958 | Walls | |
| 2,880,759 A | 4/1959 | Wisman | |
| 3,041,842 A | 7/1962 | Heinecke | |
| 3,100,965 A | 8/1963 | Blackburn | |
| 3,236,512 A | 2/1966 | Caslav et al. | |
| 3,269,121 A | 8/1966 | Ludwig | |
| 3,538,340 A | 11/1970 | LanQ | |
| 3,608,311 A | 9/1971 | Roesel, Jr. | |
| 3,648,458 A | 3/1972 | McAlister | |
| 3,650,636 A | 3/1972 | Eskeli | |
| 3,672,160 A | 6/1972 | Kim | |
| 3,677,008 A | 7/1972 | Koutz | |
| 3,704,079 A | 11/1972 | Berlyn | |
| 3,757,517 A | 9/1973 | RiQollot | |
| 3,793,848 A | 2/1974 | Eskeli | |
| 3,801,793 A | 4/1974 | Goebel | |
| 3,803,847 A | 4/1974 | McAlister | |
| 3,839,863 A | 10/1974 | Frazier | |
| 3,847,182 A | 11/1974 | Greer | |
| 3,895,493 A | 7/1975 | Riqollot | |
| 3,903,696 A | 9/1975 | Carman | |
| 3,935,469 A | 1/1976 | Haydock | |
| 3,939,356 A | 2/1976 | Loane | |
| 3,942,323 A | 3/1976 | Maillet | |
| 3,945,207 A | 3/1976 | Hyatt | |
| 3,948,049 A | 4/1976 | Ohms et al. | |
| 3,952,516 A | 4/1976 | Lapp | |
| 3,952,723 A | 4/1976 | Browning | |
| 3,958,899 A | 5/1976 | Coleman, Jr. et al. | |
| 3,986,354 A | 10/1976 | Erb | |
| 3,988,592 A | 10/1976 | Porter | |
| 3,988,897 A | 11/1976 | Strub | |
| 3,990,246 A | 11/1976 | Wilmers | |
| 3,991,574 A | 11/1976 | Frazier | |
| 3,996,741 A | 12/1976 | HerberQ | |
| 3,998,049 A | 12/1976 | McKinley et al. | |
| 3,999,388 A | 12/1976 | Nystrom | |
| 4,008,006 A | 2/1977 | Bea | |
| 4,027,993 A * | 6/1977 | Wolff | 415/1 |
| 4,030,303 A | 6/1977 | Kraus et al. | |
| 4,031,702 A | 6/1977 | Burnett et al. | |
| 4,031,704 A | 6/1977 | Moore et al. | |
| 4,041,708 A * | 8/1977 | Wolff | 60/649 |
| 4,050,246 A | 9/1977 | Bourquardez | |
| 4,055,950 A | 11/1977 | Grossman | |
| 4,058,979 A | 11/1977 | Germain | |
| 4,075,844 A | 2/1978 | Schiferli | |
| 4,089,744 A | 5/1978 | Cahn | |
| 4,094,356 A | 6/1978 | Ash et al. | |
| 4,095,118 A | 6/1978 | Ratbun | |
| 4,100,745 A | 7/1978 | Gyarmathy et al. | |
| 4,104,955 A | 8/1978 | Murphy | |
| 4,108,077 A | 8/1978 | Laing | |
| 4,109,465 A | 8/1978 | Plen | |
| 4,110,987 A | 9/1978 | Cahn et al. | |
| 4,112,311 A | 9/1978 | Theyse | |
| 4,117,342 A | 9/1978 | Melley, Jr. | |
| 4,117,696 A | 10/1978 | Fawcett et al. | |
| 4,118,637 A | 10/1978 | Tackett | |
| 4,124,182 A | 11/1978 | Loeb | |
| 4,126,000 A | 11/1978 | Funk | |
| 4,136,432 A | 1/1979 | Melley, Jr. | |
| 4,142,368 A | 3/1979 | Mantegani | |
| 4,147,204 A | 4/1979 | Pfenninger | |
| 4,149,092 A | 4/1979 | Cros | |
| 4,150,547 A | 4/1979 | Hobson | |
| 4,154,292 A | 5/1979 | Herrick | |
| 4,167,372 A | 9/1979 | Tackett | |
| 4,170,878 A | 10/1979 | Jahniq | |
| 4,173,431 A | 11/1979 | Smith | |
| 4,189,925 A | 2/1980 | Long | |
| 4,194,889 A | 3/1980 | Wanner | |
| 4,195,481 A | 4/1980 | Gregory | |
| 4,197,700 A | 4/1980 | Jahniq | |
| 4,197,715 A | 4/1980 | Fawcett et al. | |
| 4,201,514 A | 5/1980 | Huetter | |
| 4,204,126 A | 5/1980 | Diggs | |
| 4,206,608 A | 6/1980 | Bell | |
| 4,209,982 A | 7/1980 | Pitts | |
| 4,220,006 A | 9/1980 | Kindt | |
| 4,229,143 A | 10/1980 | Pucher | |
| 4,229,661 A | 10/1980 | Mead et al. | |
| 4,232,253 A | 11/1980 | Mortelmans | |
| 4,237,692 A | 12/1980 | Ahrens et al. | |
| 4,242,878 A | 1/1981 | Brinkerhoff | |
| 4,246,978 A | 1/1981 | Schulz et al. | |
| 4,262,735 A | 4/1981 | Courrege | |
| 4,273,514 A | 6/1981 | Shore et al. | |
| 4,274,010 A | 6/1981 | Lawson-tancred | |
| 4,275,310 A | 6/1981 | Summers et al. | |
| 4,281,256 A * | 7/1981 | Ahrens et al. | 290/1 R |
| 4,293,323 A | 10/1981 | Cohen | |
| 4,299,198 A | 11/1981 | Woodhull | |
| 4,302,684 A | 11/1981 | Gogins | |
| 4,304,103 A | 12/1981 | Hamrick | |
| 4,311,011 A | 1/1982 | Lewis | |
| 4,316,096 A | 2/1982 | Syverson | |
| 4,317,439 A | 3/1982 | Emmerling | |
| 4,335,867 A | 6/1982 | Bihlmaier | |
| 4,340,822 A | 7/1982 | Gregg | |
| 4,341,072 A | 7/1982 | Clyne | |
| 4,348,863 A | 9/1982 | Taylor et al. | |
| 4,353,214 A | 10/1982 | Gardner | |
| 4,354,420 A | 10/1982 | Bianchetta | |
| 4,355,956 A | 10/1982 | Ringrose et al. | |
| 4,358,250 A | 11/1982 | Payne | |
| 4,367,786 A | 1/1983 | Hafner et al. | |
| 4,368,692 A | 1/1983 | Kita | |
| 4,368,775 A | 1/1983 | Ward | |
| 4,370,559 A | 1/1983 | Langley, Jr. | |
| 4,372,114 A | 2/1983 | Burnham | |
| 4,375,387 A | 3/1983 | deFilippi et al. | |
| 4,380,419 A | 4/1983 | Morton | |
| 4,392,062 A | 7/1983 | Bervig | |
| 4,393,752 A | 7/1983 | Meier | |
| 4,411,136 A | 10/1983 | Funk | |
| 4,416,114 A | 11/1983 | Martini | |
| 4,421,661 A | 12/1983 | Claar et al. | |
| 4,428,711 A | 1/1984 | Archer | |
| 4,435,131 A | 3/1984 | Ruben | |
| 4,444,011 A | 4/1984 | Kolin | |
| 4,446,698 A | 5/1984 | Benson | |
| 4,447,738 A | 5/1984 | Allison | |
| 4,449,372 A | 5/1984 | Rilett | |
| 4,452,046 A | 6/1984 | Valentin | |
| 4,452,047 A | 6/1984 | Hunt et al. | |
| 4,454,429 A | 6/1984 | Buonome | |
| 4,454,720 A | 6/1984 | Leibowitz | |
| 4,455,834 A | 6/1984 | Earle | |
| 4,462,213 A | 7/1984 | Lewis | |
| 4,474,002 A | 10/1984 | Perry | |
| 4,476,851 A | 10/1984 | Brugger et al. | |
| 4,478,553 A | 10/1984 | Leibowitz et al. | |
| 4,489,554 A | 12/1984 | Otters | |
| 4,489,848 A | 12/1984 | Braude | |
| 4,491,739 A | 1/1985 | Watson | |
| 4,492,539 A | 1/1985 | Specht | |
| 4,493,189 A | 1/1985 | Slater | |
| 4,496,847 A | 1/1985 | Parkins | |
| 4,502,284 A | 3/1985 | Chrisoqhilos | |
| 4,503,673 A | 3/1985 | Schachle | |
| 4,515,516 A | 5/1985 | Perrine et al. | |
| 4,520,840 A | 6/1985 | Michel | |
| 4,525,631 A | 6/1985 | Allison | |
| 4,530,208 A | 7/1985 | Sato | |
| 4,547,209 A | 10/1985 | Netzer | |
| 4,574,592 A | 3/1986 | Eskeli | |

(56) References Cited

U.S. PATENT DOCUMENTS

| | | |
|---|---|---|
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |
| 4,760,697 A | 8/1988 | Heggie |
| 4,761,118 A | 8/1988 | Zanarini |
| 4,765,142 A | 8/1988 | Nakhamkin |
| 4,765,143 A | 8/1988 | Crawford et al. |
| 4,767,938 A | 8/1988 | Bervig |
| 4,792,700 A | 12/1988 | Ammons |
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Laing et al. |
| 4,873,831 A | 10/1989 | Dehne |
| 4,876,992 A | 10/1989 | Sobotowski |
| 4,877,530 A | 10/1989 | Moses |
| 4,885,912 A | 12/1989 | Nakhamkin |
| 4,886,534 A | 12/1989 | Castan |
| 4,907,495 A | 3/1990 | Sugahara |
| 4,936,109 A | 6/1990 | Longardner |
| 4,942,736 A | 7/1990 | Bronicki |
| 4,947,977 A | 8/1990 | Raymond |
| 4,955,195 A | 9/1990 | Jones et al. |
| 4,984,432 A | 1/1991 | Corey |
| 5,016,441 A * | 5/1991 | Pinto ............................. 60/516 |
| 5,056,601 A | 10/1991 | Grimmer |
| 5,058,385 A | 10/1991 | Everett, Jr. |
| 5,062,498 A | 11/1991 | Tobias |
| 5,107,681 A | 4/1992 | Wolfbauer, III |
| 5,133,190 A | 7/1992 | Abdelmalek |
| 5,138,838 A | 8/1992 | Crosser |
| 5,140,170 A | 8/1992 | Henderson |
| 5,152,260 A | 10/1992 | Erickson et al. |
| 5,161,449 A | 11/1992 | Everett, Jr. |
| 5,169,295 A | 12/1992 | Stogner et al. |
| 5,182,086 A | 1/1993 | Henderson et al. |
| 5,203,168 A | 4/1993 | Oshina |
| 5,209,063 A | 5/1993 | Shirai et al. |
| 5,213,470 A | 5/1993 | Lundquist |
| 5,239,833 A | 8/1993 | Fineblum |
| 5,259,345 A | 11/1993 | Richeson |
| 5,271,225 A | 12/1993 | Adamides |
| 5,279,206 A | 1/1994 | Krantz |
| 5,296,799 A | 3/1994 | Davis |
| 5,309,713 A | 5/1994 | Vassallo |
| 5,321,946 A | 6/1994 | Abdelmalek |
| 5,327,987 A | 7/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,365,980 A | 11/1994 | Deberardinis |
| 5,375,417 A | 12/1994 | Barth |
| 5,379,589 A | 1/1995 | Cohn et al. |
| 5,384,489 A | 1/1995 | Bellac |
| 5,387,089 A | 2/1995 | Stogner et al. |
| 5,394,693 A | 3/1995 | Plyter |
| 5,427,194 A | 6/1995 | Miller |
| 5,436,508 A | 7/1995 | Sorensen |
| 5,448,889 A | 9/1995 | Bronicki |
| 5,454,408 A | 10/1995 | Dibella et al. |
| 5,454,426 A * | 10/1995 | Moseley ....................... 165/136 |
| 5,467,722 A | 11/1995 | Meratla |
| 5,473,899 A * | 12/1995 | Viteri et al. ..................... 60/684 |
| 5,477,677 A | 12/1995 | Krnavek |
| 5,491,969 A | 2/1996 | Cohn et al. |
| 5,491,977 A | 2/1996 | Cho |
| 5,524,821 A | 6/1996 | Vie et al. |
| 5,537,822 A | 7/1996 | Shnaid et al. |
| 5,544,698 A | 8/1996 | Paulman |
| 5,557,934 A | 9/1996 | Beach |
| 5,561,978 A | 10/1996 | Buschur |
| 5,562,010 A | 10/1996 | McGuire |
| 5,579,640 A | 12/1996 | Gray, Jr. et al. |
| 5,584,664 A | 12/1996 | Elliott et al. |
| 5,592,028 A | 1/1997 | Pritchard |
| 5,595,587 A | 1/1997 | Steed |
| 5,598,736 A | 2/1997 | Erskine |
| 5,599,172 A | 2/1997 | McCabe |
| 5,600,953 A | 2/1997 | Oshita et al. |
| 5,616,007 A | 4/1997 | Cohen |
| 5,634,340 A | 6/1997 | Grennan |
| 5,641,273 A | 6/1997 | Moseley |
| 5,674,053 A | 10/1997 | Paul et al. |
| 5,685,154 A | 11/1997 | Bronicki et al. |
| 5,685,155 A | 11/1997 | Brown |
| 5,768,893 A | 6/1998 | Hoshino et al. |
| 5,769,610 A | 6/1998 | Paul et al. |
| 5,771,693 A | 6/1998 | Coney |
| 5,775,107 A | 7/1998 | Sparkman |
| 5,778,675 A | 7/1998 | Nakhamkin |
| 5,794,442 A | 8/1998 | Lisniansky |
| 5,797,980 A | 8/1998 | Fillet |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,845,479 A | 12/1998 | Nakhamkin |
| 5,863,186 A | 1/1999 | Green et al. |
| 5,873,250 A | 2/1999 | Lewis |
| 5,901,809 A | 5/1999 | Berkun |
| 5,924,283 A | 7/1999 | Burke, Jr. |
| 5,934,063 A | 8/1999 | Nakhamkin |
| 5,934,076 A | 8/1999 | Coney |
| 5,937,652 A | 8/1999 | Abdelmalek |
| 5,971,027 A | 10/1999 | Beachley et al. |
| 6,012,279 A | 1/2000 | Hines |
| 6,023,105 A | 2/2000 | Youssef |
| 6,026,349 A | 2/2000 | Heneman |
| 6,029,445 A | 2/2000 | Lech |
| 6,073,445 A | 6/2000 | Johnson |
| 6,073,448 A | 6/2000 | Lozada |
| 6,085,520 A | 7/2000 | Kohno |
| 6,090,186 A | 7/2000 | Spencer |
| 6,119,802 A | 9/2000 | Puett, Jr. |
| 6,132,181 A | 10/2000 | Mccabe |
| 6,145,311 A | 11/2000 | Cyphelly |
| 6,148,602 A | 11/2000 | Demetri |
| 6,153,943 A | 11/2000 | Mistr, Jr. |
| 6,158,499 A | 12/2000 | Rhodes |
| 6,170,443 B1 | 1/2001 | Hofbauer |
| 6,178,735 B1 | 1/2001 | Frutschi |
| 6,179,446 B1 | 1/2001 | Sarmadi |
| 6,188,182 B1 | 2/2001 | Nickols et al. |
| 6,202,707 B1 | 3/2001 | Woodall et al. |
| 6,206,660 B1 * | 3/2001 | Coney et al. .................. 417/438 |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |

(56) References Cited

U.S. PATENT DOCUMENTS

| | | | |
|---|---|---|---|
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,453,659 B1 | 9/2002 | Van Liere et al. |
| 6,478,289 B1 | 11/2002 | Trewin |
| 6,484,498 B1 | 11/2002 | Bonar, II |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,554,088 B2 | 4/2003 | Severinsky et al. |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Kelller-Sornig |
| 6,857,450 B2 | 2/2005 | Rupp et al. |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,887 B2 | 10/2006 | Nakamura et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Lin |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,482 B2 | 5/2009 | Ursan et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 | 4/2010 | Smith et al. |
| 7,802,426 B2 | 9/2010 | Bollinger |
| 7,827,787 B2 | 11/2010 | Cherney et al. |
| 7,832,207 B2 | 11/2010 | McBride et al. |

(56) References Cited

U.S. PATENT DOCUMENTS

| | | |
|---|---|---|
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | McBride et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,361 B2 * | 6/2012 | Fong et al. ................ 60/415 |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | McBride et al. |
| 8,448,433 B2 | 5/2013 | McBride et al. |
| 8,468,815 B2 | 6/2013 | McBride et al. |
| 8,474,255 B2 | 7/2013 | McBride et al. |
| 8,479,502 B2 | 7/2013 | McBride et al. |
| 8,479,505 B2 | 7/2013 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0218924 A1 | 10/2006 | Mitani |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall |
| 2009/0010772 A1 | 1/2009 | Siemroth |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |

(56) References Cited

U.S. PATENT DOCUMENTS

| | | |
|---|---|---|
| 2010/0205960 A1 | 8/2010 | Mcbride et al. |
| 2010/0229544 A1 | 9/2010 | Bollinger et al. |
| 2010/0257862 A1 | 10/2010 | Howes et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1* | 12/2010 | Fong et al. ............ 60/650 |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | McBride et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2011/0314810 A1 | 12/2011 | McBride et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055147 A1 | 3/2012 | Fong et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | McBride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0091834 A1 | 4/2013 | McBride et al. |
| 2013/0091835 A1 | 4/2013 | McBride et al. |
| 2013/0091836 A1 | 4/2013 | McBride et al. |
| 2013/0098027 A1 | 4/2013 | Le Roux et al. |
| 2013/0104533 A1 | 5/2013 | Fong et al. |
| 2013/0108480 A1 | 5/2013 | Fong et al. |
| 2013/0111895 A1 | 5/2013 | Fong et al. |
| 2013/0126014 A1 | 5/2013 | Fong et al. |
| 2013/0139500 A1 | 6/2013 | McBride et al. |
| 2013/0145764 A1 | 6/2013 | McBride et al. |
| 2013/0152568 A1 | 6/2013 | Modderno et al. |
| 2013/0152571 A1 | 6/2013 | Modderno et al. |
| 2013/0152572 A1 | 6/2013 | Modderno et al. |
| 2013/0160437 A1 | 6/2013 | McBride et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |

(56) References Cited

FOREIGN PATENT DOCUMENTS

| | | |
|---|---|---|
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009045468 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |

(56) References Cited

FOREIGN PATENT DOCUMENTS

| WO | WO-2011/008500 | 1/2011 |
|----|----------------|--------|
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

\* cited by examiner

DEAD-VOLUME MANAGEMENT IN COMPRESSED-GAS ENERGY STORAGE AND RECOVERY SYSTEMS

RELATED APPLICATIONS

This application is a continuation of U.S. patent application Ser. No. 13/650,999, filed Oct. 12, 2012, which claims the benefit of and priority to U.S. Provisional Patent Application No. 61/547,353, filed Oct. 14, 2011, U.S. Provisional Patent Application No. 61/569,528, filed Dec. 12, 2011, and U.S. Provisional Patent Application No. 61/620,018, filed Apr. 4, 2012. The entire disclosure of each of these applications is hereby incorporated herein by reference.

STATEMENT REGARDING FEDERALLY SPONSORED RESEARCH

This invention was made with government support under DE-OE0000231 awarded by the DOE. The government has certain rights in the invention.

FIELD OF THE INVENTION

In various embodiments, the present invention relates to pneumatics, hydraulics, power generation, and energy storage, and more particularly, to systems and methods using pneumatic, pneumatic/hydraulic, and/or hydraulic cylinders for energy storage and recovery.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207, filed Apr. 9, 2009 (the '207 patent) and U.S. Pat. No. 7,874,155, filed Feb. 25, 2010 (the '155 patent), the disclosures of which are hereby incorporated herein by reference in their entireties. The '207 and '155 patents disclose systems and techniques for expanding gas isothermally in staged cylinders and intensifiers over a large pressure range in order to generate electrical energy when required. Mechanical energy from the expanding gas may be used to drive a hydraulic pump/motor subsystem that produces electricity. Systems and techniques for hydraulic-pneumatic pressure intensification that may be employed in systems and methods such as those disclosed in the '207 and '155 patents are shown and described in U.S. Pat. No. 8,037,678, filed Sep. 10, 2010 (the '678 patent), the disclosure of which is hereby incorporated herein by reference in its entirety.

In the systems disclosed in the '207 and '155 patents, reciprocal mechanical motion is produced during recovery of energy from storage by expansion of gas in the cylinders. This reciprocal motion may be converted to electricity by a variety of techniques, for example as disclosed in the '678 patent as well as in U.S. Pat. No. 8,117,842, filed Feb. 14, 2011 (the '842 patent), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

In order to reduce overall pressure ranges of operation, various CAES systems may utilize designs involving multiple interconnected cylinders. In such designs, trapped regions of "dead volume" may occur such that pockets of gas remain in cylinders before and after valve transitions. Such volumes may occur within the cylinders themselves and/or within conduits, valves, or other components within and interconnecting the cylinders. Bringing relatively high-pressure gas into communication (e.g., by the opening of a valve) with relatively low-pressure gas within a dead volume tends to lead to a diminishment of pressure of the higher-pressure gas without the performance of useful work, thereby disadvantageously reducing the amount of work recoverable from or stored within the higher-pressure gas. Air dead volume tends to reduce the amount of work available from a quantity of high-pressure gas brought into communication with the dead volume. This loss of potential energy may be termed a "coupling loss." For example, during a compression stage a volume of gas that was compressed to a relatively high pressure may remain inside the compression cylinder, or conduits attached thereto, after the movable member of the cylinder (e.g., piston, hydraulic fluid, or bladder) reaches the end of its stroke. The volume of compressed air that is not pushed onto the next stage at the end of stroke constitutes "dead volume" (also termed, in compressors, "clearance volume"). If the volume of high-pressure gas within the cylinder is then brought into fluid communication (e.g., by the opening of a valve) with a section of intake piping, a portion of the high-pressure gas will tend to enter the piping and mix with the contents thereof, equalizing the pressure within the two volumes. This equalization of pressure entails a loss of exergy (i.e., energy available as work). In a preferred scenario, the gas in the dead volume is allowed to expand in a manner that performs useful work (e.g., by pushing on a piston), equalizing in pressure with the gas in the piping prior to valve opening. In another scenario, the gas in the dead volume is allowed to expand below the pressure of the gas within the intake piping, and pressure equalization takes place during valve transition (opening).

In another example of formation of dead space in a CAES system during an expansion procedure, if gas is to be introduced into a cylinder through a valve for the purpose of performing work by pushing against a piston within the cylinder, and a chamber or volume exists adjacent to the piston that is filled with low-pressure gas at the time the valve is opened, the high-pressure gas entering the chamber is immediately reduced in pressure during free expansion and mixing with the low-pressure gas and, therefore, performs less mechanical work upon the piston than would have been possible without the pressure reduction. The low-pressure volume in such an example constitutes air dead volume. Dead volume may also appear within the portion of a valve mechanism that communicates with the cylinder interior, or within a tube or line connecting a valve to the cylinder interior, or within other components that contain gas in various states of operation of the system. It will be clear to persons familiar with hydraulics and pneumatics that dead volume may also appear during compression procedures, and that energy losses due to pneumatically communicating dead volumes tend to be additive.

Moreover, in an expander-compressor system operated to expand or compress gas near-isothermally (i.e., at approximately constant temperature) within a cylinder, gas that escapes the cylinder to become dead volume (e.g., by displacing an incompressible fluid) in a hydraulic subsystem may, as pressures change within the system, expand and compress adiabatically (i.e., at non-constant temperature), with associated energy losses due to heat transfer between the gas and materials surrounding the dead volume. These thermal energy losses will tend to be additive with losses that are due to non-work-performing expansion of gas to lower pressures in dead volumes.

Therefore, in various compressor-expander systems, including isothermal compressor-expander systems, preventing the formation of dead volume will generally enable higher system efficiency. Attempts to minimize dead volume frequently involve reducing the sizes and lengths of conduits interconnecting cylinders and other components. However, such efforts may not eliminate all dead volume and tend to constrain the overall geometry and placement of individual system components. Therefore, there is a need for alternative or additional approaches to reducing dead volume and/or the deleterious effects of dead volume in pneumatic components in order to reduce coupling losses and improve efficiency during compression and/or expansion of gas.

SUMMARY

Embodiments of the invention reduce the impact of dead volume in pneumatic cylinders and/or pneumatic chambers of pneumatic/hydraulic cylinders during compression and/or expansion in CAES systems. The impact of dead volume is reduced by time-coordinated matching of gas pressures within system components that would, absent such matching, suffer coupling losses and potential equipment damage. Herein, a space within any component of a CAES system is termed a "dead volume" or "dead space" if its volume cannot, in some or all states of operation, be reduced to zero due to mechanical constraints (e.g., imperfect fit of a piston to the interior face of a cylinder head when the piston is at top dead center, forming an ineradicable, residual chamber volume) and if in some states of system operation the space contains gas at a pressure that can be brought into fluid communication with gas at a significantly different pressure (e.g., through a valve transition).

In cylinders, the time-coordinated matching of pressures may be accomplished using actuated valves that are selectively closed and opened in a manner that yields approximately matched pressures within system components about to be brought into fluid communication with each other. To reduce loss of exergy due to non-work-performing expansion of gas when components containing gas at relatively high pressure (e.g., 3,000 psi) are brought into fluid communication with components containing gas at relatively low pressure (e.g., 300 psi or atmospheric pressure), the gas in one or more potential dead spaces is pre-compressed to a pressure approximately equal to that of the higher-pressure gas before the higher- and lower-pressure gas volumes are brought into fluid communication with each other. In other embodiments, the gas in one or more potential dead spaces is pre-expanded to a pressure approximately equal to that of the lower-pressure gas before the higher- and lower-pressure volumes are brought into fluid communication with each other. Such pre-compression and pre-expansion produce specific target pressures (e.g., 3,000 psi) at specific times or in specific states of system operation (e.g., when a cylinder piston reaches top-dead-center position and is poised to begin an expansion stroke). Both target pressure and timing of pressure matching may be altered adaptively during the course of system operation based on measurements of pressures within various parts of the CAES system and/or other aspects of system state. An actuated valve may be operated (i.e., opened or closed) at specific times in order to reduce the effect of dead space, e.g., a valve may be opened only when a pre-compression condition is met. The timing of actuated valve operation may, furthermore, be conditioned on feedback in order to provide increased system energy efficiency and/or other advantages. Herein, an "actuated" valve is a valve whose opening or closing occurs at a time that may be altered, either arbitrarily or within limits, by a system operator or control mechanism, as distinct from a passive "check"-type valve whose opening and closing are determined by differential pressures or a "cam-driven" valve whose times of opening or closing are dictated mechanically. Actuated valves may improve performance by opening at times different than would be entailed by operation of check valves by differential pressures. Variable-timing cam-driven valves may be considered actuated valves and are within the scope of this invention.

In certain embodiments of the invention, the CAES system may include or consist essentially of a cylinder assembly (or plurality of cylinder assemblies, e.g., multiple stages) that features a movable internal member (e.g., piston) or other boundary mechanism such as hydraulic fluid or a bladder. The internal boundary mechanism of the cylinder divides the interior of the cylinder into two chambers that may contain distinct bodies of fluid, and these may be at different pressures in various states of operation of the system. The system may further include a first control valve in communication with a high-pressure storage reservoir and the cylinder assembly, a second control valve in communication with the cylinder assembly and a vent to atmosphere, a heat-transfer subsystem in fluid communication with the cylinder assembly, an electric motor/generator in mechanical communication with a drive mechanism (e.g., crankshaft, hydraulic pump, linear generator mover) configured to drive the movable member disposed within the cylinder assembly, and a control system configured to operate the first and second control valves based on various information characterizing various aspects of the cylinder assembly and/or other components of the system (e.g., pressure, temperature, piston position, piston velocity).

One aspect of the invention relates to a method for reducing coupling losses and improving system performance during an expansion stage of a CAES system. In various embodiments, gas within a first chamber of a cylinder is pressurized to approximately some relatively high pressure (e.g., 3,000 psi) at or near the beginning of an expansion stroke of the cylinder. In this state of operation, the piston of the cylinder is at or near its top dead center position and the first chamber constitutes dead volume. A first control valve is then operated to place a volume of high-pressure gas (e.g., air at 3,000 psi) from an external source (e.g., a pressurized gas storage reservoir) in fluid communication with the first chamber. Because the gas within the first chamber is at approximately the same pressure as the high-pressure source placed in communication with the first chamber by the opening of the first control valve, gas from the high-pressure source does not tend to expand into the first chamber suddenly and without performing useful work. Coupling losses during the connection of the source to the cylinder are thus reduced or eliminated. In short, system performance may be improved by forestalling events of rapid pressure equalization of connecting spaces.

During a subsequent cylinder expansion stroke (also herein termed a "downward stroke"), useful work is recovered from high-pressure gas during both (1) admission of high-pressure gas to the first cylinder chamber while the boundary mechanism moves downward so as to allow the first cylinder chamber to enlarge, a phase of operation herein termed a "direct-drive phase" or "direct drive," and (2) a subsequent expansion phase (i.e., after the first control valve is closed) during which the boundary mechanism continues to move downward and a fixed mass of high-pressure gas expands in the enlarging first chamber). As shown and described in the '207 and '155 patents and the '128 application, gas expansion may be maintained as substantially isothermal by introducing a certain volume of liquid (e.g., a quantity of foam or spray) at an appropriate temperature into the cylinder prior to and/or during the expansion.

At or near the end of the expansion stroke, when the gas reaches a lower pressure (e.g., 300 psi), a second control valve is operated to begin to exhaust the gas (e.g., to a vent and/or to a mid-pressure vessel and second cylinder assembly) as an upward stroke of the movable member within the piston occurs. During the first portion of the second half of the cylinder stroke (e.g., the upward stroke), the gas is exhausted through the second control valve (e.g., into a mid-pressure vessel and second cylinder assembly) by translating the movable member (e.g., piston) or other boundary mechanism to reduce the volume of the first chamber in the cylinder assembly. During a second portion of the second half of the cylinder stroke (e.g., the upward stroke), prior to the movable member reaching the end of stroke (e.g., top of stroke) inside the cylinder, the second control valve is closed and a "pre-compression stroke" is performed to compress the remaining volume of air (dead volume) and/or liquid inside the cylinder.

The time of closure of the second control valve, relative to the sequence of states of operation just described, is not arbitrary. Premature closure of the second valve will typically tend to trap an excessive quantity of gas in the first chamber, resulting in overpressurization of the gas in the first chamber when the volume of the first chamber attains a minimum (i.e., at top dead center of stroke). When this occurs, opening of the first valve at the start of the next expansion cycle will result in energy loss through non-work-performing expansion of the gas within the first chamber into the high-pressure storage reservoir and other components (e.g., piping) in fluid communication therewith.

On the other hand, tardy closure of the second valve will tend to trap an inadequate quantity of gas in the first chamber, resulting in underpressurization of the gas in the first chamber when the volume of the first chamber attains a minimum (i.e., at top dead center of stroke). When this occurs, opening of the first valve at the start of the next expansion cycle will generally result in energy loss through non-work-performing expansion of gas from the high-pressure storage reservoir and other components (e.g., piping) in fluid communication therewith into the first chamber.

Therefore, in certain embodiments of the invention the optimal time of actuation of the second control valve is based at least in part on sensed conditions in one or more portions of the CAES system, e.g., pressure in the first chamber, pressure in the high-pressure storage reservoir, piston position, piston velocity, etc. The principles on which the time of actuation of the second control valve is determined will be made clear hereinbelow.

When liquid is introduced into the first chamber to enable approximately isothermal expansion, a quantity of liquid will generally accumulate in the first chamber (e.g., on top of the piston or other movable member) during an expansion stroke. In an ideal case, i.e., if all of the gas compressed in the first chamber is passed to the storage reservoir or to a higher-pressure cylinder stage by the time the volume of the first chamber is at a minimum, the remaining volume of the first chamber (i.e., the volume between the movable member and the interior face of the upper end-cap of the cylinder) will be occupied entirely by liquid; all gas will have been expelled and there will be no gas-filled dead volume in the first chamber at the commencement of a new expansion stroke. However, in practice, the first chamber volume at the commencement of a new expansion stroke will tend to contain both liquid and gas remaining from the previous expansion stroke. The gas fraction of this volume may constitute dead volume at the start of the new stroke. During the pre-compression stroke, therefore, as already described hereinabove, the effective coupling loss due to this dead volume is minimized by compressing the remaining air to a pressure substantially equal to the pressure of the air in the storage reservoir (or the pressure of the gas to be introduced into the cylinder for expansion, if such gas is not arriving directly from the storage reservoir). Thus, when additional high-pressure gas is admitted to the cylinder for expansion, no or minimal pressure difference exists between the two sides of the first control valve. This allows the first control valve to be operated with a lower actuation energy, further improving system efficiency.

Most or even substantially all of the work done upon the air in the first chamber during a pre-compression stroke is typically recovered as the air re-expands during the subsequent expansion stroke. Furthermore, if the pressure of the air in the dead volume is approximately equal to the pressure of the air in the storage vessel or the next higher-pressure stage, then there will be substantially no coupling loss when the first valve to the storage reservoir or next-higher-pressure stage is opened. The higher pressure within the dead volume entails less gas flow from the storage reservoir or next-higher-pressure stage to the cylinder when the valve is opened during an expansion stage, thereby reducing coupling loss and improving efficiency. Moreover, the longevity of some system components may be increased because transient mechanical stresses caused by high-pressure air rushing suddenly into dead volume are minimized or eliminated.

Employing measurements of pressures within various components (e.g., lines and chambers) allows the timing of actuated-valve closings and openings (i.e., valve transition events) to be optimized for specific system conditions. For example, CAES systems constructed according to similar designs may differ in pipe lengths and other details affecting potential dead space. In such a case, with actuated valves, valve transition events may be tuned to optimize efficiency of an individual system by minimizing dead-space coupling losses. For example, if an overpressure is detected in a pre-pressurized cylinder chamber, closure of the valve that permits gas to exit the chamber during a return stroke may be retarded to reduce the amount of pre-pressurized gas. A CAES system in which valve transition event tuning is performed by a computerized system controller may be considered, in this respect, a self-tuning system. For another example, as the pressure within a gas storage reservoir declines as the gas within the reservoir cools or is exhausted (or increases as the gas within the reservoir warms or is augmented), valve transition event timing may be tuned in a manner that adaptively, continuously maximizes the energy efficiency of the CAES system. Thus, a CAES system in accordance with various embodiments of the invention may adaptively self-tune its valve transition events so as to minimize dead-space coupling losses in response both to idiosyncrasies of system construction and to changing conditions of operation.

Furthermore, to minimize the impacts of dead space, the timing of valve actuations may be chosen in light of the non-ideal features of actual valves. Non-instantaneous valve transitions tend to entail tradeoffs between system capacity (amount of air compressed or expanded per stroke) and system efficiency (partly determined by energy losses due to dead space). The impact of non-ideal valve actuation on CAES system operation is considered for certain embodiments of the invention hereinbelow.

Every compression or expansion of a quantity of gas, where such a compression or expansion is herein termed "a gas process," is generally one of three types: (1) adiabatic, during which the gas exchanges no heat with its environment and, consequently, rises or falls in temperature, (2) isothermal, during which the gas exchanges heat with its environment in such a way as to remain at constant temperature, and (3) polytropic, during which the gas exchanges heat with its environment but its temperature does not remain constant. Perfectly adiabatic gas processes are not practical because some heat is always exchanged between any body of gas and its environment (ideal insulators and reflectors do not exist); perfectly isothermal gas processes are not practical because for heat to flow between a quantity of gas and a portion of its environment (e.g., a body of liquid), a nonzero temperature difference must exist between the gas and its environment—e.g., the gas must be allowed to heat during compression in order that heat may be conducted to the liquid. Hence real-world gas processes are typically polytropic, though they may approximate adiabatic or isothermal processes.

The Ideal Gas Law states that for a given quantity of gas having mass m, pressure p, volume V, and temperature T, $pV=mRT$, where R is the gas constant ($R=287$ J/K·kg for air). For an isothermal process, T is a constant throughout the process, so $pV=C$, where C is some constant.

For a polytropic process, as will be clear to persons familiar with the science of thermodynamics, $pV^n=C$ throughout the process, where n, termed the polytropic index, is some constant generally between 1.0 and 1.6. For $n=1$, $pV^n=pV^1=pV=C$, i.e., the process is isothermal. In general, a process for which n is close to 1 (e.g., 1.05) may be deemed approximately isothermal.

For an adiabatic process, $pV^\gamma=C$, where $\gamma$, termed the adiabatic coefficient, is equal to the ratio of the gas's heat capacity at constant pressure $C_P$ to its heat capacity at constant volume, $C_V$, i.e., $\gamma=C_P/C_V$. In practice, $\gamma$ is dependent on pressure. For air, the adiabatic coefficient $\gamma$ is typically between 1.4 and 1.6.

Herein, we define a "substantially isothermal" gas process as one having $n \leq 1.1$. The gas processes conducted within cylinders described herein are preferably substantially isothermal with $n \leq 1.05$. Herein, wherever a gas process taking place within a cylinder assembly or storage reservoir is described as "isothermal," this word is synonymous with the term "substantially isothermal."

The amount of work done in compression or expansion of a given quantity of gas varies substantially with polytropic index n. For compressions, the lowest amount of work done is for an isothermal process and the highest for an adiabatic process, and vice versa for expansions. Hence, for gas processes such as typically occur in the compressed-gas energy storage systems described herein, the end temperatures attained by adiabatic, isothermal, and substantially isothermal gas processes are sufficiently different to have practical impact on the operability and efficiency of such systems. Similarly, the thermal efficiencies of adiabatic, isothermal, and substantially isothermal gas processes are sufficiently different to have practical impact on the overall efficiency of such energy storage systems. For example, for compression of a quantity of gas from initial temperature of 20° C. and initial pressure of 0 psig (atmospheric) to a final pressure of 180 psig, the final temperature T of the gas will be exactly 20° C. for an isothermal process, approximately 295° C. for an adiabatic process, approximately 95° C. for a polytropic compression having polytropic index $n=1.1$ (10% increase in n over isothermal case of $n=1$), and approximately 60° C. for a polytropic compression having polytropic index $n=1.05$ (5% increase in n over isothermal case of $n=1$). In another example, for compression of 1.6 kg of air from an initial temperature of 20° C. and initial pressure of 0 psig (atmospheric) to a final pressure of approximately 180 psig, including compressing the gas into a storage reservoir at 180 psig, isothermal compression requires approximately 355 kilojoules of work, adiabatic compression requires approximately 520 kilojoules of work, and a polytropic compression having polytropic index $n=1.045$ requires approximately 375 kilojoules of work; that is, the polytropic compression requires approximately 5% more work than the isothermal process, and the adiabatic process requires approximately 46% more work than the isothermal process.

It is possible to estimate the polytropic index n of gas processes occurring in cylinder assemblies such as are described herein by empirically fitting n to the equation $pV^n=C$, where pressure p and volume V of gas during a compression or expansion, e.g., within a cylinder, may both be measured as functions of time from piston position, known device dimensions, and pressure-transducer measurements. Moreover, by the Ideal Gas Law, temperature within the cylinder may be estimated from p and V, as an alternative to direct measurement by a transducer (e.g., thermocouple, resistance thermal detector, thermistor) located within the cylinder and in contact with its fluid contents. In many cases, an indirect measurement of temperature via volume and pressure may be more rapid and more representative of the entire volume than a slower point measurement from a temperature transducer. Thus, temperature measurements and monitoring described herein may be performed directly via one or more transducers, or indirectly as described above, and a "temperature sensor" may be one of such one or more transducers and/or one or more sensors for the indirect measurement of temperature, e.g., volume, pressure, and/or piston-position sensors.

All of the approaches described above for converting potential energy in a compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage are not necessarily described for each embodiment. Such operation is, however, contemplated and within the scope of the invention and may be straightforwardly realized without undue experimentation.

The systems described herein, and/or other embodiments employing foam-based heat exchange, liquid-spray heat exchange, and/or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient atmosphere after expansion, rather than systems that compress and expand a captured volume of gas in a sealed container (i.e., "closed-air" systems). The systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, that may be formed of various suitable materials such as metal or plastic, and that may or may not fall within ASME regulations for pressure vessels), pipes (i.e., rigid containers for compressed gas that may also function as and/or be rated as fluid conduits, have lengths well in excess (e.g., >100×) of their diameters, and do not fall within ASME regulations for pressure vessels), or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a method of increasing efficiency of an energy-recovery process performed in a cylinder assembly in which gas is expanded from an initial pressure to a final pressure. Gas is pre-compressed in the cylinder assembly to approximately the initial pressure, and, following pre-compression, compressed gas is admitted at the initial pressure into the cylinder assembly. The pre-compression reduces coupling loss during the admission of compressed gas. Gas is expanded in the cylinder assembly to the final pressure, and the expansion cycle is completed by exhausting only a portion of the expanded gas out of the cylinder assembly. The foregoing steps may be repeated at least once, thereby performing at least one additional expansion cycle.

Embodiments of the invention may include one or more of the following in any of a variety of combinations. The gas may be thermally conditioned with heat-transfer fluid during expansion. The thermal conditioning may render the expansion substantially isothermal. The heat-transfer fluid may be sprayed into the gas and/or may form a foam with the gas. After expansion of the gas, at least a portion of the heat-transfer fluid may be exhausted out of the cylinder assembly. The compressed gas may be admitted into the cylinder assembly from a storage reservoir containing gas at the initial pressure. The compressed gas may be admitted into the cylinder assembly from a second cylinder assembly in which gas is expanded to the initial pressure from a pressure greater than the initial pressure. The portion of the expanded gas may be exhausted to the ambient atmosphere or to a second cylinder assembly in which gas is expanded from the final pressure to a pressure lower than the final pressure. Admitting compressed gas into the cylinder assembly may include or consist essentially of actuating a valve to establish a connection between the cylinder assembly and a source of the compressed gas. The pre-compression may reduce the actuation energy required to actuate the valve. At least a portion of the gas that is pre-compressed may be within dead volume of the cylinder assembly. Exhausting only a portion of the expanded gas out of the cylinder assembly may include or consist essentially of exhausting substantially all of the expanded gas in the cylinder assembly that is not within dead volume of the cylinder assembly. The amount of the gas that is pre-compressed may be substantially less than an amount of the gas expanded in the cylinder assembly.

A temperature, a pressure, and/or a position of a boundary mechanism within the cylinder assembly may be monitored during gas expansion and/or gas exhaustion, thereby generating control information. The control information may be utilized in a subsequent expansion cycle to control at least one of the pre-compression, expansion, or exhaustion steps. The gas expansion may drive a load connected to the cylinder assembly, e.g., a mechanical crankshaft or a hydraulic pump/motor. The gas expansion may generate electricity. Exhausting only a portion of the expanded gas out of the cylinder assembly may include or consist essentially of (i) monitoring a temperature, a pressure, and/or a position of a boundary mechanism within the cylinder assembly, thereby generating control information, and (ii) based at least in part on the control information, discontinuing the gas exhaustion, thereby trapping a remnant portion of the expanded gas within the cylinder assembly. The remnant portion of the expanded gas may be determined such that a pre-compression step of a subsequent expansion cycle compresses the remnant portion to approximately the initial pressure.

In another aspect, embodiments of the invention feature a method of increasing efficiency of an energy-storage process performed in a cylinder assembly in which gas is compressed from an initial pressure to a final pressure. Gas is pre-expanded in the cylinder assembly to approximately the initial pressure. Following the pre-expansion, gas is admitted at the initial pressure into the cylinder assembly. The pre-expansion reduces coupling loss during the admission of gas. (During pre-expansion, work is being recovered via the expansion of the gas, e.g., via movement of a piston or other boundary mechanism, and valves to the cylinder assembly are closed, in contrast to a case, e.g., where gas expands and is free to exhaust from the cylinder assembly to atmosphere, and no work is recovered therefrom.) The gas is compressed in the cylinder assembly to the final pressure, and a compression cycle is completed by exhausting only a portion of the compressed gas out of the cylinder assembly. The foregoing steps may be repeated at least once, thereby performing at least one additional compression cycle.

Embodiments of the invention may include one or more of the following in any of a variety of combinations. The gas may be thermally conditioned with heat-transfer fluid during compression. The thermal conditioning may render the compression substantially isothermal. The heat-transfer fluid may be sprayed into the gas and/or form a foam with the gas. After compression of the gas, at least a portion of the heat-transfer fluid may be exhausted out of the cylinder assembly. The gas may be admitted into the cylinder assembly from a vent to atmosphere, and the initial pressure may be approximately atmospheric pressure. The gas may be admitted into the cylinder assembly from a second cylinder assembly in which gas is compressed to the initial pressure from a pressure less than the initial pressure. The portion of the compressed gas may be exhausted to a compressed-gas storage reservoir. The portion of the expanded gas may be exhausted to a second cylinder assembly in which gas is compressed from the final pressure to a pressure higher than the final pressure. Admitting gas into the cylinder assembly may include or consist essentially of actuating a valve to establish a connection between the cylinder assembly and a source of the gas. The pre-expansion may reduce the actuation energy required to actuate the valve. At least a portion of the gas that is pre-expanded may be within dead volume of the cylinder assembly. Exhausting only a portion of the compressed gas out of the cylinder assembly may include or consist essentially of exhausting substantially all of the compressed gas in the cylinder assembly that is not within dead volume of the cylinder assembly. The amount of the gas that is pre-expanded may be substantially less than an amount of the gas compressed in the cylinder assembly.

A temperature, a pressure, and/or a position of a boundary mechanism within the cylinder assembly may be monitored during gas compression and/or gas exhaustion, thereby generating control information. The control information may be utilized in a subsequent compression cycle to control at least one of the pre-expansion, compression, or exhaustion steps. The gas compression may be driven by a load connected to the cylinder assembly, e.g., a mechanical crankshaft or a hydraulic pump/motor. Exhausting only a portion of the compressed gas out of the cylinder assembly may include or consist essentially of (i) monitoring a temperature, a pressure, and/or a position of a boundary mechanism within the cylinder assembly, thereby generating control information, and (ii) based at least in part on the control information, discontinuing the gas exhaustion, thereby trapping a remnant portion of the compressed gas within the cylinder assembly. The remnant portion of the compressed gas may be determined such that a pre-expansion step of a subsequent expansion cycle expands the remnant portion to approximately the initial pressure.

In yet another aspect, embodiments of the invention feature an energy storage and recovery system that includes or consists essentially of a cylinder assembly for expanding gas to recover energy and/or compressing gas to store energy, a high-side component selectively fluidly connected to the cylinder assembly, a low-side component selectively fluidly connected to the cylinder assembly, and a control system. The high-side component supplies gas to the cylinder assembly for expansion therein and/or accepts gas from the cylinder assembly after compression therein. The low-side component supplies gas to the cylinder assembly for compression therein and/or accepts gas from the cylinder assembly after expansion therein. The control system operates the cylinder assembly to perform (i) a pre-compression of gas therewithin prior to admission therein of gas for expansion, thereby reducing coupling loss between the cylinder assembly and the high-side component, and/or (ii) a pre-expansion of gas therewithin prior to admission therein of gas for compression, thereby reducing coupling loss between the cylinder assembly and the low-side component.

Embodiments of the invention may include one or more of the following in any of a variety of combinations. A sensor may sense a temperature, a pressure, or a position of a boundary mechanism within the cylinder assembly to generate control information, and the control system may be responsive to the control information. The control system may be configured to operate the cylinder assembly, during (i) pre-compression of gas therewithin and/or (ii) expansion of gas therewithin, based at least in part on control information generated during (i) a previous gas expansion within the cylinder assembly and/or (ii) a previous pre-compression of gas within the cylinder assembly. The control system may be configured to operate the cylinder assembly, during (i) pre-expansion of gas therewithin and/or (ii) compression of gas therewithin, based at least in part on control information generated during (i) a previous gas compression within the cylinder assembly and/or (ii) a previous pre-expansion of gas within the cylinder assembly. The high-side component may include or consist essentially of a compressed-gas storage reservoir. The high-side component may include or consist essentially of a second cylinder assembly for compressing gas and/or expanding gas within a pressure range higher than a pressure range of operation of the cylinder assembly. The system may include a second cylinder assembly for compressing gas and/or expanding gas within a pressure range higher than a pressure range of operation of the cylinder assembly, and the high-side component may include or consist essentially of a mid-pressure vessel for containing gas at a pressure within both of or between pressure ranges of operation of the cylinder assembly and the second cylinder assembly. The low-side component may include or consist essentially of a vent to atmosphere. The low-side component may include or consist essentially of a second cylinder assembly for compressing gas and/or expanding gas within a pressure range lower than a pressure range of operation of the cylinder assembly. The system may include a second cylinder assembly for compressing gas and/or expanding gas within a pressure range lower than a pressure range of operation of the cylinder assembly, and the low-side component may include or consist essentially of a mid-pressure vessel for containing gas at a pressure within both of or between pressure ranges of operation of the cylinder assembly and the second cylinder assembly.

A load may be mechanically coupled to the cylinder assembly. The load may be driven by the cylinder assembly during gas expansion and/or drive the cylinder assembly during gas compression. The load may include or consist essentially of at least one of a mechanical crankshaft or a hydraulic pump/motor. The system may include a heat-transfer subsystem for thermally conditioning gas during compression and/or expansion thereof. The heat-transfer subsystem may include or consist essentially of a mechanism for introducing heat-transfer fluid into the gas, e.g., a spray head and/or a spray rod. The heat-transfer subsystem may include a heat exchanger for thermally conditioning gas from the cylinder assembly and/or heat-transfer fluid. The heat-transfer subsystem may include (i) a mixing chamber for forming foam from gas and heat-transfer fluid and/or (ii) a screen for altering average bubble size and/or bubble-size variance of foam comprising gas and heat-transfer fluid.

In a further aspect, embodiments of the invention feature a method of increasing efficiency of an energy-recovery process performed in a cylinder assembly in which gas is expanded. The cylinder assembly is selectively fluidly connected to a high-side component by a high-side valve and selectively fluidly connected to a low-side component by a low-side valve. A first valve transition is performed by opening the high-side valve to allow compressed gas to enter the cylinder assembly from the high-side component, and the cylinder assembly contains gas at a first pressure prior to the first valve transition. A second valve transition is performed by closing the high-side valve, and the gas within the cylinder assembly expands thereafter. A third valve transition is performed by opening the low-side valve to allow a portion of the expanded gas to enter the low-side component from the cylinder assembly, and (i) a remnant portion of the gas remains in the cylinder assembly after the third valve transition and (ii) the expanded gas is at a second pressure prior to the third valve transition. A fourth valve transition is performed by closing the low-side valve, and the remnant portion of the gas within the cylinder assembly is compressed thereafter to approximately the first pressure. A transition restriction is enforced, where the transition restriction includes or consists essentially of (i) performing the first valve transition only when the first pressure is approximately equal to a pressure of the high-side component and/or (ii) performing the third valve transition only when the second pressure is approximately equal to a pressure of the low-side component.

Embodiments of the invention may include one or more of the following in any of a variety of combinations. The high-side component may include or consist essentially of a compressed-gas storage reservoir. The high-side component may include or consist essentially of a second cylinder assembly for compressing gas and/or expanding gas within a pressure range higher than a pressure range of operation of the cylinder assembly. The high-side component may include or consist essentially of a mid-pressure vessel for containing gas at a pressure within both of or between pressure ranges of operation of the cylinder assembly and a second cylinder assembly for compressing gas and/or expanding gas within a pressure range higher than a pressure range of operation of the cylinder assembly. The low-side component may include or consist essentially of a vent to atmosphere. The low-side component may include or consist essentially of a second cylinder assembly for compressing gas and/or expanding gas within a pressure range lower than a pressure range of operation of the cylinder assembly. The low-side component may include or consist essentially of a mid-pressure vessel for containing gas at a pressure within both of or between pressure ranges of operation of the cylinder assembly and a second cylinder assembly for compressing gas and/or expanding gas within a pressure range lower than a pressure range of operation of the cylinder assembly.

The high-side valve and/or the low-side valve may be actuated valves. Each of the high-side valve and the low-side valve may be a hydraulically actuated valve, a variable cam actuated valve, an electromagnetically actuated valve, a mechanically actuated valve, or a pneumatically actuated valve. The second valve transition may be timed to admit an amount of gas into a volume of the cylinder assembly that is expandable to the second pressure in the cylinder assembly. A temperature within the cylinder assembly, a pressure within the cylinder assembly, a position of a boundary mechanism within the cylinder assembly, the pressure of the high-side component, and/or the pressure of the low-side component may be monitored during an expansion cycle including or consisting essentially of the first, second, third, and fourth valve transitions, thereby generating control information. The control information may be utilized in a subsequent expansion cycle to control timing of the first, second, third, and/or fourth valve transitions of the subsequent expansion cycle. The timing may be controlled to maximize efficiency of the subsequent expansion cycle. Gas may be thermally conditioned with heat-transfer fluid during at least a portion of an expansion cycle including or consisting essentially of the first, second, third, and fourth valve transitions. The thermal conditioning may render the gas expansion substantially isothermal.

In yet a further aspect, embodiments of the invention feature a method of increasing efficiency of an energy-recovery process performed in a cylinder assembly in which gas is expanded. The cylinder assembly is selectively fluidly connected to a high-side component by a high-side valve and selectively fluidly connected to a low-side component by a low-side valve. A plurality of expansion cycles are performed within the cylinder assembly. Each expansion cycle includes or consists essentially of (i) performing a first valve transition by opening the high-side valve to allow compressed gas to enter the cylinder assembly from the high-side component, (ii) performing a second valve transition by closing the high-side valve, the gas within the cylinder assembly expanding thereafter, (iii) performing a third valve transition by opening the low-side valve to allow a portion of the expanded gas to enter the low-side component from the cylinder assembly, a remnant portion of the gas remaining in the cylinder assembly after the third valve transition, and (iv) performing a fourth valve transition by closing the low-side valve, the remnant portion of the gas within the cylinder assembly being compressed thereafter. During each expansion cycle, the timing of the first, second, third, and/or fourth valve transitions is altered to maximize efficiency of the expansion cycle. The timing may be altered based at least in part on control information generated during a previous expansion cycle. The control information may include or consist essentially of a temperature within the cylinder assembly, a pressure within the cylinder assembly, a position of a boundary mechanism within the cylinder assembly, the pressure of the high-side component, and/or the pressure of the low-side component.

In another aspect, embodiments of the invention feature a method of increasing efficiency of an energy-storage process performed in a cylinder assembly in which gas is compressed. The cylinder assembly is selectively fluidly connected to a high-side component by a high-side valve and selectively fluidly connected to a low-side component by a low-side valve. A first valve transition is performed by opening the low-side valve to allow gas to enter the cylinder assembly from the low-side component, and the cylinder assembly contains gas at a first pressure prior to the first valve transition. A second valve transition is performed by closing the low-side valve, and the gas within the cylinder assembly is compressed thereafter. A third valve transition is performed by opening the high-side valve to allow a portion of the compressed gas to enter the high-side component from the cylinder assembly, and (i) a remnant portion of the gas remains in the cylinder assembly after the third valve transition and (ii) the compressed gas is at a second pressure prior to the third valve transition. A fourth valve transition is performed by closing the high-side valve, and the remnant portion of the gas within the cylinder assembly expands thereafter to approximately the first pressure. A transition restriction is enforced, where the transition restriction includes or consists essentially of (i) performing the first valve transition only when the first pressure is approximately equal to a pressure of the low-side component or (ii) performing the third valve transition only when the second pressure is approximately equal to a pressure of the high-side component.

Embodiments of the invention may include one or more of the following in any of a variety of combinations. The high-side component may include or consist essentially of a compressed-gas storage reservoir. The high-side component may include or consist essentially of a second cylinder assembly for compressing gas and/or expanding gas within a pressure range higher than a pressure range of operation of the cylinder assembly. The high-side component may include or consist essentially of a mid-pressure vessel for containing gas at a pressure within both of or between pressure ranges of operation of the cylinder assembly and a second cylinder assembly for compressing gas and/or expanding gas within a pressure range higher than a pressure range of operation of the cylinder assembly. The low-side component may include or consist essentially of a vent to atmosphere. The low-side component may include or consist essentially of a second cylinder assembly for compressing gas and/or expanding gas within a pressure range lower than a pressure range of operation of the cylinder assembly. The low-side component may include or consist essentially of a mid-pressure vessel for containing gas at a pressure within both of or between pressure ranges of operation of the cylinder assembly and a second cylinder assembly for compressing gas and/or expanding gas within a pressure range lower than a pressure range of operation of the cylinder assembly.

The high-side valve and/or the low-side valve may be actuated valves. Each of the high-side valve and the low-side valve may be a hydraulically actuated valve, a variable cam actuated valve, an electromagnetically actuated valve, a mechanically actuated valve, or a pneumatically actuated valve. The second valve transition may be timed to admit an amount of gas into a volume of the cylinder assembly that is compressible to the second pressure in the cylinder assembly. A temperature within the cylinder assembly, a pressure within the cylinder assembly, a position of a boundary mechanism within the cylinder assembly, the pressure of the high-side component, and/or the pressure of the low-side component may be monitored during a compression cycle including or consisting essentially of the first, second, third, and fourth valve transitions, thereby generating control information. The control information may be utilized in a subsequent compression cycle to control timing of the first, second, third, and/or fourth valve transitions of the subsequent compression cycle. The timing may be controlled to maximize efficiency of the subsequent compression cycle. Gas may be thermally conditioned with heat-transfer fluid during at least a portion of a compression cycle including or consisting essentially of the first, second, third, and fourth valve transitions. The thermal conditioning may render the gas compression substantially isothermal.

In yet another aspect, embodiments of the invention feature a method of increasing efficiency of an energy-storage process performed in a cylinder assembly in which gas is compressed. The cylinder assembly is selectively fluidly connected to a high-side component by a high-side valve and selectively fluidly connected to a low-side component by a low-side valve. A plurality of compression cycles are performed within the cylinder assembly. Each compression cycle includes or consists essentially of (i) performing a first valve transition by opening the low-side valve to allow gas to enter the cylinder assembly from the low-side component, (ii) performing a second valve transition by closing the low-side valve, the gas within the cylinder assembly being compressed thereafter, (iii) performing a third valve transition by opening the high-side valve to allow a portion of the compressed gas to enter the high-side component from the cylinder assembly, a remnant portion of the gas remaining in the cylinder assembly thereafter, and (iv) performing a fourth valve transition by closing the high-side valve, the remnant portion of the gas within the cylinder assembly expanding thereafter. During each compression cycle, the timing of the first second, third, and/or fourth valve transitions are altered to maximize efficiency of the compression cycle. The timing may be altered based at least in part on control information generated during a previous compression cycle. The control information may include or consist essentially of a temperature within the cylinder assembly, a pressure within the cylinder assembly, a position of a boundary mechanism within the cylinder assembly, the pressure of the high-side component, and/or the pressure of the low-side component.

In an aspect, embodiments of the invention feature an energy storage and recovery system including or consisting essentially of a cylinder assembly for expanding gas to recover energy and/or compressing gas to store energy, a high-side component selectively fluidly connected to the cylinder assembly, a low-side component selectively fluidly connected to the cylinder assembly, and a control system. The high-side component supplies gas to the cylinder assembly for expansion therein and/or accepts gas from the cylinder assembly after compression therein. The low-side component supplies gas to the cylinder assembly for compression therein and/or accepts gas from the cylinder assembly after expansion therein.

The control system may operate the cylinder assembly to (i) perform a first valve transition by opening the low-side valve to allow gas to enter the cylinder assembly from the low-side component, the cylinder assembly containing gas at a first pressure prior to the first valve transition, (ii) perform a second valve transition by closing the low-side valve, the gas within the cylinder assembly being compressed thereafter, (iii) perform a third valve transition by opening the high-side valve to allow a portion of the compressed gas to enter the high-side component from the cylinder assembly, where (a) a remnant portion of the gas remains in the cylinder assembly after the third valve transition and (b) the compressed gas is at a second pressure prior to the third valve transition, (iv) perform a fourth valve transition by closing the high-side valve, the remnant portion of the gas within the cylinder assembly expanding thereafter to approximately the first pressure, and (v) enforce a transition restriction including or consisting essentially of (a) performing the first valve transition only when the first pressure is approximately equal to a pressure of the low-side component and/or (b) performing the third valve transition only when the second pressure is approximately equal to a pressure of the high-side component.

The control system may operate the cylinder assembly to (i) perform a first valve transition by opening the low-side valve to allow gas to enter the cylinder assembly from the low-side component, the cylinder assembly containing gas at a first pressure prior to the first valve transition, (ii) perform a second valve transition by closing the low-side valve, the gas within the cylinder assembly being compressed thereafter, (iii) perform a third valve transition by opening the high-side valve to allow a portion of the compressed gas to enter the high-side component from the cylinder assembly, where (a) a remnant portion of the gas remains in the cylinder assembly after the third valve transition and (b) the compressed gas is at a second pressure prior to the third valve transition, (iv) perform a fourth valve transition by closing the high-side valve, the remnant portion of the gas within the cylinder assembly expanding thereafter to approximately the first pressure, and (v) enforce a transition restriction including or consisting essentially of (i) performing the first valve transition only when the first pressure is approximately equal to a pressure of the low-side component and/or (ii) performing the third valve transition only when the second pressure is approximately equal to a pressure of the high-side component.

In another aspect, embodiments of the invention feature an energy storage and recovery system including or consisting essentially of a cylinder assembly for expanding gas to recover energy and/or compressing gas to store energy, a high-side component selectively fluidly connected to the cylinder assembly, a low-side component selectively fluidly connected to the cylinder assembly, and a control system. The high-side component supplies gas to the cylinder assembly for expansion therein and/or accepts gas from the cylinder assembly after compression therein. The low-side component supplies gas to the cylinder assembly for compression therein and/or accepts gas from the cylinder assembly after expansion therein.

The control system may operate the cylinder assembly to perform, within the cylinder assembly, a plurality of expansion cycles each including or consisting essentially of (i) performing a first valve transition by opening the high-side valve to allow compressed gas to enter the cylinder assembly from the high-side component, (ii) performing a second valve transition by closing the high-side valve, the gas within the cylinder assembly expanding thereafter, (iii) performing a third valve transition by opening the low-side valve to allow a portion of the expanded gas to enter the low-side component from the cylinder assembly, a remnant portion of the gas remaining in the cylinder assembly after the third valve transition, and (iv) performing a fourth valve transition by closing the low-side valve, the remnant portion of the gas within the cylinder assembly being compressed thereafter. The control system may also, during each expansion cycle, alter a timing of the first, second, third, and/or fourth valve transitions to maximize efficiency of the expansion cycle.

The control system may operate the cylinder assembly to perform, within the cylinder assembly, a plurality of compression cycles each including or consisting essentially of (i) performing a first valve transition by opening the low-side valve to allow gas to enter the cylinder assembly from the low-side component, (ii) performing a second valve transition by closing the low-side valve, the gas within the cylinder assembly being compressed thereafter, (iii) performing a third valve transition by opening the high-side valve to allow a portion of the compressed gas to enter the high-side component from the cylinder assembly, a remnant portion of the gas remaining in the cylinder assembly thereafter, and (iv) performing a fourth valve transition by closing the high-side valve, the remnant portion of the gas within the cylinder assembly expanding thereafter. The control system may also, during each compression cycle, alter a timing of the first, second, third, and/or fourth valve transitions to maximize efficiency of the compression cycle.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid, a gas, or a mixture of liquid and gas (e.g., a foam) unless otherwise indicated. As used herein unless otherwise indicated, the terms "approximately" and "substantially" mean ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. At least one of the two ends of a chamber may be closed by end caps, also herein termed "heads." As utilized herein, an "end cap" is not necessarily a component distinct or separable from the remaining portion of the cylinder, but may refer to an end portion of the cylinder itself. Rods, valves, and other devices may pass through the end caps. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '678 and '842 patents. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger). The terms "heat-exchange" and "heat-transfer" are generally utilized interchangeably herein. Unless otherwise indicated, motor/pumps described herein are not required to be configured to function both as a motor and a pump if they are utilized during system operation only as a motor or a pump but not both. Gas expansions described herein may be performed in the absence of combustion (as opposed to the operation of an internal-combustion cylinder, for example).

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
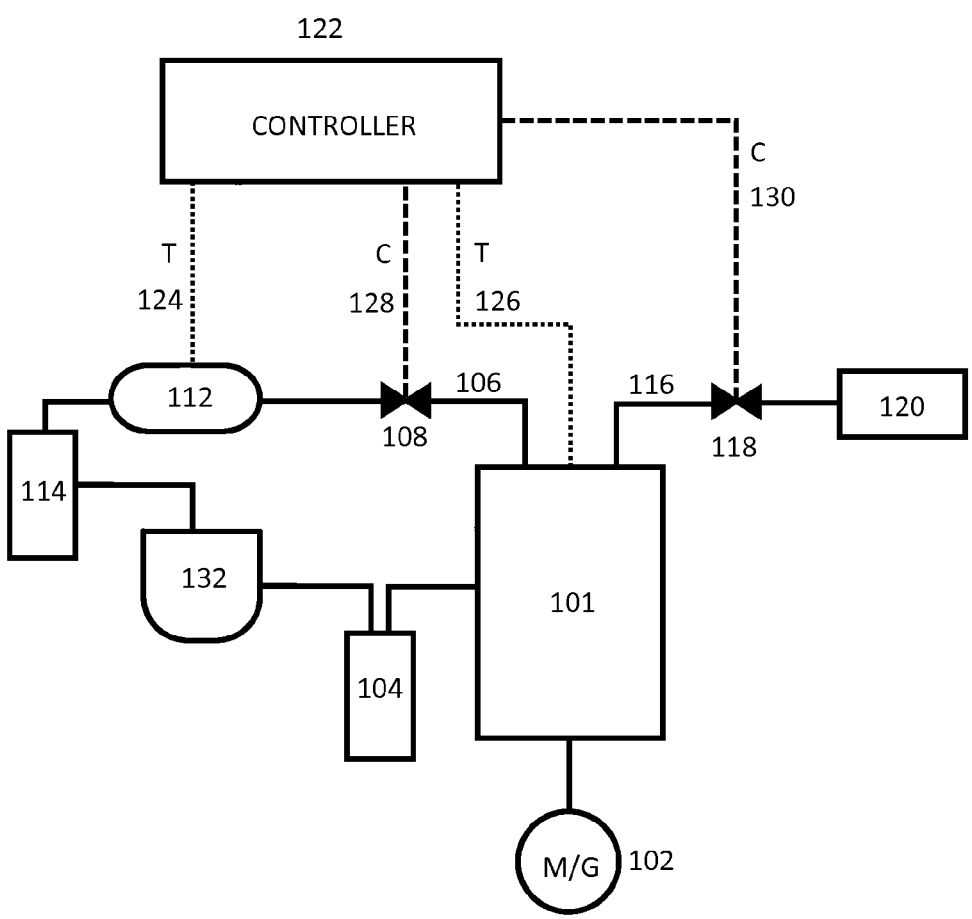
FIG. 1 is a schematic drawing of a compressed-gas energy storage system in accordance with various embodiments of the invention.

FIG. 1 depicts an illustrative system 100 that may be part of a larger system, not otherwise depicted, for the storage and release of energy. Subsequent figures will clarify the application of embodiments of the invention to such a system. The system 100 depicted in FIG. 1 features an assembly 101 for compressing and expanding gas. Expansion/compression assembly 101 may include or consist essentially of either one or more individual devices for expanding or compressing gas (e.g., turbines or cylinder assemblies that each may house a movable boundary mechanism) or a staged series of such devices, as well as ancillary devices (e.g., valves) not depicted explicitly in FIG. 1.

An electric motor/generator 102 (e.g., a rotary or linear electric machine) is in physical communication (e.g., via hydraulic pump, piston shaft, or mechanical crankshaft) with the expansion/compression assembly 101. The motor/generator 102 may be electrically connected to a source and/or sink of electric energy not explicitly depicted in FIG. 1 (e.g., an electrical distribution grid or a source of renewable energy such as one or more wind turbines or solar cells).

The expansion/compression assembly 101 may be in fluid communication with a heat-transfer subsystem 104 that alters the temperature and/or pressure of a fluid (i.e., gas, liquid, or gas-liquid mixture such as a foam) extracted from expansion/compression assembly 101 and, after alteration of the fluid's temperature and/or pressure, returns at least a portion of it to expansion/compression assembly 101. Heat-transfer subsystem 104 may include pumps, valves, and other devices (not depicted explicitly in FIG. 1) ancillary to its heat-transfer function and to the transfer of fluid to and from expansion/compression assembly 101. Operated appropriately, the heat-transfer subsystem 104 enables substantially isothermal compression and/or expansion of gas inside expansion/compression assembly 101.

Connected to the expansion/compression assembly 101 is a pipe 106 with a control valve 108 that controls a flow of fluid (e.g., gas) between assembly 101 and a storage reservoir 112 (e.g., one or more pressure vessels, pipes, and/or caverns). The storage reservoir 112 may be in fluid communication with a heat-transfer subsystem 114 that alters the temperature and/or pressure of fluid removed from storage reservoir 112 and, after alteration of the fluid's temperature and/or pressure, returns it to storage reservoir 112. A second pipe 116 with a control valve 118 may be in fluid communication with the expansion/compression assembly 101 and with a vent 120 that communicates with a body of gas at relatively low pressure (e.g., the ambient atmosphere).

A control system 122 receives information inputs from any of expansion/compression assembly 101, storage reservoir 112, and other components of system 100 and sources external to system 100. These information inputs may include or consist essentially of pressure, temperature, and/or other telemetered measurements of properties of components of system 101. Such information inputs, here generically denoted by the letter "T," are transmitted to control system 122 either wirelessly or through wires. Such transmission is denoted in FIG. 1 by dotted lines 124, 126.

The control system 122 may selectively control valves 108 and 118 to enable substantially isothermal compression and/or expansion of a gas in assembly 101. Control signals, here generically denoted by the letter "C," are transmitted to valves 108 and 118 either wirelessly or through wires. Such transmission is denoted in FIG. 1 by dashed lines 128, 130. The control system 122 may also control the operation of the heat-transfer assemblies 104, 114 and of other components not explicitly depicted in FIG. 1. The transmission of control and telemetry signals for these purposes is not explicitly depicted in FIG. 1.

The control system 122 may be any acceptable control device with a human-machine interface. For example, the control system 122 may include a computer (for example a PC-type) that executes a stored control application in the form of a computer-readable software medium. More generally, control system 122 may be realized as software, hardware, or some combination thereof. For example, control system 122 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 122 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

As described above, the control system 122 may receive telemetry from sensors monitoring various aspects of the operation of system 100, and may provide signals to control valve actuators, valves, motors, and other electromechanical/electronic devices. Control system 122 may communicate with such sensors and/or other components of system 100 (and other embodiments described herein) via wired or wireless communication. An appropriate interface may be used to convert data from sensors into a form readable by the control system 122 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

System 100 may be operated so as to compress gas admitted through the vent 120 and store the gas thus compressed in reservoir 112. For example, in an initial state of operation, valve 108 is closed and valve 118 is open, admitting a quantity of gas into expansion/compression assembly 101. When a desired quantity of gas has been admitted into assembly 101, valve 118 may be closed. The motor/generator 102, employing energy supplied by a source not explicitly depicted in FIG. 1 (e.g., the electrical grid), then provides mechanical power to expansion/compression assembly 101, enabling the gas within assembly 101 to be compressed.

During compression of the gas within assembly 101, fluid (i.e., gas, liquid, or a gas-liquid mixture) may be circulated between assembly 101 and heat-exchange assembly 104. Heat-exchange assembly 104 may be operated in such a manner as to enable substantially isothermal compression of the gas within assembly 101. During or after compression of the gas within assembly 101, valve 108 may be opened to enable high-pressure fluid (e.g., compressed gas or a mixture of liquid and compressed gas) to flow to reservoir 112. Heat-exchange assembly 114 may be operated at any time in such a manner as alter the temperature and/or pressure of the fluid within reservoir 112.

That system 100 may also be operated so as to expand compressed gas from reservoir 112 in expansion/compression assembly 101 in such a manner as to deliver energy to the motor/generator 102 will be apparent to all persons familiar with the operation of pneumatic, hydraulic, and electric machines.

Figure 2:
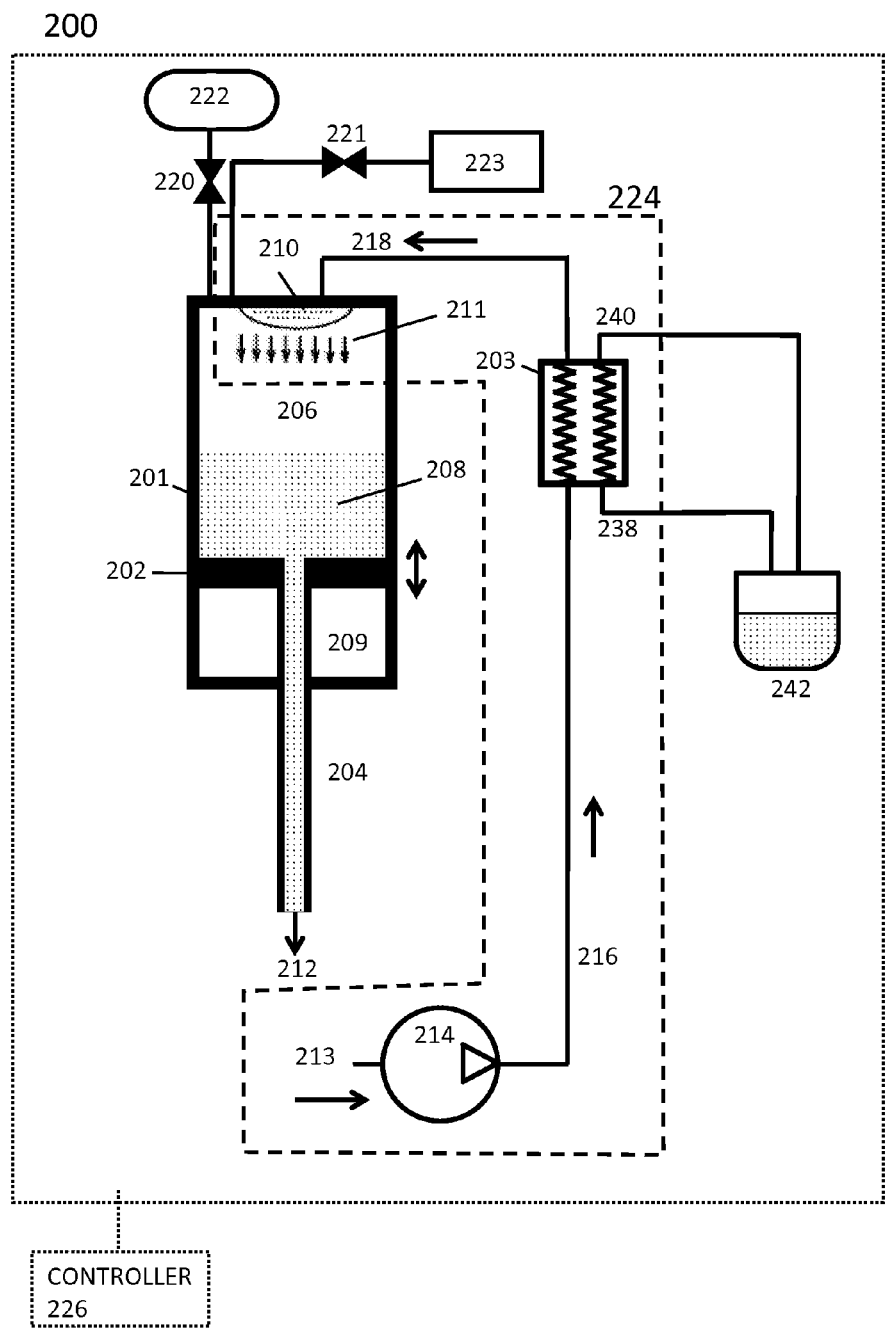
FIG. 2 is a schematic drawing of various components of a compressed-gas energy storage system in accordance with various embodiments of the invention.

FIG. 2 depicts an illustrative system 200 that features a cylinder assembly 201 (i.e., an embodiment of assembly 101 in FIG. 1) in communication with a reservoir 222 (112 in FIG. 1) and a vent to atmosphere 223 (120 in FIG. 1). In the illustrative system 200 shown in FIG. 2, the cylinder assembly 201 contains a piston 202 slidably disposed therein. In some embodiments the piston 202 is replaced by a different boundary mechanism dividing cylinder assembly 201 into multiple chambers, or piston 202 is absent entirely, and cylinder assembly 201 is a "liquid piston." The cylinder assembly 201 may be divided into, e.g., two pneumatic chambers or one pneumatic chamber and one hydraulic chamber. The piston 202 is connected to a rod 204, which may contain a center-drilled fluid passageway with fluid outlet 212 extending from the piston 202. The rod 204 is also attached to, e.g., a mechanical load (e.g., a crankshaft or a hydraulic system) that is not depicted. The cylinder assembly 201 is in liquid communication with a heat-transfer subsystem 224 that includes or consists essentially of a circulation pump 214 and a spray mechanism 210 to enable substantially isothermal compression/expansion of gas. Heat-transfer fluid circulated by pump 214 may be passed through a heat exchanger 203 (e.g., tube-in-shell- or parallel-plate-type heat exchanger). Spray mechanism 210 may include or consist essentially of one or more spray heads (e.g., disposed at one end of cylinder assembly 201) and/or spray rods (e.g., extending along at least a portion of the central axis of cylinder assembly 201). In other embodiments, the spray mechanism 210 is omitted and a foam, rather than a spray of droplets, is created to facilitate heat exchange between liquid and gas during compression and expansion of gas within the cylinder assembly 201, as described in U.S. patent application Ser. No. 13/473,128, filed May 16, 2012 (the '128 application), the entire disclosure of which is incorporated by reference herein. Foam may be generated by foaming gas with heat-exchange liquid in a mechanism (not shown, described in more detail below) external to the cylinder assembly 201 and then injecting the resulting foam into the cylinder assembly 201. Alternatively or additionally, foam may be generated inside the cylinder assembly 201 by the injection of heat-exchange liquid into cylinder assembly 201 through a foam-generating mechanism (e.g., spray head, rotating blade, one or more nozzles), partly or entirely filling the pneumatic chamber of cylinder assembly 201. In some embodiments, droplets and foams may be introduced into cylinder assembly 201 simultaneously and/or sequentially. Various embodiments may feature mechanisms (not shown in FIG. 2) for controlling the characteristics of foam (e.g., bubble size) and for breaking down, separating, and/or regenerating foam.

System 200 further includes a first control valve 220 (108 in FIG. 1) in communication with a storage reservoir 222 and cylinder assembly 201, and a second control valve 221 (118 in FIG. 1) in communication with a vent 223 and cylinder assembly 201. A control system 226 (122 in FIG. 1) may control operation of, e.g., valves 222 and 221 based on various system inputs (e.g., pressure, temperature, piston position, and/or fluid state) from cylinder assembly 201 and/or storage reservoir 222. Heat-transfer fluid (liquid or circulated by pump 214 enters through pipe 213. Pipe 213 may be (a) connected to a low-pressure fluid source (e.g., fluid reservoir (not shown) at the pressure to which vent 223 is connected or thermal well 242); (b) connected to a high-pressure source (e.g., fluid reservoir (not shown) at the pressure of reservoir 222); (c) selectively connected (using valve arrangement not shown) to low pressure during a compression process and to high pressure during an expansion process; (d) connected to changing-pressure fluid 208 in the cylinder 201 via connection 212; or (e) some combination of these options.

In an initial state, the cylinder assembly 201 may contain a gas 206 (e.g., air introduced to the cylinder assembly 201 via valve 221 and vent 223) and a heat-transfer fluid 208 (which may include or consist essentially of, e.g., water or another suitable liquid). When the gas 206 enters the cylinder assembly 201, piston 202 is operated to compress the gas 206 to an elevated pressure (e.g., approximately 3,000 psi). Heat-transfer fluid (not necessarily the identical body of heat-transfer fluid 208) flows from pipe 213 to the pump 214. The pump 214 may raise the pressure of the heat-exchange fluid to a pressure (e.g., up to approximately 3,015 psig) somewhat higher than the pressure within the cylinder assembly 201, as described in the '409 application. Alternatively or in conjunction, embodiments of the invention add heat (i.e., thermal energy) to, or remove heat from, the high-pressure gas in the cylinder assembly 201 by passing only relatively low-pressure fluids through a heat exchanger or fluid reservoir, as detailed in U.S. patent application Ser. No. 13/211,440, filed Aug. 17, 2011 (the '440 application), the entire disclosure of which is incorporated by reference herein.

Heat-transfer fluid is then sent through a pipe 216, where it may be passed through a heat exchanger 203 (where its temperature is altered) and then through a pipe 218 to the spray mechanism 210. The heat-transfer fluid thus circulated may include or consist essentially of liquid or foam. Spray mechanism 210 may be disposed within the cylinder assembly 201, as shown; located in the storage reservoir 222 or vent 223; or located in piping or manifolding around the cylinder assembly, such as pipe 218 or the pipes connecting the cylinder assembly to storage reservoir 222 or vent 223. The spray mechanism 210 may be operated in the vent 223 or connecting pipes during compression, and a separate spray mechanism may be operated in the storage reservoir 222 or connecting pipes during expansion. Heat-transfer spray 211 from spray mechanism 210 (and/or any additional spray mechanisms), and/or foam from mechanisms internal or external to the cylinder assembly 101, enable substantially isothermal compression of gas 206 within cylinder assembly 201.

In some embodiments, the heat exchanger 203 is configured to condition heat-transfer fluid at low pressure (e.g., a pressure lower than the maximum pressure of a compression or expansion stroke in cylinder assembly 201), and heat-transfer fluid is thermally conditioned between strokes or only during portions of strokes, as detailed in the '440 application. Embodiments of the invention are configured for circulation of heat-transfer fluid without the use of hoses that flex during operation through the use of, e.g., tubes or straws configured for non-flexure and/or pumps (e.g., submersible bore pumps, axial flow pumps, or other in-line style pumps) internal to the cylinder assembly (e.g., at least partially disposed within the piston rod thereof), as described in U.S. patent application Ser. No. 13/234,239, filed Sep. 16, 2011 (the '239 application), the entire disclosure of which is incorporated by reference herein.

At or near the end of the compression stroke, control system 226 opens valve 220 to admit the compressed gas 206 to the storage reservoir 222. Operation of valves 220 and 221 may be controlled by various inputs to control system 226, such as piston position in cylinder assembly 201, pressure in storage reservoir 222, pressure in cylinder assembly 201, and/or temperature in cylinder assembly 201.

As mentioned above, the control system 226 may enforce substantially isothermal operation, i.e., expansion and/or compression of gas in cylinder assembly 201, via control over, e.g., the introduction of gas into and the exhausting of gas out of cylinder assembly 201, the rates of compression and/or expansion, and/or the operation of the heat-exchange subsystem in response to sensed conditions. For example, control system 226 may be responsive to one or more sensors disposed in or on cylinder assembly 201 for measuring the temperature of the gas and/or the heat-exchange fluid within cylinder assembly 201, responding to deviations in temperature by issuing control signals that operate one or more of the system components noted above to compensate, in real time, for the sensed temperature deviations. For example, in response to a temperature increase within cylinder assembly 201, control system 226 may issue commands to increase the flow rate of spray 211 of heat-exchange fluid 208.

Figure 4:
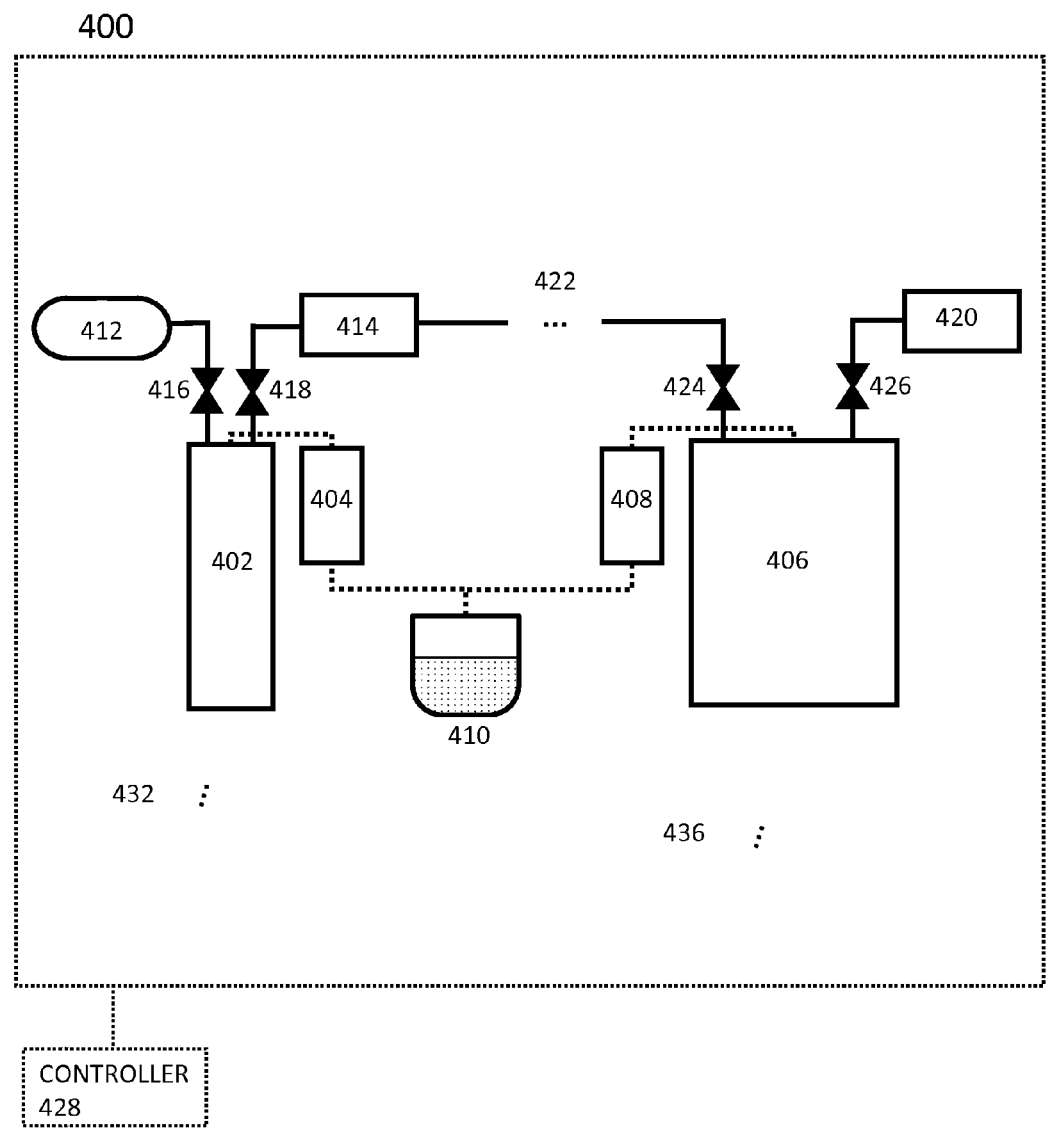
FIG. 4 is a schematic drawing of various components of a multi-cylinder compressed-gas energy storage system in accordance with various embodiments of the invention.

Furthermore, embodiments of the invention may be applied to systems in which cylinder assembly 201 (or a chamber thereof) is in fluid communication with a pneumatic chamber of a second cylinder (e.g., as shown in FIG. 4). That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 203 may be filled with water, a coolant mixture, an aqueous foam, or any other acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat-exchange side of the heat exchanger 203 to an installation such as a heat-engine power plant, an industrial process with waste heat, a heat pump, and/or a building needing space heating or cooling, as described in the '731 patent. Alternatively, the external heat-exchange side of the heat exchanger 203 may be connected to a thermal well 242 as depicted in FIG. 2. The thermal well 242 may include or consist essentially of a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the energy storage/conversion system. Alternatively, the thermal well 242 may include two or more bodies of energy-storage medium, e.g., a hot-water thermal well and a cold-water thermal well, that are typically maintained in contrasting energy states in order to increase the exergy of system 200 compared with a system in which thermal well 242 includes a single body of energy-storage medium. Storage media other than water may be utilized in the thermal well 242; temperature changes, phase changes, or both may be employed by storage media of thermal well 242 to store and release energy. Thermal or fluid links (not shown) to the atmosphere, ground, and/or other components of the environment may also be included in system 200, allowing mass, thermal energy, or both to be added to or removed from the thermal well 242. Moreover, as depicted in FIG. 2, the heat-transfer subsystem 224 does not interchange fluid directly with the thermal well 242, but in other embodiments, fluid is passed directly between the heat-transfer subsystem 224 and the thermal well 242 with no heat exchanger maintaining separation between fluids.

Figure 3:
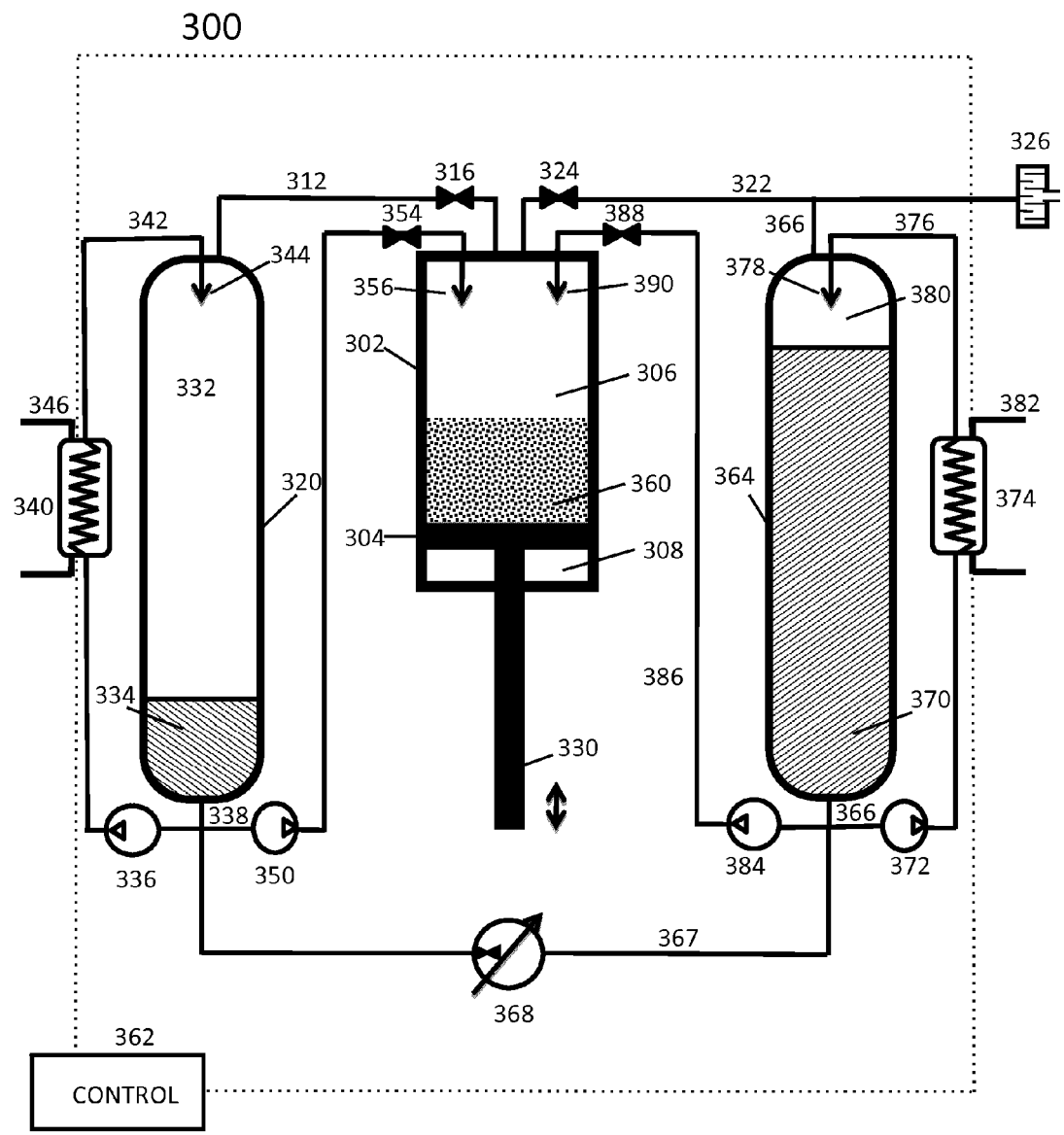
FIG. 3 is a schematic drawing of the major components of a compressed air energy storage and recovery system in accordance with various embodiments of the invention.

FIG. 3 is a schematic of the major components of an illustrative system 300 that employs a pneumatic cylinder 302 to efficiently convert (i.e., store) mechanical energy into the potential energy of compressed gas and, in another mode of operation, efficiently convert (i.e., recover) the potential energy of compressed gas into mechanical work. The pneumatic cylinder 302 may contain a slidably disposed piston 304 that divides the interior of the cylinder 302 into a distal chamber 306 and a proximal chamber 308. A port or ports (not shown) with associated pipes 312 and a bidirectional valve 316 enables gas from a high-pressure storage reservoir 320 to be admitted to chamber 306 as desired. A port or ports (not shown) with associated pipes 322 and a bidirectional valve 324 enables gas from the chamber 306 to be exhausted through a vent 326 to the ambient atmosphere as desired. In alternate embodiments, vent 326 is replaced by additional lower-pressure pneumatic cylinders (or pneumatic chambers of cylinders). A port or ports (not shown) enables the interior of the chamber 308 to communicate freely at all times with the ambient atmosphere. In alternate embodiments, cylinder 302 is double-acting and chamber 308 is, like chamber 306, equipped to admit and exhaust fluids in various states of operation. The distal end of a rod 330 is coupled to the piston 304. The rod 330 may be connected to a crankshaft, hydraulic cylinder, or other mechanisms for converting linear mechanical motion to useful work as described in the '678 and '842 patents.

In the energy recovery or expansion mode of operation, storage reservoir 320 is filled with high-pressure air (or other gas) 332 and a quantity of heat-transfer fluid 334. The heat-transfer fluid 334 may be an aqueous foam or a liquid that tends to foam when sprayed or otherwise acted upon. The liquid component of the aqueous foam, or the liquid that tends to foam, may include or consist essentially of water with 2% to 5% of certain additives; these additives may also provide functions of anti-corrosion, anti-wear (lubricity), anti-bio-growth (biocide), freezing-point modification (anti-freeze), and/or surface-tension modification. Additives may include a micro-emulsion of a lubricating fluid such as mineral oil, a solution of agents such as glycols (e.g. propylene glycol), or soluble synthetics (e.g. ethanolamines). Such additives tend to reduce liquid surface tension and lead to substantial foaming when sprayed. Commercially available fluids may be used at an approximately 5% solution in water, such as Mecagreen 127 (available from the Condat Corporation of Michigan), which consists in part of a micro-emulsion of mineral oil, and Quintolubric 807-WP (available from the Quaker Chemical Corporation of Pennsylvania), which consists in part of a soluble ethanolamine. Other additives may be used at higher concentrations (such as at a 50% solution in water), including Cryo-tek 100/Al (available from the Hercules Chemical Company of New Jersey), which consists in part of a propylene glycol. These fluids may be further modified to enhance foaming while being sprayed and to speed defoaming when in a reservoir.

The heat-transfer fluid 334 may be circulated within the storage reservoir 320 via high-inlet-pressure, low-power-consumption pump 336 (such as described in the '731 patent). In various embodiments, the fluid 334 may be removed from the bottom of the storage reservoir 320 via piping 338, circulated via pump 336 through a heat exchanger 340, and introduced (e.g., sprayed) back into the top of storage reservoir 320 via piping 342 and spray head 344 (or other suitable mechanism). Any changes in pressure within reservoir 320 due to removal or addition of gas (e.g., via pipe 312) generally tend to result in changes in temperature of the gas 332 within reservoir 320. By spraying and/or foaming the fluid 334 throughout the storage reservoir gas 332, heat may be added to or removed from the gas 332 via heat exchange with the heat-transfer fluid 334. By circulating the heat-transfer fluid 334 through heat exchanger 340, the temperature of the fluid 334 and gas 332 may be kept substantially constant (i.e., isothermal). Counterflow heat-exchange fluid 346 at near-ambient pressure may be circulated from a near-ambient-temperature thermal well (not shown) or source (e.g., waste heat source) or sink (e.g., cold water source) of thermal energy, as described in more detail below.

In various embodiments of the invention, reservoir 320 contains an aqueous foam, either unseparated or partially separated into its gaseous and liquid components. In such embodiments, pump 336 may circulate either the foam itself, or the separated liquid component of the foam, or both, and recirculation of fluid into reservoir 320 may include regeneration of foam by apparatus not shown in FIG. 3.

In the energy recovery or expansion mode of operation, a quantity of gas may be introduced via valve 316 and pipe 312 into the upper chamber 306 of cylinder 302 when piston 304 is near or at the top of its stroke (i.e., "top dead center" of cylinder 302). The piston 304 and its rod 330 will then be moving downward (the cylinder 302 may be oriented arbitrarily but is shown vertically oriented in this illustrative embodiment). Heat-exchange fluid 334 may be introduced into chamber 306 concurrently via optional pump 350 (alternatively, a pressure drop may be introduced in line 312 such that pump 350 is not needed) through pipe 352 and directional valve 354. This heat-exchange fluid 334 may be sprayed into chamber 306 via one or more spray nozzles 356 in such a manner as to generate foam 360. (In some embodiments, foam 360 is introduced directly into chamber 306 in foam form.) The foam 360 may entirely fill the entire chamber 306, but is shown in FIG. 3, for illustrative purposes only, as only partially filling chamber 306. Herein, the term "foam" denotes either (a) foam only or (b) any of a variety of mixtures of foam and heat-exchange liquid in other, non-foaming states (e.g., droplets). Moreover, some non-foamed liquid (not shown) may accumulate at the bottom of chamber 306; any such liquid is generally included in references herein to the foam 360 within chamber 306.

System 300 is instrumented with pressure, piston position, and/or temperature sensors (not shown) and controlled via control system 362. At a predetermined position of piston 304, an amount of gas 332 and heat-transfer fluid 334 have been admitted into chamber 306 and valve 316 and valve 354 are closed. (Valves 316 and 354 may close at the same time or at different times, as each has a control value based on quantity of fluid desired.) The gas in chamber 306 then undergoes free expansion, continuing to drive piston 304 downward. During this expansion, in the absence of foam 360, the gas would tend to decrease substantially in temperature. With foam 360 largely or entirely filling the chamber, the temperature of the gas in chamber 306 and the temperature of the heat-transfer fluid 360 tend to approximate to each other via heat exchange. The heat capacity of the liquid component of the foam 360 (e.g., water with one or more additives) may be much higher than that of the gas (e.g., air) such that the temperature of the gas and liquid do not change substantially (i.e., are substantially isothermal) even over a many-times gas expansion (e.g., from 250 psig to near atmospheric pressure, or in other embodiments from 3,000 psig to 250 psig).

When the piston 304 reaches the end of its stroke (bottom dead center), the gas within chamber 306 will have expanded to a predetermined lower pressure (e.g., near atmospheric). Valve 324 will then be opened, allowing gas from chamber 306 to be vented, whether to atmosphere through pipe 322 and vent 326 (as illustrated here) or, in other embodiments, to a next stage in the expansion process (e.g., chamber in a separate cylinder), via pipe 322. Valve 324 remains open as the piston undergoes an upward (i.e., return) stroke, emptying chamber 306. Part or substantially all of foam 360 is also forced out of chamber 306 via pipe 322. A separator (not shown) or other means such as gravity separation is used to recover heat-transfer fluid, preferably de-foamed (i.e., as a simple liquid with or without additives), and to direct it into a storage reservoir 364 via pipe 366.

When piston 304 reaches top of stroke again, the process repeats with gas 332 and heat-transfer fluid 334 admitted from vessel 320 via valves 316 and 354. If additional heat-transfer fluid is needed in reservoir 320, it may be pumped back into reservoir 320 from reservoir 364 via piping 367 and optional pump/motor 368. In one mode of operation, pump 368 may be used to continuously refill reservoir 320 such that the pressure in reservoir 320 is held substantially constant. That is, as gas is removed from reservoir 320, heat-transfer fluid 334 is added to maintain constant pressure in reservoir 320. In other embodiments, pump 368 is not used or is used intermittently, the pressure in reservoir 320 continues to decrease during an energy-recovery process (i.e., involving removal of gas from reservoir 320), and the control system 362 changes the timing of valves 316 and 354 accordingly so as to reach approximately the same ending pressure when the piston 304 reaches the end of its stroke. An energy-recovery process may continue until the storage reservoir 320 is nearly empty of pressurized gas 332, at which time an energy-storage process may be used to recharge the storage reservoir 320 with pressurized gas 332. In other embodiments, the energy-recovery and energy-storage processes are alternated based on operator requirements.

In either the energy-storage or energy-compression mode of operation, storage reservoir 320 is typically at least partially depleted of high-pressure gas 332, as storage reservoir 320 also typically contains a quantity of heat-transfer fluid 334. Reservoir 364 is at low pressure (e.g., atmospheric or some other low pressure that serves as the intake pressure for the compression phase of cylinder 302) and contains a quantity of heat-transfer fluid 370.

The heat-transfer fluid 370 may be circulated within the reservoir 364 via low-power-consumption pump 372. In various embodiments, the fluid 370 may be removed from the bottom of the reservoir 364 via piping 367, circulated via pump 372 through a heat exchanger 374, and introduced (e.g., sprayed) back into the top of reservoir 364 via piping 376 and spray head 378 (or other suitable mechanism). By spraying the fluid 370 throughout the reservoir gas 380, heat may be added or removed from the gas via the heat-transfer fluid 370. By circulating the heat-transfer fluid 370 through heat exchanger 374, the temperature of the fluid 370 and gas 380 may be kept near constant (i.e., isothermal). Counterflow heat-exchange fluid 382 at near-ambient pressure may be circulated from a near-ambient-temperature thermal well (not shown) or source (e.g., waste heat source) or sink (e.g., cold water source) of thermal energy. In one embodiment, counterflow heat-exchange fluid 382 is at high temperature to increase energy recovery during expansion and/or counterflow heat-exchange fluid 382 is at low temperature to decrease energy usage during compression.

In the energy-storage or compression mode of operation, a quantity of low-pressure gas is introduced via valve 324 and pipe 322 into the upper chamber 306 of cylinder 302 starting when piston 304 is near top dead center of cylinder 302. The low-pressure gas may be from the ambient atmosphere (e.g., may be admitted through vent 326 as illustrated herein) or may be from a source of pressurized gas such as a previous compression stage. During the intake stroke, the piston 304 and its rod 330 will move downward, drawing in gas. Heat-exchange fluid 370 may be introduced into chamber 306 concurrently via optional pump 384 (alternatively, a pressure drop may be introduced in line 386 such that pump 384 is not needed) through pipe 386 and directional valve 388. This heat exchange fluid 370 may be introduced (e.g., sprayed) into chamber 306 via one or more spray nozzles 390 in such a manner as to generate foam 360. This foam 360 may fill the chamber 306 partially or entirely by the end of the intake stroke; for illustrative purposes only, foam 360 is shown in FIG. 3 as only partially filling chamber 306. At the end of the intake stroke, piston 304 reaches the end-of-stroke position (bottom dead center) and chamber 306 is filled with foam 360 generated from air at a low pressure (e.g., atmospheric) and heat-exchange liquid.

At the end of the stroke, with piston 304 at the end-of-stroke position, valve 324 is closed. Valve 388 is also closed, not necessarily at the same time as valve 324, but after a predetermined amount of heat-transfer fluid 370 has been admitted, creating foam 360. The amount of heat-transfer fluid 370 may be based upon the volume of air to be compressed, the ratio of compression, and/or the heat capacity of the heat-transfer fluid. Next, piston 304 and rod 330 are driven upwards via mechanical means (e.g., hydraulic fluid, hydraulic cylinder, mechanical crankshaft) to compress the gas within chamber 306.

During this compression, in the absence of foam 360, the gas in chamber 306 would tend to increase substantially in temperature. With foam 360 at least partially filling the chamber, the temperature of the gas in chamber 306 and the temperature of the liquid component of foam 360 will tend to equilibrate via heat exchange. The heat capacity of the fluid component of foam 360 (e.g., water with one or more additives) may be much higher than that of the gas (e.g., air) such that the temperature of the gas and fluid do not change substantially and are near-isothermal even over a many-times gas compression (e.g., from near atmospheric pressure to 250 psig, or in other embodiments from 250 psig to 3,000 psig).

The gas in chamber 306 (which includes, or consists essentially of, the gaseous component of foam 360) is compressed to a suitable pressure, e.g., a pressure approximately equal to the pressure within storage reservoir 320, at which time valve 316 is opened. The foam 360, including both its gaseous and liquid components, is then transferred into storage reservoir 320 through valve 316 and pipe 312 by continued upward movement of piston 304 and rod 330.

When piston 304 reaches top of stroke again, the process repeats, with low-pressure gas and heat-transfer fluid 370 admitted from vent 326 and reservoir 364 via valves 324 and 388. If additional heat-transfer fluid is needed in reservoir 364, it may be returned to reservoir 364 from reservoir 320 via piping 367 and optional pump/motor 368. Power recovered from motor 368 may be used to help drive the mechanical mechanism for driving piston 304 and rod 330 or may be converted to electrical power via an electric motor/generator (not shown). In one mode of operation, motor 368 may be run continuously, while reservoir 320 is being filled with gas, in such a manner that the pressure in reservoir 320 is held substantially constant. That is, as gas is added to reservoir 320, heat-transfer fluid 334 is removed from reservoir 320 to maintain substantially constant pressure within reservoir 320. In other embodiments, motor 368 is not used or is used intermittently; the pressure in reservoir 320 continues to increase during an energy-storage process and the control system 362 changes the timing of valves 316 and 388 accordingly so that the desired ending pressure (e.g., atmospheric) is attained within chamber 306 when the piston 304 reaches bottom of stroke. An energy-storage process may continue until the storage reservoir 320 is full of pressurized gas 332 at the maximum storage pressure (e.g., 3,000 psig), after which time the system is ready to perform an energy-recovery process. In various embodiments, the system may commence an energy-recovery process when the storage reservoir 320 is only partly full of pressurized gas 332, whether at the maximum storage pressure or at some storage pressure intermediate between atmospheric pressure and the maximum storage pressure. In other embodiments, the energy-recovery and energy-storage processes are alternated based on operator requirements.

FIG. 4 depicts an illustrative system 400 that features at least two cylinder assemblies 402, 406 (i.e., an embodiment of assembly 101 in FIG. 1; e.g., cylinder assembly 201 in FIG. 2) and a heat-transfer subsystem 404, 408 (e.g., subsystem 224 in FIG. 2) associated with each cylinder assembly 402, 406. Additionally, the system includes a thermal well 410 (e.g., thermal well 242 in FIG. 2) which may be associated with either or both of the heat-transfer subsystems 404, 408 as indicated by the dashed lines.

Assembly 402 is in selective fluid communication with a storage reservoir 412 (e.g., 112 in FIG. 1, 222 in FIG. 2) capable of holding fluid at relatively high pressure (e.g., approximately 3,000 psig). Assembly 406 is in selective fluid communication with assembly 402 and/or with optional additional cylinder assemblies between assemblies 402 and 406 as indicated by ellipsis marks 422. Assembly 406 is in selective fluid communication with an atmospheric vent 420 (e.g., 120 in FIG. 1, 223 in FIG. 2).

System 400 may compress air at atmospheric pressure (admitted to system 400 through the vent 420) stagewise through assemblies 406 and 402 to high pressure for storage in reservoir 412. System 400 may also expand air from high pressure in reservoir 412 stagewise through assemblies 402 and 406 to a low pressure (e.g., approximately 5 psig) for venting to the atmosphere through vent 420.

As described in U.S. Pat. No. 8,191,362, filed Apr. 6, 2011 (the '362 patent), the entire disclosure of which is incorporated by reference herein, in a group of N cylinder assemblies used for expansion or compression of gas between a high pressure (e.g., approximately 3,000 psig) and a low pressure (e.g., approximately 5 psig), the system will contain gas at N−1 pressures intermediate between the high-pressure extreme and the low pressure. Herein each such intermediate pressure is termed a "mid-pressure." In illustrative system 400, N=2 and N−1=1, so there is one mid-pressure (e.g., approximately 250 psig during expansion) in the system 400. In various states of operation of the system, mid-pressures may occur in any of the chambers of a series-connected cylinder group (e.g., the cylinders of assemblies 402 and 406) and within any valves, piping, and other devices in fluid communication with those chambers. In illustrative system 400, the mid-pressure, herein denoted "mid-pressure P1," occurs primarily in valves, piping, and other devices intermediate between assemblies 402 and 406.

Assembly 402 is a high-pressure assembly: i.e., assembly 402 may admit gas at high pressure from reservoir 412 to expand the gas to mid-pressure P1 for transfer to assembly 402, and/or may admit gas at mid-pressure P1 from assembly 406 to compress the gas to high pressure for transfer to reservoir 412. Assembly 406 is a low-pressure assembly: i.e., assembly 406 may admit gas at mid-pressure P1 from assembly 402 to expand the gas to low pressure for transfer to the vent 420, and/or may admit gas at low pressure from vent 420 to compress the gas to mid-pressure P1 for transfer to assembly 402.

In system 400, extended cylinder assembly 402 communicates with extended cylinder assembly 406 via a mid-pressure assembly 414. Herein, a "mid-pressure assembly" includes or consists essentially of a reservoir of gas that is placed in fluid communication with the valves, piping, chambers, and other components through or into which gas passes. The gas in the reservoir is at approximately at the mid-pressure which the particular mid-pressure assembly is intended to provide. The reservoir is large enough so that a volume of mid-pressure gas approximately equal to that within the valves, piping, chambers, and other components with which the reservoir is in fluid communication may enter or leave the reservoir without substantially changing its pressure. Additionally, the mid-pressure assembly may provide pulsation damping, additional heat-transfer capability, fluid separation, and/or house one or more heat-transfer sub-systems such as part or all of sub-systems 404 and/or 408. As described in the '362 patent, a mid-pressure assembly may substantially reduce the amount of dead space in various components of a system employing pneumatic cylinder assemblies, e.g., system 400 in FIG. 4. Reduction of dead space tends to increase overall system efficiency.

Alternatively or in conjunction, pipes and valves (not shown in FIG. 4) bypassing mid-pressure assembly 414 may enable fluid to pass directly between assembly 402 and assembly 406. Valves 416, 418, 424, and 426 control the passage of fluids between the assemblies 402, 406, 412, and 414.

A control system 428 (e.g., 122 in FIG. 1, 226 in FIG. 2, 362 in FIG. 3) may control operation of, e.g., all valves of system 400 based on various system inputs (e.g., pressure, temperature, piston position, and/or fluid state) from assemblies 402 and 406, mid-pressure assembly 414, storage reservoir 412, thermal well 410, heat transfer sub-systems 404, 408, and/or the environment surrounding system 420.

It will be clear to persons reasonably familiar with the art of pneumatic machines that a system similar to system 400 but differing by the incorporation of one, two or more mid-pressure extended cylinder assemblies may be devised without additional undue experimentation. It will also be clear that all remarks herein pertaining to system 400 may be applied to such an N-cylinder system without substantial revision, as indicated by elliptical marks 422. Such N-cylinder systems, though not discussed further herein, are contemplated and within the scope of the invention. As shown and described in the '678 patent, N appropriately sized cylinders, where N≥2, may reduce an original (single-cylinder) operating fluid pressure range R to $R^{1/N}$ and correspondingly reduce the range of force acting on each cylinder in the N-cylinder system as compared to the range of force acting in a single-cylinder system. This and other advantages, as set forth in the '678 patent, may be realized in N-cylinder systems. Additionally, multiple identical cylinders may be added in parallel and attached to a common or separate drive mechanism (not shown) with the cylinder assemblies 402, 406 as indicated by ellipsis marks 432, 436, enabling higher power and air-flow rates.

Figure 5:
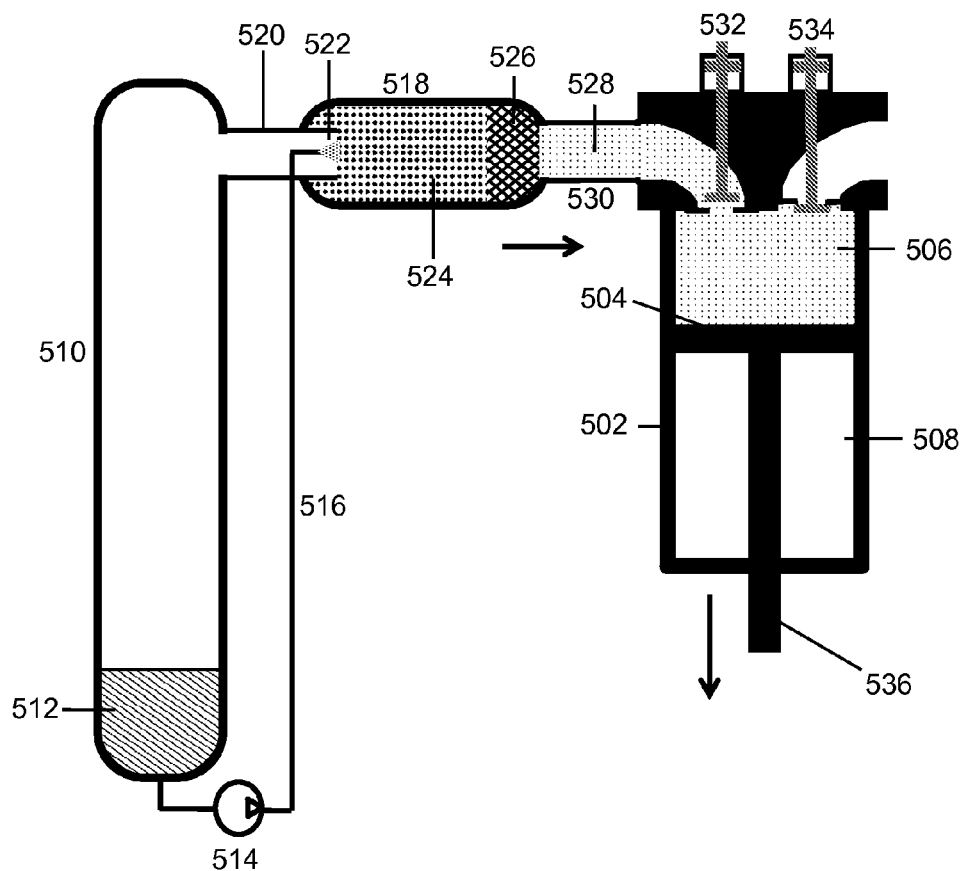
FIG. 5 is a schematic drawing of a cylinder assembly with apparatus for the generation of foam external to the cylinder in accordance with various embodiments of the invention.

FIG. 5 is a schematic diagram showing components of a system 500 for achieving approximately isothermal compression and expansion of a gas for energy storage and recovery using a pneumatic cylinder 502 (shown in partial cross-section) according to embodiments of the invention. The cylinder 502 typically contains a slidably disposed piston 504 that divides the cylinder 502 into two chambers 506, 508. A reservoir 510 contains gas at high pressure (e.g., 3,000 psi); the reservoir 510 may also contain a quantity of heat-exchange liquid 512. The heat-exchange liquid 512 may contain an additive that increases the liquid's tendency to foam (e.g., by lowering the surface tension of the liquid 512). Additives may include surfactants (e.g., sulfonates), a micro-emulsion of a lubricating fluid such as mineral oil, a solution of agents such as glycols (e.g., propylene glycol), or soluble synthetics (e.g., ethanolamines). Foaming agents such as sulfonates (e.g., linear alkyl benzene sulfonate such as Bio-Soft D-40 available from Stepan Company of Illinois) may be added, or commercially available foaming concentrates such as firefighting foam concentrates (e.g., fluorosurfactant products such as those available from ChemGuard of Texas) may be used. Such additives tend to reduce liquid surface tension of water and lead to substantial foaming when sprayed. Commercially available fluids may be used at an approximately 5% solution in water, such as Mecagreen 127 (available from the Condat Corporation of Michigan), which consists in part of a micro-emulsion of mineral oil, and Quintolubric 807-WP (available from the Quaker Chemical Corporation of Pennsylvania), which consists in part of a soluble ethanolamine. Other additives may be used at higher concentrations (such as at a 50% solution in water), including Cryo-tek 100/Al (available from the Hercules Chemical Company of New Jersey), which consists in part of a propylene glycol. These fluids may be further modified to enhance foaming while being sprayed and to speed defoaming when in a reservoir.

A pump 514 and piping 516 may convey the heat-exchange liquid to a device herein termed a "mixing chamber" (518). Gas from the reservoir 510 may also be conveyed (via piping 520) to the mixing chamber 518. Within the mixing chamber 518, a foam-generating mechanism 522 combines the gas from the reservoir 510 and the liquid conveyed by piping 516 to create foam 524 of a certain grade (i.e., bubble size variance, average bubble size, void fraction), herein termed Foam A, inside the mixing chamber 518.

The mixing chamber 518 may contain a screen 526 or other mechanism (e.g., source of ultrasound) to vary or homogenize foam structure. Screen 526 may be located, e.g., at or near the exit of mixing chamber 518. Foam that has passed through the screen 526 may have a different bubble size and other characteristics from Foam A and is herein termed Foam B (528). In other embodiments, the screen 526 is omitted, so that Foam A is transferred without deliberate alteration to chamber 506.

The exit of the mixing chamber 518 is connected by piping 530 to a port in the cylinder 502 that is gated by a valve 532 (e.g., a poppet-style valve) that permits fluid from piping 530 to enter the upper chamber (air chamber) 506 of the cylinder 502. Valves (not shown) may control the flow of gas from the reservoir 510 through piping 520 to the mixing chamber 518, and from the mixing chamber 518 through piping 528 to the upper chamber 506 of the cylinder 502. Another valve 534 (e.g., a poppet-style valve) permits the upper chamber 506 to communicate with other components of the system 500, e.g., an additional separator device (not shown), the upper chamber of another cylinder (not shown), or a vent to the ambient atmosphere (not shown).

The volume of reservoir 510 may be large (e.g., at least approximately four times larger) relative to the volume of the mixing chamber 518 and cylinder 502. Foam A and Foam B are preferably statically stable foams over a portion or all of the time-scale of typical cyclic operation of system 500: e.g., for a 120 RPM system (i.e., 0.5 seconds per revolution), the foam may remain substantially unchanged (e.g., less than 10% drainage) after 5.5 seconds or a time approximately five times greater than the revolution time.

In an initial state of operation of a procedure whereby gas stored in the reservoir 510 is expanded to release energy, the valve 532 is open, the valve 534 is closed, and the piston 504 is near top dead center of cylinder 502 (i.e., toward the top of the cylinder 502). Gas from the reservoir 510 is allowed to flow through piping 520 to the mixing chamber 518 while liquid from the reservoir 510 is pumped by pump 514 to the mixing chamber 518. The gas and liquid thus conveyed to the mixing chamber 518 are combined by the foam-generating mechanism 522 to form Foam A (524), which partly or substantially fills the main chamber of the mixing chamber 518. Exiting the mixing chamber 518, Foam A passes through the screen 526, being altered thereby to Foam B. Foam B, which is at approximately the same pressure as the gas stored in reservoir 510, passes through valve 532 into chamber 506. In chamber 506, Foam B exerts a force on the piston 504 that may be communicated to a mechanism (e.g., an electric generator, not shown) external to the cylinder 502 by a rod 536 that is connected to piston 504 and that passes slideably through the lower end cap of the cylinder 502.

The gas component of the foam in chamber 506 expands as the piston 504 and rod 536 move downward. At some point in the downward motion of piston 504, the flow of gas from reservoir 510 into the mixing chamber 518 and thence (as the gas component of Foam B) into chamber 506 may be ended by appropriate operation of valves (not shown). As the gas component of the foam in chamber 506 expands, it will tend, unless heat is transferred to it, to decrease in temperature according to the Ideal Gas Law; however, if the liquid component of the foam in chamber 506 is at a higher temperature than the gas component of the foam in chamber 506, heat will tend to be transferred from the liquid component to the gas component. Therefore, the temperature of the gas component of the foam within chamber 506 will tend to remain constant (approximately isothermal) as the gas component expands.

When the piston 504 approaches bottom dead center of cylinder 502 (i.e., has moved down to approximately its limit of motion), valve 532 may be closed and valve 534 may be opened, allowing the expanded gas in chamber 506 to pass from cylinder 502 to some other component of the system 500, e.g., a vent or a chamber of another cylinder for further expansion.

In some embodiments, pump 514 is a variable-speed pump, i.e., may be operated so as to transfer liquid 512 at a slower or faster rate from the reservoir 510 to the foam-generating mechanism 522 and may be responsive to signals from the control system (not shown). If the rate at which liquid 512 is transferred by the pump 514 to the foam-mechanism 522 is increased relative to the rate at which gas is conveyed from reservoir 510 through piping 520 to the mechanism 522, the void fraction of the foam produced by the mechanism 522 may be decreased. If the foam generated by the mechanism 522 (Foam A) has a relatively low void fraction, the foam conveyed to chamber 506 (Foam B) will generally also tend to have a relatively low void fraction. When the void fraction of a foam is lower, more of the foam consists of liquid, so more thermal energy may be exchanged between the gas component of the foam and the liquid component of the foam before the gas and liquid components come into thermal equilibrium with each other (i.e., cease to change in relative temperature). When gas at relatively high density (e.g., ambient temperature, high pressure) is being transferred from the reservoir 510 to chamber 506, it may be advantageous to generate foam having a lower void fraction, enabling the liquid fraction of the foam to exchange a correspondingly larger quantity of thermal energy with the gas fraction of the foam.

All pumps shown in subsequent figures herein may also be variable-speed pumps and may be controlled based on signals from the control system. Signals from the control system may be based on system-performance (e.g., gas temperature and/or pressure, cycle time, etc.) measurements from one or more previous cycles of compression and/or expansion.

Embodiments of the invention increase the efficiency of a system 500 for the storage and retrieval of energy using compressed gas by enabling the surface area of a given quantity of heat-exchange liquid 512 to be greatly increased (with correspondingly accelerated heat transfer between liquid 512 and gas undergoing expansion or compression within cylinder 502) with less investment of energy than would be required by alternative methods of increasing the surface of area of the liquid, e.g., the conversion of the liquid 512 to a spray.

In other embodiments, the reservoir 510 is a separator rather than a high-pressure storage reservoir as depicted in FIG. 5. In such embodiments, piping, valves, and other components not shown in FIG. 5 are supplied that allow the separator to be placed in fluid communication with a high-pressure gas storage reservoir as well as with the mixing chamber 518, as shown and described in the '128 application.

Figure 6:
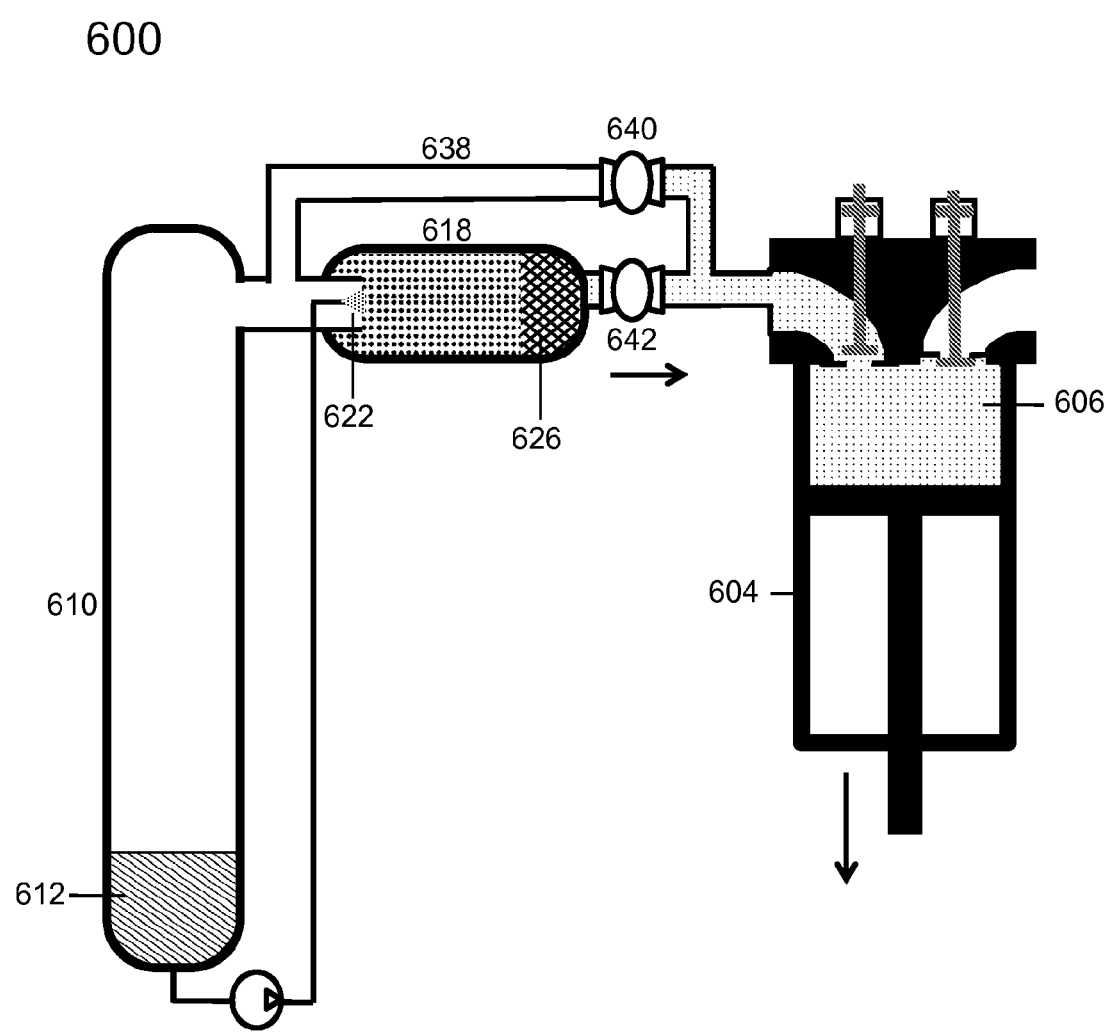
FIG. 6 is a schematic drawing of a cylinder assembly with apparatus for the generation of foam external to the cylinder and provision for bypassing the foam-generating apparatus in accordance with various embodiments of the invention.

FIG. 6 is a schematic diagram showing components of a system 600 for achieving approximately isothermal compression and expansion of a gas for energy storage and recovery using a pneumatic cylinder 604 (shown in partial cross-section) according to embodiments of the invention. System 600 is similar to system 500 in FIG. 5, except that system 600 includes a bypass pipe 638. Moreover, two valves 640, 642 are explicitly depicted in FIG. 6. Bypass pipe 638 may be employed as follows: (1) when gas is being released from the storage reservoir 610, mixed with heat-exchange liquid 612 in the mixing chamber 618, and conveyed to chamber 606 of cylinder 604 to be expanded therein, valve 640 will be closed and valve 642 open; (2) when gas has been compressed in chamber 606 of cylinder 604 and is to be conveyed to the reservoir 610 for storage, valve 640 will be open and valve 642 closed. Less friction will tend to be encountered by fluids passing through valve 640 and bypass pipe 638 than by fluids passing through valve 642 and screen 626 and around the foam-generating mechanism 622. In other embodiments, valve 642 is omitted, allowing fluid to be routed through the bypass pipe 638 by the higher resistance presented by the mixing chamber 618, and valve 640 is a check valve preventing fluid flow when gas is being released in expansion mode. The direction of fluid flow from chamber 606 to the reservoir 610 via a lower-resistance pathway (i.e., the bypass pipe 638) will tend to result in lower frictional losses during such flow and therefore higher efficiency for system 600.

In other embodiments, the reservoir 610 is a separator rather than a high-pressure storage reservoir as depicted in FIG. 6. In such embodiments, piping, valves, and other components not shown in FIG. 6 are supplied that allow the separator to be placed in fluid communication with a high-pressure gas storage reservoir as well as with the mixing chamber 618 and bypass pipe 638.

Figure 7:
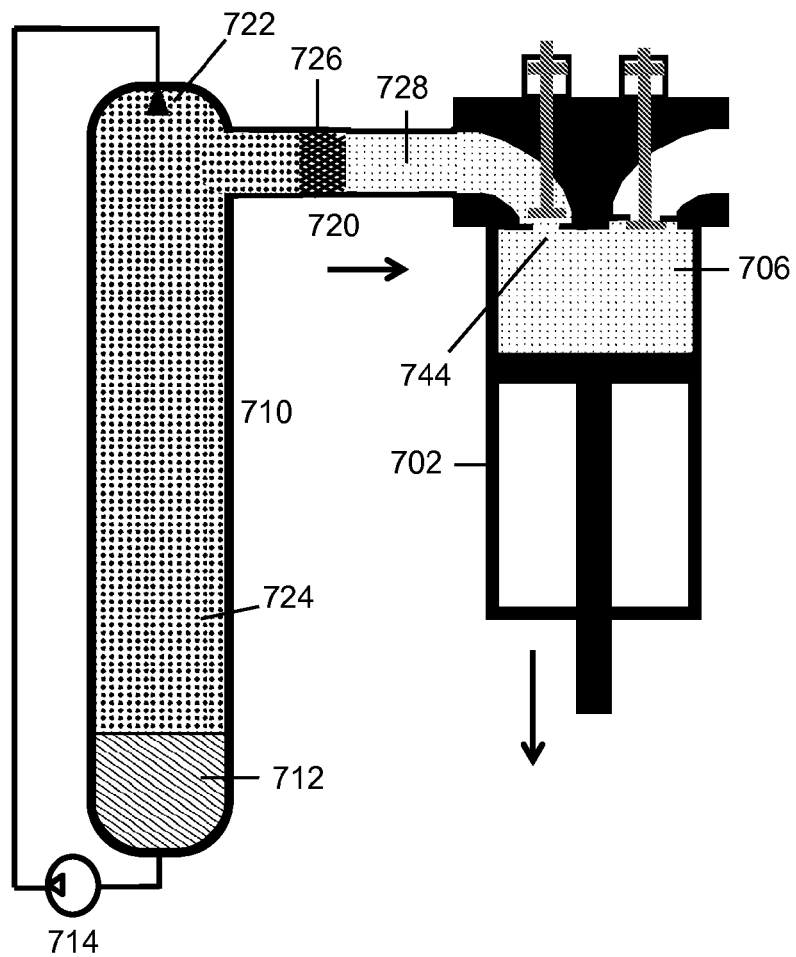
FIG. 7 is a schematic drawing of a cylinder assembly with apparatus for the generation of foam in a vessel external to the cylinder in accordance with various embodiments of the invention.

FIG. 7 is a schematic diagram showing components of a system 700 for achieving approximately isothermal compression and expansion of a gas for energy storage and recovery using a pneumatic cylinder 702 (shown in partial cross-section) according to embodiments of the invention. System 700 is similar to system 500 in FIG. 5, except that system 700 omits the mixing chamber 518 and instead generates foam inside the storage reservoir 710. In system 700, a pump 714 circulates heat-exchange liquid 712 to a foam-generating mechanism 722 (e.g., one or more spray nozzles) inside the reservoir 710. The reservoir 710 may, by means of the pump 714 and mechanism 722, be filled partly or entirely by foam of an initial or original character, Foam A (724). The reservoir 710 may be placed in fluid communication via pipe 720 with a valve-gated port 744 in cylinder 702. Valves (not shown) may govern the flow of fluid through pipe 720. An optional screen 726 (or other suitable mechanism such as an ultrasound source), shown in FIG. 7 inside pipe 720 but locatable anywhere in the path of fluid flow between reservoir 710 and chamber 706 of the cylinder 702, serves to alter Foam A (724) to Foam B (728), regulating characteristics such as bubble-size variance and average bubble size.

In other embodiments, the reservoir 710 is a separator rather than a high-pressure storage reservoir as depicted in FIG. 7. In such embodiments, piping, valves, and other components not shown in FIG. 7 will be supplied that allow the separator to be placed in fluid communication with a high-pressure gas storage reservoir as well as with the cylinder 702. In other embodiments, a bypass pipe similar to that depicted in FIG. 6 is added to system 700 in order to allow fluid to pass from cylinder 702 to reservoir 710 without passing through the screen 726.

Figure 8:
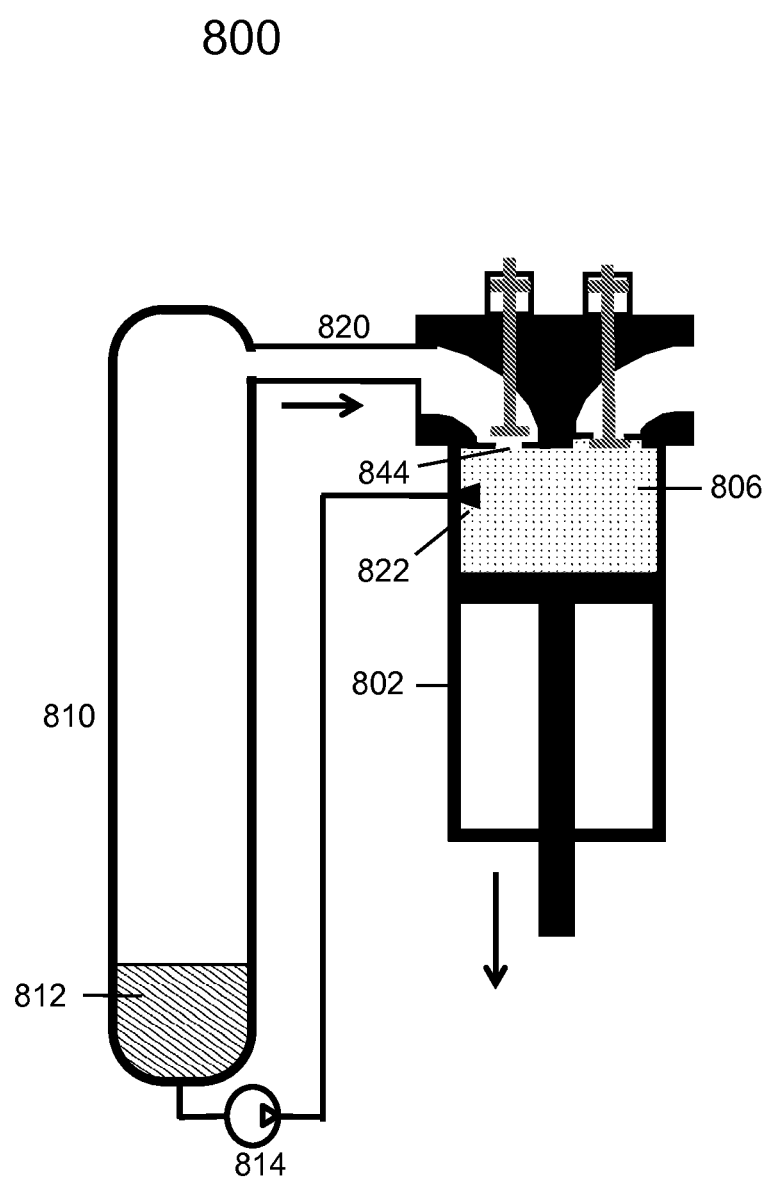
FIG. 8 is a schematic drawing of a cylinder assembly with apparatus for the generation of foam internal to the cylinder in accordance with various embodiments of the invention.

FIG. 8 is a schematic diagram showing components of a system 800 for achieving approximately isothermal compression and expansion of a gas for energy storage and recovery using a pneumatic cylinder 802 (shown in partial cross-section) according to embodiments of the invention. System 800 is similar to system 500 in FIG. 5, except that system 800 omits the mixing chamber 518 and instead generates foam inside the air chamber 806 of the cylinder 802. In system 800, a pump 814 circulates heat-exchange liquid 812 to a foam-generating mechanism 822 (e.g., one or more spray nozzles injecting into cylinder and/or onto a screen through which admitted air passes) either located within, or communicating with (e.g., through a port), chamber 806. The chamber 806 may, by means of the pump 814 and mechanism 822 (and by means of gas supplied from reservoir 810 via pipe 820 through a port 844), be filled partly or substantially entirely by foam. The reservoir 810 may be placed in fluid communication via pipe 820 with valve-gated port 844 in cylinder 802. Valves (not shown) may govern the flow of fluid through pipe 820.

Figure 9:
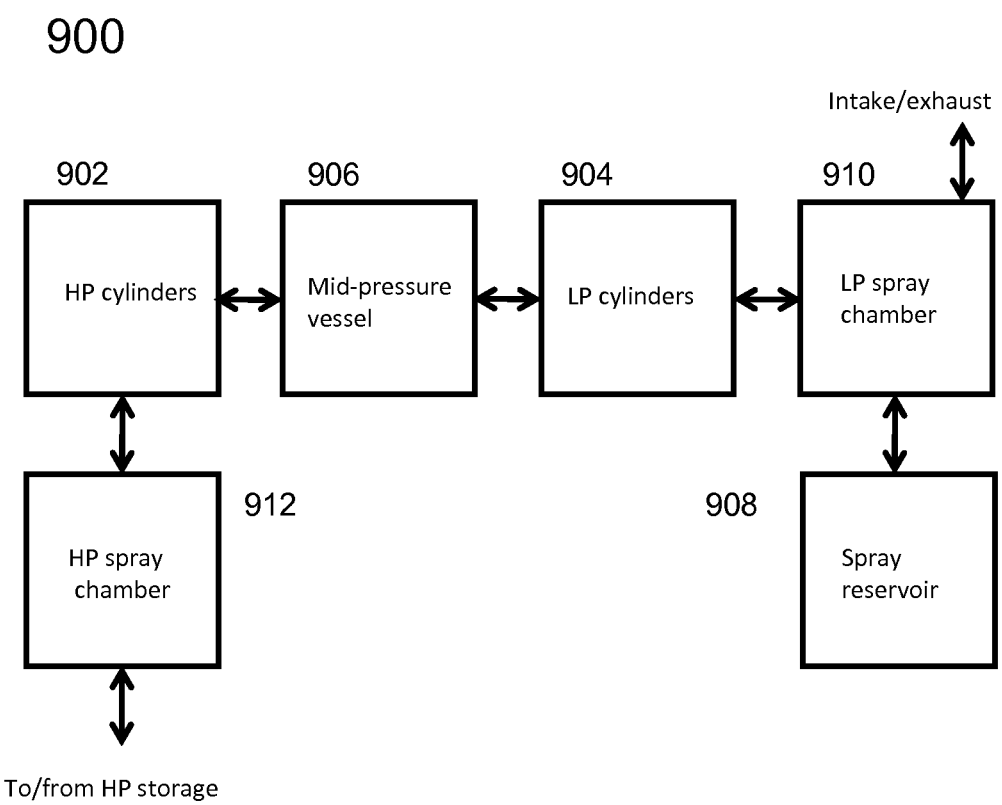
FIG. 9 is a schematic drawing of a compressed-air energy storage system employing multiple pairs of high- and low-pressure cylinders in accordance with various embodiments of the invention.

FIG. 9 is a schematic drawing of an illustrative CAES system 900 employing pairs of high- and low-pressure cylinders in which air is compressed and expanded. Half of the cylinders are high-pressure cylinders (HPCs, indicated in FIG. 900 by block 902) and half of the cylinders are low-pressure cylinders (LPCs, indicated in FIG. 900 by block 904), resulting in a two-stage compression process. Block 902 represents some number N of high-pressure cylinders (not shown) and block 904 represents an equal number N of low-pressure cylinders (not shown). The HPCs and LPCs jointly drive a crankshaft that in turn drives an electric generator or, in some states of operation of system 900, is driven by an electric motor. Systems employing principles of operation similar to those of 900 but including other subsystems, other mechanisms, other arrangements of parts, other numbers of stages (i.e., a single stage or more than one stage), and unequal numbers of high- and low-pressure cylinders, are also contemplated and within the scope of the invention.

Separating the LPCs from the HPCs is a mid-pressure vessel (MPV) 906 that buffers and decouples the HPCs 902 and LPCs 904 during either compression or expansion processes. This allows each cylinder assembly (i.e., each high- or low-pressure cylinder and the valves that control the entry or exit of gas from the cylinder) to operate independently from all the other cylinder assemblies within system 900. Independent operation of cylinder assemblies allows, in turn, for optimization of the performance (e.g., optimization of valve timing) of each cylinder assembly. A system controller (not shown), e.g., a computerized controller, coordinates the operation of individual cylinders with each other and with the other pneumatic components and processes within system 900.

In addition to the cylinders 902, 904 and MPV 906, system 900 also includes a spray reservoir 908 that holds a heat-transfer fluid (e.g., treated water) at low (e.g., atmospheric) pressure, a low-pressure spray chamber 910 that creates foam and/or spray at atmospheric pressure for intake into the LPCs for compression, and a high-pressure spray chamber 912 that creates foam and/or spray at storage pressure (i.e., the pressure at which gas and/or heat-transfer fluid is stored after compression and/or before expansion) for expansions in the HPCs. Finally, system 900 includes one or more storage reservoirs (not shown) that are connected to the HPCs 902 via the high-pressure spray chamber 912. The storage reservoirs typically contain compressed air, e.g., air compressed by system 900 and stored for future expansion to drive electricity generation.

Each of the cylinder assemblies in the HPC group 902 and LPC group 904 typically includes a cylinder similar to cylinder 201 in FIG. 2, a high-side valve similar to valve 220 in FIG. 2, and a low-side valve assembly similar to valve 221 in FIG. 2. Each high-side valve includes or consists essentially of one or more poppet elements that open out of the cylinder, connecting the expansion/compression chamber of the cylinder to a volume that is generally at higher pressure than the chamber. For a low-pressure cylinder, the high-side valve connects the cylinder's expansion/compression chamber to the MPV 906; for a high-pressure cylinder, the high-side valve connects the cylinder's expansion/compression chamber to the high-pressure spray chamber 912. Because these high-side valves open out of the cylinder rather than into the cylinder, they passively check open under an over-pressure condition in the cylinder, reducing the risk of a hydrolocking event with possible attendant damage to system components or interference with system operation.

Each low-side valve includes or consists essentially of one or more poppet elements that open into the cylinder, connecting the expansion/compression chamber of the cylinder to a volume that is generally at lower pressure than the chamber. For a low-pressure cylinder, the low-side valve connects the cylinder's expansion/compression chamber to the spray reservoir 908; for a high-pressure cylinder, the low-side valve connects the cylinder's expansion/compression chamber to the MPV 906. All of the valves, both low-side and high-side, may be hydraulically actuated. Other actuated valves such as variable cam-driven valves, electromagnetically actuated valves, mechanically actuated valves, and pneumatically actuated valves are also considered and may be utilized.

The system 900 may cyclically perform a normal compression process (or "compression cycle") or a normal expansion process (or "expansion cycle"). In a normal compression process, each low-pressure and high-pressure cylinder progresses through a series of four conditions or phases, each of which has an associated a valve configuration. The four phases are (1) compression stroke, (2) direct fill, (3) regeneration or expansion stroke, and (4) breathe, intake, or auxiliary stroke. The numbering of the phases is arbitrary in the sense that when the phases are performed in a repeating cycle, no one phase is "first" other than by convention. It is assumed in this description that all high-side and low-side valves in system 900 activate instantaneously and ideally; the implications of non-ideal valve actuation will be described subsequently. The four phases are described in detail below.

The compression stroke begins with the cylinder's piston at the bottom of its stroke range. The cylinder's expansion/compression chamber (herein also referred to simply as "the chamber") is filled with air at relatively low pressure (e.g., atmospheric). For example, the cylinder may have previously drawn in air through its low-side valve from a source on its low side (e.g., an HPC draws air in from the MPV 906, or an LPC draws air in from the ambient intake/exhaust port). With the piston at bottom of stroke, the cylinder's low-side valve and high-side valve both close, if they were not already closed, and the piston begins to move upward, compressing the air within the chamber: i.e., the compression stroke begins. The compression stroke continues as the piston moves up from bottom of stroke with both valves closed, compressing the air inside. The compression phase nominally ends when the pressure in the cylinder is approximately equal to the pressure in the component (e.g., MPV 906 or HP spray chamber and thence to high-pressure storage reservoir) to which the cylinder is connected on its high side. At this point, the direct-fill stroke or phase begins.

The direct-fill stroke or phase occurs while the piston is still moving upward and involves pushing the compressed air within the chamber out of the cylinder and into the high-side component. Direct fill begins when the pressures in the cylinder and the high-side vessel are approximately equal and the high-side valve is actuated to open. The low-side valve remains closed. Once the high-side valve is open, the cylinder pushes compressed air from its chamber into the high-side component as the piston continues to travel toward top of stroke. Direct fill ends when the cylinder reaches top of stroke, whereupon the high-side valve is closed.

The regeneration stroke occurs with both valves closed as the cylinder piston moves downward, away from top of stroke. Each cylinder has some amount of clearance volume, which is the physical space within the cylinder—above the piston and below the valves and in all the connections and crevices—that is present when the piston is at top of stroke. Moreover, in a CAES system that utilizes a liquid/water mixture to effect heat transfer within the cylinder (e.g., system 900), some fraction of the clearance volume will be occupied by liquid and some by air. That portion of the clearance volume occupied by air during a particular state of operation of the cylinder is the air dead volume (also herein termed simply the "dead volume") of the cylinder in that state of operation. This is the portion of air that was compressed during the compression stroke that was not then subsequently pushed into the high-side component. This compressed air contains energy (i.e., both thermal and elastic potential), and the regeneration stroke allows this energy to be recaptured.

The regeneration stroke starts at top of stroke with both valves closed and continues as the piston moves downward, expanding the dead volume air. The regeneration stroke ends when the pressure in the cylinder has dropped to the low-side vessel pressure and the low-side valve is commanded open.

As the cylinder piston is moving downward, once the low-side valve is opened the intake stroke begins. The intake stroke continues, drawing in new air to be compressed on the next stroke, until the piston reaches bottom of stroke. At this point, the low-side valve is closed and the next compression stroke may begin.

Each of the four compression stages is separated from preceding and subsequent stages by a valve transition event, i.e., the opening or closing of one or more valves. In the descriptions of the stages above, the valve transition points were clearly defined as top of stroke, bottom of stroke, or pressure equalization, but this assumes that the valves of system 900 respond ideally and instantaneously. However, because of finite valve response time, each valve transition event is an opportunity for system optimization.

The first valve transition event mentioned above is the transition from intake stroke to compression stroke, which nominally occurs at bottom dead center (BDC; the condition where the piston is at its nethermost point of motion). With finite (nonzero) valve response time, the low-side valve will need to be commanded closed slightly before BDC and will likely be full seat closed slightly after BDC. Transitioning this valve too early means that less air is drawn in than could have been, resulting in less air to be compressed during the following compression stroke (reduced capacity). Transitioning the valve too late means that some of the air drawn in will be re-exhausted before the valve fully seats, also resulting in reduced capacity.

The second valve event is at the end of compression, transitioning into direct-fill, where the high-side valve is opened to end admission of air into the chamber and start pushing air into the high-side vessel. Nominally, the high-side valve opens when the pressure in the chamber is equal to the pressure in the high-side component. However, because of finite valve response time, if the valve is commanded open when the pressures are equal, then the pressure in the chamber will spike significantly as the flow from the chamber is limited and throttled through the high-side valve while the valve is transitioning open. The pressure spike may be avoided by commanding the high-side valve to open before pressures are equal in the chamber and the high-side component. However, if the high-side valve starts to open when the chamber pressure is still lower than that within the high-side component, then some amount of back-flow into the chamber will occur as fluid from the high-side component flows backward through the high-side valve into the chamber. (This backflow will be throttled, since the high-side valve is partially open.) If the high-side valve is opened too early, then the pressure within the chamber will jump quickly to the high-side component pressure, and the piston will need to perform additional work to push the air back out of the chamber into the high-side component. Thus, this valve transition entails a tradeoff between backflow and pressure-spike, both of which impact the pressure profile and the work that needs to be performed by the piston upon the air.

The valve transition closing the high-side valve at the end of the direct fill impacts system capacity. If the high-side valve is closed too early, then less air is pushed into the high-side component than could have been, and the pressure will momentarily spike before dropping. If the high-side valve is closed too late, then some of the air pushed into the high-side component will be pulled back out again as the piston moves away from top dead center (TDC; the condition where the piston is at its uppermost point of motion), and as the high-side valve finishes closing the flow will be throttled so the energy of the air flowing back into the cylinder performs less work on the piston. Potential work lost to throttling is not, in general, recovered.

Finally, the transition at the end of the regeneration stroke that opens the low-side valve to start the intake stroke impacts the work done on the piston. If the low-side valve is opened too early, then the remaining air at higher pressure from the dead volume will no longer expand, doing work on the piston, but will expand (throttled) through the opening low-side valve. If the low-side valve opens too late, then the pressure in the chamber will drop below the low-side component pressure and the piston will have to do additional work to pull the piston down and pull air through the partially open low-side valve.

Similarly, in a normal expansion process, each low-pressure and high-pressure cylinder progresses through a series of four conditions or sub-processes, each of which has an associated a valve configuration. The four conditions are (1) vent (or exhaust, or auxiliary) stroke, (2) pre-compression stroke, (3) direct drive, and (4) expansion stroke. The numbering of the phases is arbitrary in the sense that when the phases are performed in a repeating cycle, no one phase is "first" other than by convention. It is assumed in this description that all high-side and low-side valves in system 900 activate instantaneously and ideally; the implications of non-ideal valve actuation will be described subsequently. The four phases are described in detail below.

An expansion cycle begins at the bottom of stroke with the piston beginning to move upward from BDC and the low-side valve open, commencing a vent stroke. As the piston moves upward away from BDC, air in the chamber (e.g., air that was expanded in a previous cycle) is exhausted through the low-side valve to the low-side component (e.g., exhausted from an HPC to the MPV 906 or from an LPC to the ambient intake/exhaust port). A vent stroke ends when the low-side valve is closed and a pre-compression stroke begins. In general, the piston continues to move upward without interruption as a vent stroke ends and a pre-compression stroke begins.

As the cylinder piston continues to move upward, before it reaches TDC the low-side valve is closed to begin the pre-compression stroke. In pre-compression, both the high-side valve and low-side valve are closed and the air volume trapped within the chamber is compressed. In controlling the events of pre-compression, a goal is to close off the low-side valve at such a time that the air trapped in the chamber is compressed as nearly as possible to the pressure of the cylinder's adjoining high-side component when the piston reaches TDC. This allows the high-side valve to open at top of stroke with equal pressures on either side, resulting in approximately zero throttled flow through that valve and approximately zero loss of exergy due to non-work-performing loss of pressure of a quantity of gas. Timing of the start of pre-compression (closure of the low-side valve) greatly impacts the achievement of the equal-pressure goal.

Once the piston is at TDC and the high-side valve is opened, the direct-drive stroke begins. In direct drive, the piston is moving down, away from TDC, and air in the high-side component is expanding and flowing through the high-side valve into the chamber, directly driving the piston downward. The direct drive stroke continues until an appropriate mass of air has been added to the cylinder, at which point the high-side valve closes and the expansion stroke begins. In general, the piston continues to move downward without interruption as a direct-drive stroke ends and an expansion stroke begins.

In an expansion stroke, both valves are closed, and the air that was admitted to the chamber during the direct-drive phase expands, continuing to perform work upon the piston as it drives it downward. If a correct mass of air was added to the cylinder during direct drive, then the air pressure at the end of the expansion stroke will be approximately equal to the end-of-stroke target pressure at the moment when the piston reaches BDC. For a high-pressure cylinder, the end-of-stroke target pressure is the pressure in the MPV; for a low-pressure cylinder, the end-of-stroke target pressure is the vent pressure, which is typically slightly higher than atmospheric pressure. Once the piston reaches BDC, the low-side valve is opened and the cylinder begins to move up in the next vent stroke.

Valve actuation timings during a compression or expansion cycle may have a significant impact on the efficiency of the cycle. Such impact tends, in some embodiments, to be greater during an expansion cycle than during a compression cycle. During an expansion cycle, the first valve transition, as described hereinabove, is the closing of the low-side valve to begin the pre-compression. Incorrect or suboptimal timing of this valve transition may have significant consequences for the cycle. First, this valve transition is associated with the need for rapid high-side valve transition (short actuation time): as the valve is closing, the pressure in the chamber is rising quickly, resulting in throttled flow through the valve during the transition. Thus, the slower the transition, the greater the flow losses. Second, if the valve is closed later than is ideal, there will be less air in the cylinder to compress and less stroke length during which to compress it, resulting in a pressure at TDC less than the pressure in the high-side vessel. If this difference is large enough, then the pressure will be below the minimum coupling pressure and the high-side valve will be physically unable to open (i.e., the actuator will not be able to provide enough force to open the valve against the pressure difference) and the cylinder will not be able to complete the expansion cycle. If the pressure at TDC is above the minimum coupling pressure but below the pressure within the high-side component, then the high-side valve will be able to open, but gas will flow into the cylinder during the opening event without performing useful work on the piston. Contrariwise, if the low-side valve closing at the start of the pre-compression occurs too early, then the pressure within the chamber will reach the pressure within the high-side component before the piston reaches TDC, and surpass the pressure within the high-side component by the time the piston reaches TDC. In this case, more air would have been re-compressed than necessary (and less air would have been exhausted), resulting in a capacity reduction. If the pressure in the chamber reaches the high-side vessel before TDC, then the high-side valve should open when the pressures are equal rather than waiting to TDC, in order to prevent over-pressurization of the cylinder.

Once the high-side valve is open at TDC and the cylinder is in direct drive, with the piston moving down, the next transition is the closing of the high-side valve at the end of direct drive. This transition may impact both capacity and efficiency. Under perfect valve timing (i.e., closure of the high-side valve occurs at a time such that the exactly correct mass of air is drawn into the cylinder), the pressure will decrease during expansion phase and be equal to the target pressure approximately at BDC. If the valve is closed too early, the chamber will reach target pressure before BDC and will have expanded less air during the stroke than it could have (i.e., there will be a loss of capacity). If the high-side valve is closed too late, then the chamber pressure will still be above target at BDC, and the pressure difference will entail a loss once the valve is opened.

The last valve transition is at the end of the expansion stroke, when the low-side valve is opened. Ideally, the pressure at the end of the expansion stroke is equal to the target pressure exactly at BDC. If the chamber pressure drops to the target pressure before BDC, then the valve is opened to prevent the crankshaft from having to work to pull the piston down. If the piston reaches BDC before the pressure has decreased to the target, then the valve should also open. (An exception may occur if the chamber pressure is above the maximum allowable vent pressure.) This valve opening event is also impacted by the finite valve response time, in a manner similar to that described hereinabove for other valve actuation events.

It will be evident to persons familiar with pneumatics and hydraulic devices that similar considerations apply to the timing and non-ideality of valve actuation events during a compression mode of system 900. For example, at the transition between a compression stroke and a direct-fill stroke, as described hereinabove, the high-side valve of a cylinder opens. If the high-side valve is opened too late, the pressure within the chamber will exceed that within the high-side component (e.g., high-pressure storage vessel), and gas will expand from the chamber into the high-side component in a non-work-performing manner upon valve actuation. If the high-side valve is opened too soon, the pressure within the chamber will be less than that within the high-side component, and gas will expand from the high-side component into the chamber in a non-work-performing manner upon valve actuation. Valve actuation timing is similarly constrained at other transitions between the other phases of cylinder operation during a compression process.

Figure 10:
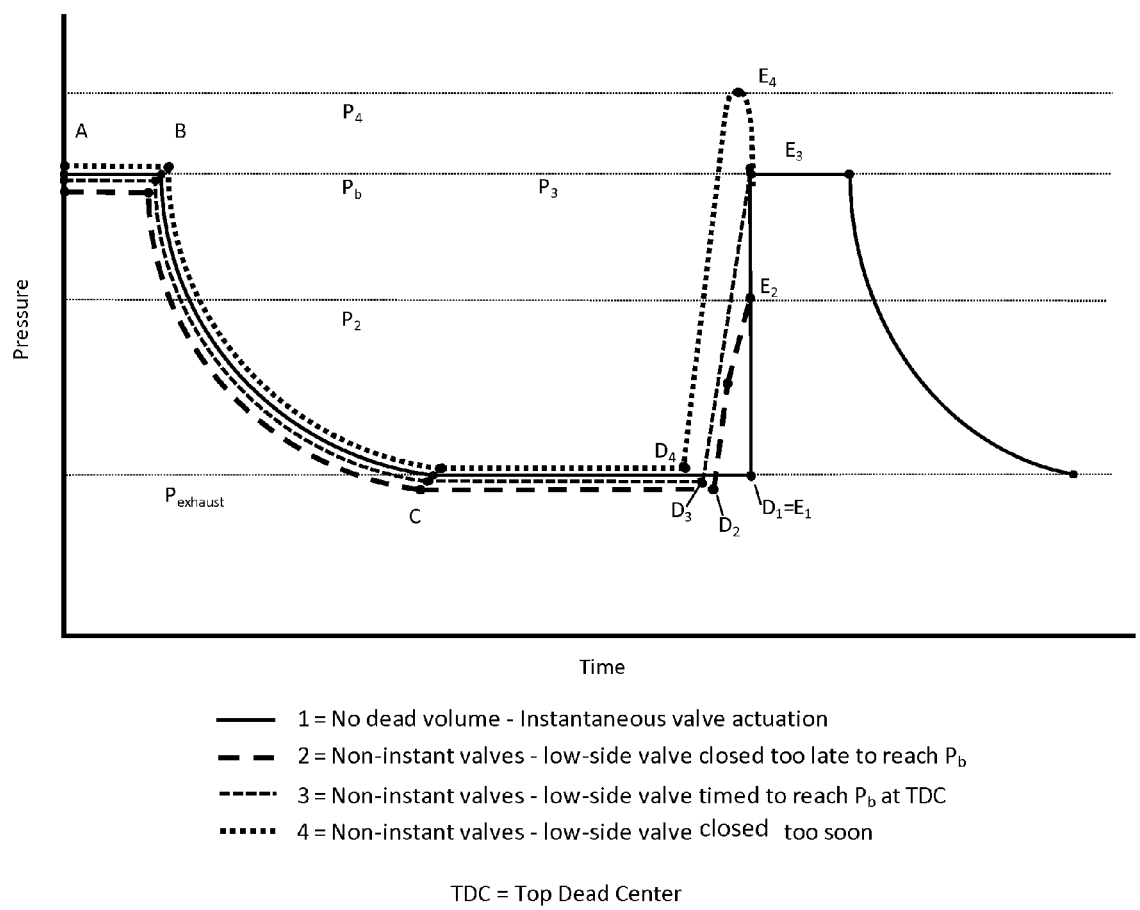
FIG. 10 is an illustrative plot of pressure as a function of time for four different expansion scenarios in accordance with various embodiments of the invention.

FIG. 10 is an illustrative plot of cylinder pressure as a function of time for four different expansion scenarios in an illustrative CAES system similar or even identical to the system 200 shown in FIG. 2. Points A, B, C, D, and E in FIG. 10, marked by dots, correspond to operating states of one or more components of system 200, or to changes in such operating states, as described below. In the illustrative plot shown, Point A represents an initial state of the pneumatic cylinder assembly (201 in FIG. 2) during which the piston slidably disposed therein (202 in FIG. 2) is at top dead center and the high-side valve (220 in FIG. 2) between the storage reservoir (222 in FIG. 2) and the lower-pressure cylinder assembly 201 is opened. Point B represents the end of a direct-drive phase of operation during which the high-side valve 220 between the storage reservoir 222 and the lower-pressure cylinder assembly 201 is closed and the pressure inside the cylinder assembly 201 is approximately equal to the bottle pressure $P_b$ (i.e., the pressure of gas inside storage reservoir 222 in FIG. 2 (e.g., 300 psi)). Point C represents the end of an expansion stage or phase, during which the quantity of gas admitted into the cylinder assembly 201 performs work on the piston 202 slidably disposed therein, from top dead center at a bottle pressure $P_b$ to bottom dead center at an exhaust pressure $P_{exhaust}$. Point C also represents the opening actuation of the low-side valve (221 in FIG. 2) between the vent to atmosphere (223 in FIG. 2) and the cylinder assembly 201 when the piston 202 is at bottom dead center. Points A, B, and C represent approximately the same operating states in all four scenarios of operation of system 200 described hereinbelow.

Four versions of Point D (labeled $D_1$, $D_2$, $D_3$, and $D_4$ to correspond to the four different valve-actuation scenarios) represent the end of the exhaust stage and beginning of a pre-compression stage; event D thus corresponds to the closing actuation of the low-side valve 221 between the vent 223 (or a lower-pressure stage) and the cylinder assembly 201. Four versions of event E ($E_1$, $E_2$, $E_3$, and $E_4$ for the four different valve-actuation scenarios) represent the end of the pre-compression stage, at which time the piston 202 is again at top dead center and the pressure inside the cylinder assembly 201 is approximately equal to the bottle pressure $P_b$. If the system is operated cyclically, Point E (any version) immediately precedes Point A and the expansion cycle may be repeated. The pressure inside the cylinder assembly 201 at the end of the pre-compression stroke (i.e., at any version of Point E) is determined by the relative timing of the closing of the low-side valve 221 (i.e., at any version of Point D).

In an idealized expansion scenario (Scenario 1, represented by a solid line in FIG. 10), there is no dead volume in the cylinder assembly 201 and all valve actuations occur instantaneously. The low-side valve 221 closes at Point $D_1$ when the piston 202 is at top dead center, instantaneously followed by the opening of the high-side valve 220 at Point $E_1$. In Scenario 1, pressurization of the cylinder assembly 201 occurs immediately and with no coupling loss, as there is no volume to pressurize at the top of stroke: this instantaneous pressurization of cylinder assembly 201, simultaneous with $D_1$ and $E_1$, is represented by the perfect verticality of the Scenario 1 line in FIG. 10 at Point $D_1/E_1$. Scenario 1 is shown as a reference line in FIG. 10.

In a second scenario (Scenario 2, represented by a bold dashed line in FIG. 10), dead volume exists in the cylinder assembly 201. Between Point C and Point $D_1$, the piston 202 performs a return stroke within the cylinder assembly 201, with the low-side valve 221 open to allow venting of gas from the upper chamber of cylinder assembly 201. At Point $D_1$, the low-side valve 221 is closed so that the gas remaining in the upper chamber of cylinder assembly 201 will be pressurized during the remainder of the return stroke. However, in Scenario 2 the low-side valve 221 is closed too late, trapping an insufficient amount of gas in the upper chamber of cylinder assembly 201, so when the piston 202 reaches top dead center the gas inside the upper chamber of cylinder assembly 201 is at a pressure $P_2$ that is lower than the storage bottle pressure $P_b$. In other words, operational Point $D_2$ occurs too late in time (or piston position) to allow adequate pre-compression by Point $E_2$ of the gas remaining in the cylinder assembly 201. Adequate pre-compression would be to approximately reservoir pressure $P_b$. When the high-side valve is opened at Point $E_2$, a coupling loss occurs when pressurized gas at reservoir pressure $P_b$ is admitted from the storage reservoir 222 (or, in some other embodiments, the previous cylinder stage) to the lower-pressure cylinder assembly 201.

In a third scenario (Scenario 3, represented by a short-dash line in FIG. 10), point $D_3$, i.e., closure of the valve 221 between the vent 223 and the cylinder assembly 201, is timed correctly to enable the gas in the upper chamber of cylinder assembly 201 to reach a pressure $P_3$ when the piston 202 is at top dead center (point $E_3$), where $P_3$ substantially equal to the stored bottle pressure $P_b$. In other words, operational Point $D_3$ is at the correct time (or piston position) so that pre-compression of the gas remaining in the cylinder assembly 201 is to a pressure $P_3$ approximately equal to the reservoir pressure $P_b$ at Point $E_3$. When the pressure $P_3$ inside the upper chamber of the cylinder assembly 202 is approximately equal to the pressure $P_b$ of gas from the storage reservoir 222 (or previous cylinder stage), then there will be little or no coupling loss when valve 220 is opened, and overall system efficiency and performance will be improved.

In a fourth scenario (Scenario 4, represented by a bold dotted line in FIG. 10), the valve 221 between the vent 223 and the cylinder assembly 201 is closed (point $D_4$) too soon and the pressure inside the upper chamber of cylinder assembly 201 reaches a pressure $P_4$ higher than the stored bottle pressure $P_b$ when the piston 202 reaches top dead center (Point $E_4$). In other words, operational Point $D_4$ is too early in time (or piston position) and the pre-compression of the remaining air in the upper chamber of the cylinder assembly 201 exceeds reservoir pressure $P_b$ at Point $E_4$. When the valve 220 between the storage vessel 222 (or earlier cylinder stage) and the cylinder assembly 201 is opened (Point $E_4$), the difference in pressure between results in a coupling loss.

The system controller (226 in FIG. 2) may be programmed in such a manner as to receive feedback (e.g., information from measurements) from previous expansion cycles and the present state of system 200. Such feedback, whether informational or mechanical, may be used to adjust the timing of Point D, the closing of the low-side valve 221 to commence pre-compression. For example, a lookup table may be employed to set valve actuation times in response to measurements of conditions in the system. In one embodiment, the controller 226 utilizes timing information from previous expansion strokes and pressure measurements of the cylinder 201 and reservoir 222 at the completion of the pre-compression process (Point E) to set the next time of closure of valve 221. Such feedback may provide optimal performance of the expander/compressor, improving efficiency, performance, and system component lifetime. The time of opening of valve 220 and other events in the expansion cycle may also be adjusted by the system controller 226 based on feedback.

Thus, in accordance with embodiments of the invention, efficiency is maximized during a gas compression or expansion by a combination of feedforward and feedback control of the valve timing where either early or late actuation of the valves would reduce overall efficiency of the compression or expansion process. This efficiency of the valve timing may be calculated mathematically by comparing the work required with ideal valve timing to the actual measured work with the experimental or sub-optimal valve timing. Other factors that are measurable or may be calculated via measurable values and impact efficiency are the rate of pressure decrease of the storage system during the expansion process, the rate of mass storage during the compression process, and the degree of under- or over-pressurization during either process. For both the compression and expansion processes, there is typically a known ideal pressure profile that may be approached by optimizing valve timing. The ideal pressure profile may be approached by determining valve timing that minimizes or maximizes the integrated work about key points in the pressure-volume curve. Deriving and subjecting the system to such timing values constitutes the feedforward component of the valve timing controller. Correcting for modeling uncertainties, system disturbances, quickly occurring system changes, or longer-term system drift is performed by incorporating representative measurements in the valve timing controller, and this constitutes the feedback component of the valve timing controller. Each valve transition event may be optimized for efficiency as described herein. For example, in opening a high-side valve at the end of a compression stroke to begin direct fill, an early actuation would cause gas to travel backwards from the high-side reservoir into the cylinder, reducing efficiency of the compression process, and late actuation would result in a pressure spike, increasing work required to complete the compression and causing a loss of useful energy when the valve opens and the air in the cylinder pressure equalizes with storage. Thus, in short, as utilized herein, "maximizing efficiency" of a compression or expansion process entails valve-timing optimization to minimize or eliminate lost work during an expansion of a particular amount of gas or minimizing or eliminating additional work required to compress a particular amount of gas.

Figure 11:
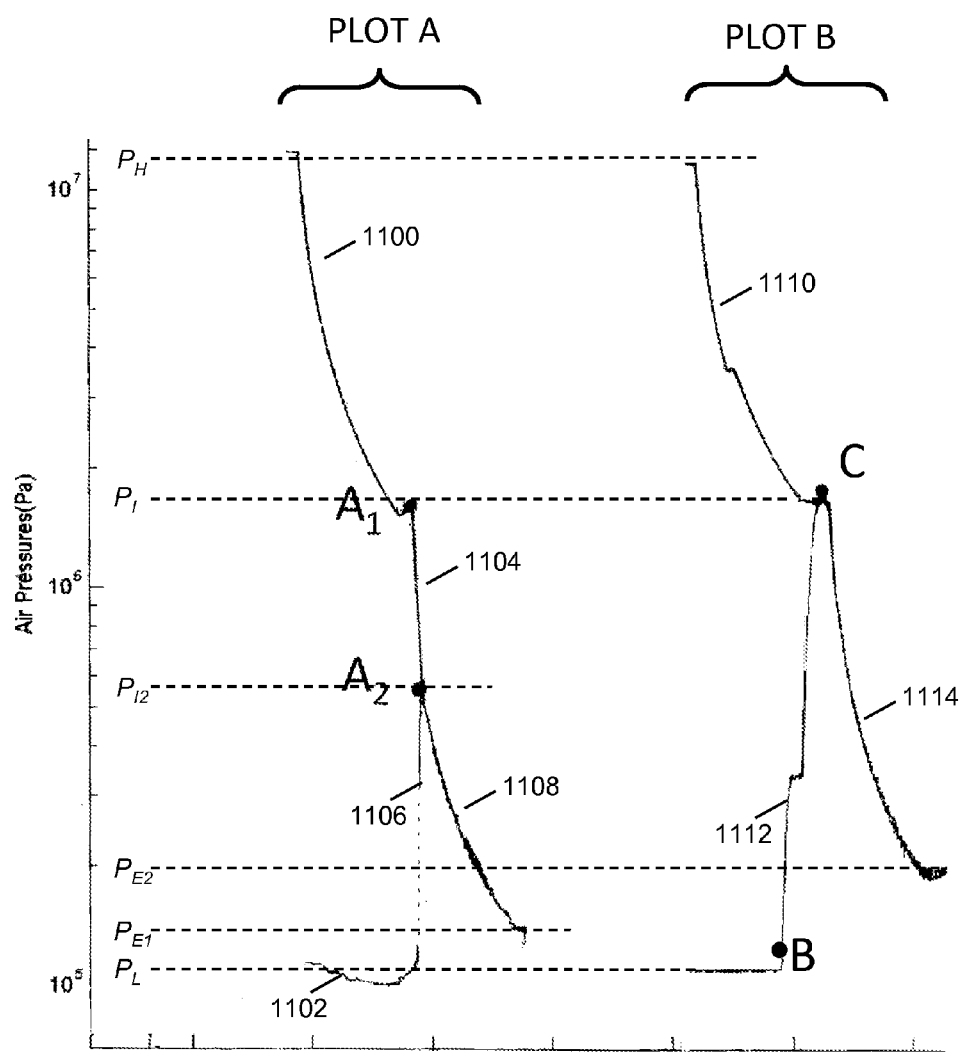
FIG. 11 is a graphical display of experimental test data in accordance with various embodiments of the invention.

FIG. 11 is a graphical display of experimental test data from an expansion process involving expansion of gas first in a high-pressure pneumatic cylinder and then in a low-pressure pneumatic cylinder. That is, in the physical system from which the data in FIG. 11 were drawn, a first, high-pressure cylinder expanded gas from a high pressure $P_H$ to an intermediate pressure $P_I$ while a second, low-pressure cylinder either (a) did not pre-compress the gas in its expansion chamber from a preexisting default pressure $P_L$ (PLOT A in FIG. 11) or (b) pre-compressed the gas in its expansion chamber from the preexisting default pressure $P_L$ to the intermediate pressure $P_I$ (PLOT B in FIG. 12).

In PLOT A, the pressure in the expansion chamber of the first, high-pressure cylinder as a function of time during expansion of the chamber's contents from $P_H$ to $P_I$ is indicated by curves 1100 and 1104, and the pressure in the expansion chamber of the second, low-pressure cylinder as a function of time is indicated by curves 1102, 1106, and 1108. Expansion of the gas in the high-pressure cylinder is indicated by curve 1100. The approximately constant pressure of the gas in the low-pressure cylinder, being exhausted by a return stroke concurrently with the expansion recorded by curve 1100, is indicated by curve 1102.

At the moment corresponding to labeled point $A_1$, a valve is opened to place the expansion chamber of the first, high-pressure cylinder in fluid communication with the expansion chamber of the second, low-pressure cylinder. Because the two chambers are at different pressures at that time (i.e., the gas in the high-pressure cylinder chamber is at $P_1$ and the gas in the low-pressure cylinder chamber is at $P_L$), after point $A_1$ (valve opening) the pressure within the chamber of the high-pressure cylinder decreases rapidly to an intermediate pressure $P_{I2}$ (curve 1104) while the pressure within the chamber of the low-pressure cylinder increases rapidly to the intermediate pressure $P_{I2}$ (curve 1106). By point $A_2$, shortly after $A_1$, the pressures in the two cylinder chambers have equilibrated. The rapid expansion indicated by curve 1104 performs no work on any mechanical component of the system and therefore entails a loss of available energy (i.e., a dead-volume loss). At point $A_2$, an expansion occurs in the expansion chamber of the low-pressure cylinder, from $P_{I2}$ to some low end pressure $P_{E1}$ (curve 1108).

In PLOT B, the pressure in the expansion chamber of the first, high-pressure cylinder as a function of time during expansion of the chamber's contents from $P_H$ to $I_2$ is indicated by curve 1110, and the pressure in the expansion chamber of the second, low-pressure cylinder as a function of time during pre-compression of the gas in the low-pressure cylinder chamber from $P_L$ to approximately $P_I$ is indicated by curve 1112. Prior to labeled point B, the low-pressure cylinder is performing an exhaust stroke, and gas is being expelled from the expansion chamber of the low-pressure chamber at approximately constant pressure $P_L$ through an open exhaust valve. At the moment corresponding to point B, the valve permitting gas to exit the expansion chamber of the low-pressure cylinder is closed, trapping a fixed quantity of gas within the chamber at pressure $P_L$. This quantity of gas is then compressed to pressure $P_1$ as indicated by curve 1112.

At point C, the pressure in the expansion chamber of the low-pressure cylinder is approximately equal to the pressure $P_I$ in the expansion chamber of the high-pressure cylinder and a valve is opened to place the two chambers in fluid communication with each other. Because the two chambers are at approximately equal pressures, there is no significant equilibration upon valve opening (i.e., there is no curve in PLOT B corresponding to the expansion of gas in the high-pressure cylinder indicated by curve 1104 in PLOT A) and thus little or no energy loss due to equilibration. Subsequent to point C, an expansion occurs in the expansion chamber of the low-pressure cylinder, from $P_I$ to some low end pressure $P_{E2}$ (curve 1114). In FIG. 11, end pressure $P_{E2}$ is not equal to end pressure $P_{E1}$, but this is not a necessary result of the pre-compression process illustrated in FIG. 11 and end pressure $P_{E2}$ may have any of a range of values in accordance with embodiments of the present invention.

Figure 12:
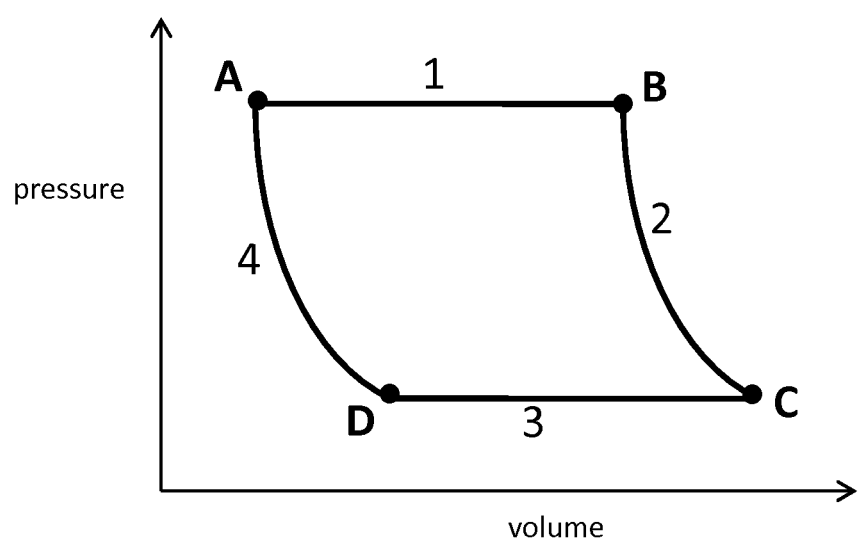
FIG. 12 is an illustrative plot of the ideal pressure-volume cycle in a cylinder operated as either a compressor or expander.

FIG. 12 is an illustrative plot of the ideal pressure-volume cycle in a cylinder operated as either a compressor or expander. FIG. 12 provides explanatory context for subsequent figures. Instantaneous and perfectly timed valve actuations are presumed for the system whose behavior is represented in FIG. 12. The horizontal axis represents volume (increasing rightward) and the vertical axis represents pressure (increasing upward). In FIG. 12, the volume represented by the horizontal axis is the volume of the expansion/compression chamber of a cylinder assembly that is similar or identical to cylinder 201 in FIG. 2 and is being operated as either an expander or compressor. The four curves in FIG. 12 (labeled 1, 2, 3, and 4) form a cyclic loop; each curve represents one of the four distinct phases of operation described above for both compression and expansion. For a cylinder operating as a compressor, Curves 1 through 4 are traversed counterclockwise (e.g., in order 1, 4, 3, 2), where Curve 1 represents the direct-fill phase; Curve 2 represents the compression stroke; Curve 3 represents the intake stroke; and Curve 4 represents the regeneration stroke. For a cylinder operating as an expander, Curves 1 through 4 are traversed clockwise (e.g., in order 1, 2, 3, 4). Curve 1 represents the direct-fill phase; Curve 2 represents the expansion stroke; Curve 3 represents the exhaust stroke; and Curve 4 represents the precompression stroke. Points A, B, C, and D in FIG. 12 represent valve transition events. As each Event (A, B, C, or D) is traversed during cyclic operation of the cylinder, the valve actuations that occur at each point depend on whether the cylinder is being operated as an expander or compressor. Specifically, if the cylinder is being operated as a compressor, at Event A a high-side valve V1 (220 in FIG. 2) is closed and a low-side valve V2 (221 in FIG. 2) remains closed; at Event D, V1 remains closed and V2 is opened; at Event C, V1 remains closed and V2 is opened; and at Event B, V1 is opened while V2 remains closed. If the cylinder is being operated as an expander, at Event A, V1 is opened and V2 remains closed; at Event B, V1 is closed and V2 remains closed; at Event C, V1 remains closed and V2 is opened; at Event D, V1 remains closed and V2 is closed.

As will be made clear by subsequent figures, the effects of finite (non-ideal, nonzero) actuation times for valves V1 and V2 at all valve transitions in FIG. 12 tend to decrease system capacity and/or efficiency and to alter the shapes of Curves 1, 2, 3, and 4. Also, mistiming of valve transitions in FIG. 12 may decrease system capacity and/or efficiency. An optimal actuation timing exists for each valve actuation event under any given conditions of operation; this optimal time will, in general, change as the conditions under which the system is being operated change (e.g., as the pressure in a high-pressure gas storage reservoir gradually increases or decreases).

Figure 13:
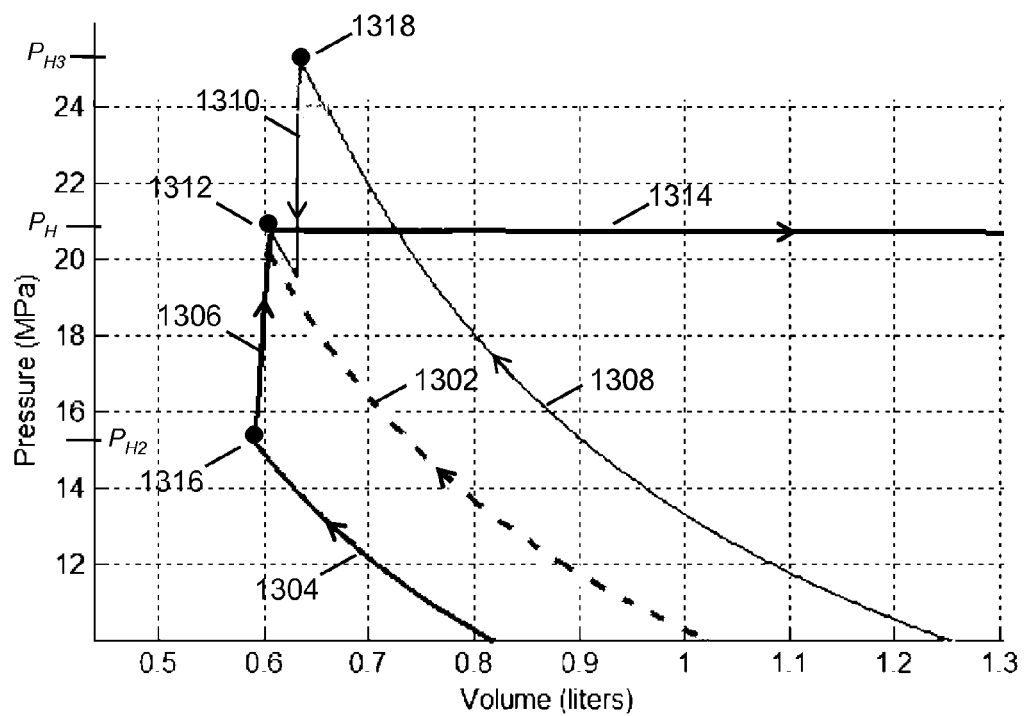
FIG. 13 is an illustrative plot of cylinder chamber pressure as a function of cylinder chamber volume for three different expansion scenarios in an illustrative CAES system in accordance with various embodiments of the invention.

FIG. 13 is an illustrative plot of cylinder chamber pressure as a function of cylinder chamber volume for three different expansion scenarios in an illustrative CAES system similar or even identical to the system 200 shown in FIG. 2. FIG. 13 shows the effects of early, correctly timed, and tardy closure of valve V2 in the transition (Event D in FIG. 12; not shown in FIG. 13) from intake phase to pre-compression phase (i.e., from Curve 3 to Curve 4 in FIG. 12). The three scenarios depicted in a pressure-volume plot in FIG. 13 greatly resemble the scenarios depicted in a pressure-time plot in FIG. 10, as shall be explained below.

The region of the expander's pressure-volume cycle portrayed in FIG. 13 corresponds to Point A in FIG. 12 as defined for an expansion process. (In a non-ideal system, events occurring during a valve transition event do not occur without changes of pressure and volume, and so cannot be represented by a single point in a pressure-volume plot. The instant that an actuated valve is commanded to transition is one representation of the start of a valve transition.) The dashed curve 1302 represents the pressure-volume history of the gas within the cylinder chamber during the latter part of the pre-compression phase (Curve 4 in FIG. 12) for a scenario (the Correct V2(D) Closure scenario) in which closure of V2 (the low-pressure valve, 221 in FIG. 2) in the transition from vent phase to pre-compression phase occurs at an optimal time. The Correct V2(D) Closure scenario corresponds to the curve passing through points $D_2$ and $E_2$ in FIG. 10.

The thick solid curves 1304, 1306 represent the pressure-volume history of the gas during the latter part of the pre-compression phase for a scenario (the Late V2(D) Closure scenario) in which closure of V2 in the transition from vent phase to pre-compression phase is tardy. The Late V2(D) Closure scenario corresponds to the curve passing through points $D_3$ and $E_3$ in FIG. 10. The thin solid curves 1308, 1310 represent the pressure-volume history of the gas during the latter part of the pre-compression phase for a scenario (the Early V2(D) Closure scenario) in which closure of V2 in the transition from vent phase to pre-compression phase occurs too early. The Early V2(D) Closure scenario corresponds to the curve passing through points $D_4$ and $E_4$ in FIG. 10.

All curves in FIGS. 13-16 are traversed, in time, in the sense shown by the arrowheads attached to each curve.

In the systems whose behavior is partly represented by FIGS. 13-16, the gas volume of the high-side component (e.g., high-pressure storage reservoir 222 in FIG. 2) that is connected to the cylinder through V1 is presumed to be sufficiently large that exchanges of air between the high-side component and the cylinder chamber do not substantially change the pressure $P_H$ of the gas within the high-side component.

In the Correct V2(D) Closure Scenario, closure of V2 traps the correct amount of air in the cylinder chamber to produce at TDC a chamber pressure approximately equal to that the pressure $P_H$ within the high-side component. In FIG. 13, $P_H$ is approximately 21.5 megapascals (MPa). At point 1312, when the gas in the chamber approximates pressure $P_H$, V1 is opened; since both the gas in the high-side component and the gas in the chamber are at or near to $P_H$, the pressure of the gas in the chamber does not change significantly. Subsequently, gas is transferred during direct-drive phase at approximately constant $P_H$ from the high-side component to the chamber as the piston descends in the cylinder (solid curve 1314). The effects of dead volume during the transition from pre-compression phase to direct-drive phase are minimized or even nonexistent in the Correct V2(D) Closure Scenario.

In the Late V2(D) Closure Scenario, closure of V2 traps insufficient air in the chamber to produce at TDC a chamber pressure approximately equal to $P_H$. Instead, the gas in the chamber achieves some lower pressure $P_{H2}$; in FIG. 13, $P_{H2}$ is approximately 15 MPa. At point 1316, V1 opens; since the gas in the high-side component is at a higher pressure ($P_H$) than the gas in the chamber ($P_{H2}$), gas from the high-side component rapidly enters the chamber, raising the pressure of the gas in the chamber while the volume of the chamber does not change significantly. This pressure-volume change at near-constant volume is represented by curve 1306. Potentially useful pressure energy is lost during this non-work-performing expansion of gas from the high-pressure component into the chamber, i.e., a dead-volume loss occurs. At the end of curve 1306, the gas in the chamber reaches point 1312, after which the Late V2(D) Closure Scenario coincides with the Correct V2(D) Closure Scenario (curve 1314).

In the Early V2(D) Closure Scenario, closure of V2 traps more air in the chamber than is needed to produce at TDC a pressure approximately equal to $P_H$. Instead, the gas achieves some higher pressure $P_{H3}$; in FIG. 13, $P_{H3}$ is approximately 25 MPa. At point 1318, V1 opens; since the gas in the high-side component is at a lower pressure ($P_H$) than the gas in the chamber ($P_{H3}$), gas from chamber rapidly enters the high-side component, lowering the pressure of the gas in the chamber while its volume does not change significantly. This pressure-volume change at near-constant volume is represented by curve 1310. Potentially useful pressure energy is lost during this non-work-performing expansion of gas from the chamber into the high-pressure component, i.e., a dead-volume loss occurs. At the end of curve 1318, the gas in the chamber is at point 1312, after which the Early V2(D) Closure Scenario coincides with the Correct V2(D) Closure Scenario (curve 1314).

Figure 14A:
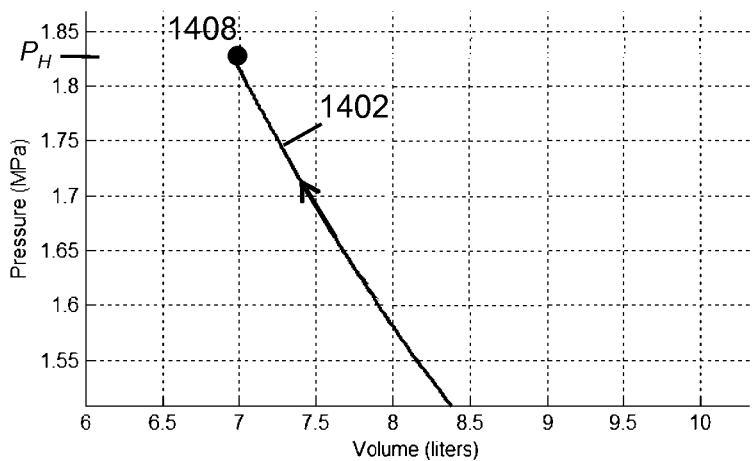
FIGS. 14A-14C are illustrative plots of cylinder chamber pressure as a function of cylinder chamber volume for different expansion scenarios in an illustrative CAES system in accordance with various embodiments of the invention.
Figure 14B:
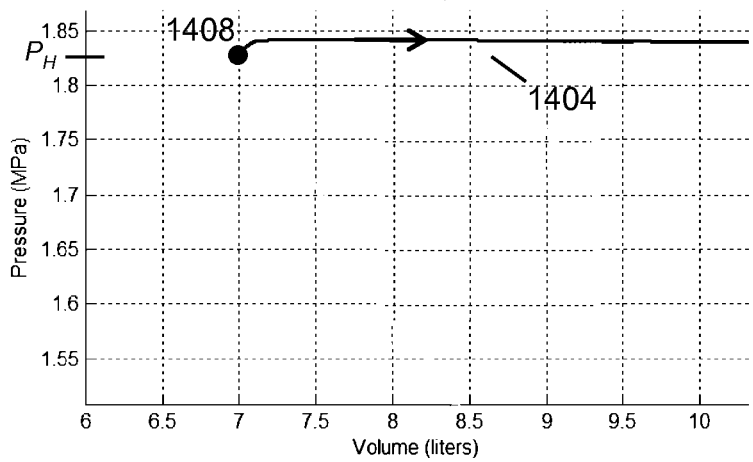
Figure 14C:
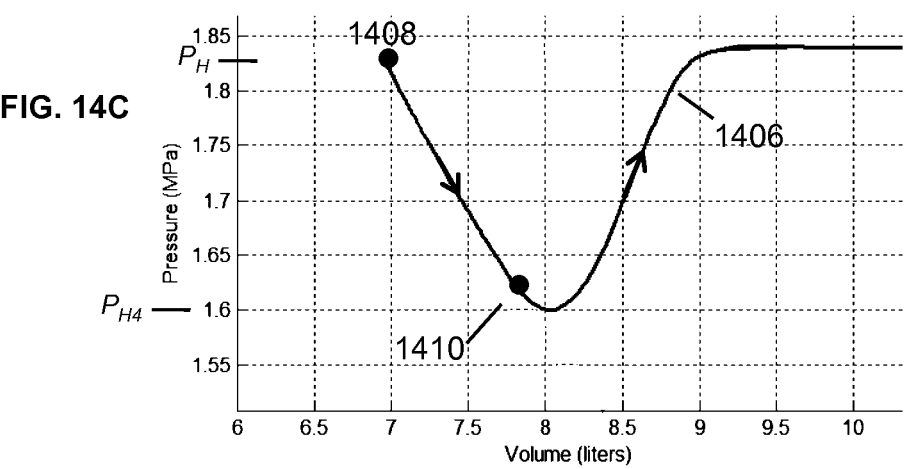

FIGS. 14A-14C are illustrative plots of cylinder chamber pressure as a function of cylinder chamber volume for two different expansion scenarios in an illustrative CAES system similar or even identical to the system 200 shown in FIG. 2. The two scenarios depicted in FIGS. 14A-14C are the Correct V1(A) Opening Scenario and the Late V1(A) Opening Scenario. The region of the expander's pressure-volume cycle portrayed in FIGS. 14A-14C corresponds to Point A in FIG. 12 as defined for an expansion process. Valves V1 and V2 are defined as for FIG. 13. FIGS. 14A-14C show the effects of correctly timed and tardy opening of valve V1 in the transition from pre-compression phase to direct-drive phase (i.e., from Curve 4 to Curve 1 in FIG. 12). It is presumed that in the scenarios depicted in FIGS. 14A-14C, the previous valve transition (Event D in FIG. 12) was optimally made. Three separate figures, FIGS. 14A-14C, depicting curves 1402, 1404, and 1406 respectively, are employed to avoid partial obscuration of curve 1402 by curve 1406.

Curve 1402 of FIG. 14A represents the volume-pressure history of both scenarios until point 1408 is reached. Thereafter, the two scenarios diverge. In the Correct V1(A) Opening Scenario, V1 is opened at point 1408, just as the cylinder reaches TDC. Because pre-compression was optimally performed, the pressure in the chamber approximates $P_H$ and there is little or no gas exchange between the chamber and the high-pressure component when V1 is opened, and subsequent to point 1408 gas is vented during a direct-drive phase at approximately constant $P_H$ from the high-side component to the chamber as the piston descends in the cylinder (curve 1404 in FIG. 14B). In FIGS. 14A-14C, $P_H$ is approximately 1.82 MPa. The effects of dead volume during the transition from pre-compression phase to direct-drive phase are minimal or nonexistent in the Correct V 1(A) Opening Scenario.

In the Late V1(A) Opening Scenario, V1 is not opened at point 1408, when the piston is at TDC, but remains closed for a time thereafter. As the piston descends, the pressure-volume state of the gas in the chamber thus begins to retrace curve 1402 in the opposite direction (left-hand portion of curve 1406, FIG. 14C): that is, the gas trapped in the chamber simply begins to re-expand. At point 1410 (FIG. 14C), at which the gas in the chamber has achieved some pressure $P_{H4}$ significantly lower than $P_H$, V1 is opened. Gas then enters the chamber from the high-side component, raising the pressure of the gas in the chamber to $P_H$ while the volume of the chamber is increasing (rising portion of curve 1406). Potential energy is lost and less work is done during this non-work-performing expansion of gas from the high-pressure component into the chamber, i.e., a dead-volume loss occurs.

Figure 15:
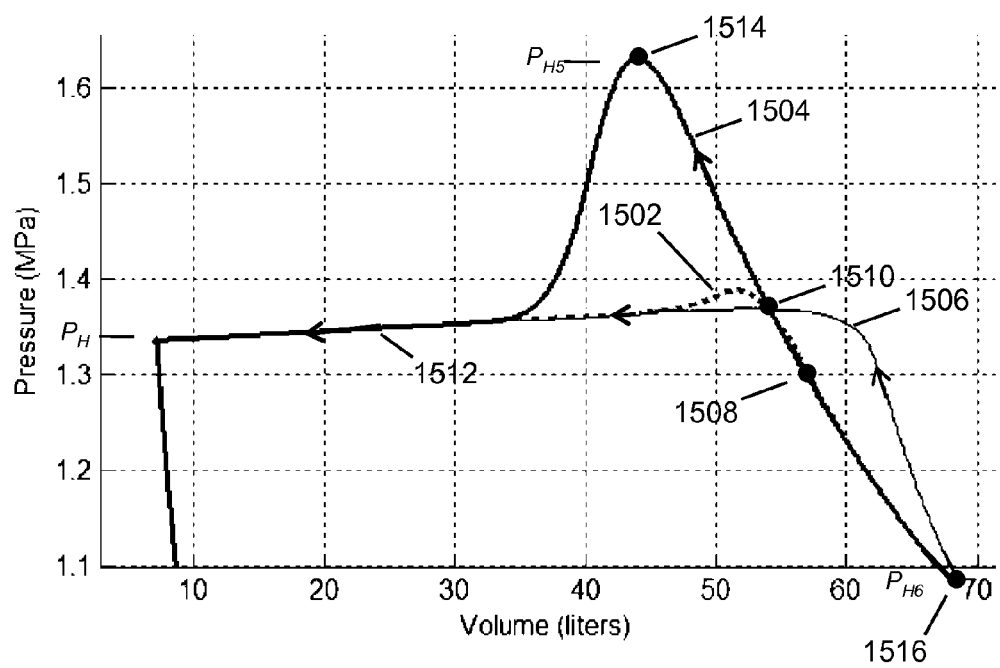
FIG. 15 is an illustrative plot of cylinder chamber pressure as a function of cylinder chamber volume for three different compression scenarios in an illustrative CAES system in accordance with various embodiments of the invention.

FIG. 15 is an illustrative plot of cylinder chamber pressure as a function of cylinder chamber volume for three different compression scenarios in an illustrative CAES system similar or even identical to the system 200 shown in FIG. 2. FIG. 15 shows the effects of early, correctly timed, and tardy opening of valve V1 in the transition (Event B in FIG. 12, defined for compression mode) from compression phase to direct-fill phase (i.e., from Curve 2 to Curve 1 in FIG. 12). The region of the expander's pressure-volume cycle portrayed in FIG. 15 corresponds to Point B in FIG. 12 as defined for a compression process.

The dotted curve 1502 (partly obscured by thick solid curve 1504) represents the pressure-volume history of the gas within the cylinder chamber during the latter part of the compression phase (Curve 2 in FIG. 12) for a scenario (the Correct V1(B) Opening scenario) in which opening of V1 in the transition from compression phase to direct-fill phase occurs at an optimal time. The thick solid curve 1504 represents the pressure-volume history of the gas in the chamber during the latter part of the compression phase for a scenario (the Late V 1(B) Opening scenario) in which opening of V1 in the transition from compression phase to direct-fill phase is tardy. The thin solid curve 1506 represents the pressure-volume history of the gas during the latter part of the compression phase for a scenario (the Early V 1(B) Opening scenario) in which opening of V1 in the transition from compression phase to direct-fill phase occurs too early.

In the system whose behavior is partially depicted in FIG. 15, V1 and V2 have nonzero actuation times. Therefore, the optimal time of opening of V1 (i.e., the timing of V1 opening for the Correct V 1(B) Opening scenario) occurs at point 1508, before the pressure in the chamber reaches $P_H$. At point 1508 the gas in the cylinder chamber has not yet achieved the pressure $P_H$ of the gas in the high-pressure component, but only a small amount of gas is throttled through the partly-open valve into the chamber as the pressure-volume state of the gas in the chamber evolves from point 1508 to point 1510, at which time the pressure in the chamber approximates $P_H$. A small amount of pressure overshoot may occur (represented by the small hump in curve 1502); subsequently, gas is exhausted during direct-fill phase at approximately constant $P_H$ from the cylinder chamber to the high-side component as the piston continues to ascend in the cylinder (curve 1512). The effects of dead volume during the transition from pre-compression phase to direct-drive phase are minimal or non-existent in the Correct V1(B) Opening Scenario.

In the Late V1(B) Opening scenario, V1 is opened at point 1514, by which time the gas in the chamber has reached a pressure $P_{H5}$, significantly higher than $P_H$. After the tardy opening of V1, gas in the chamber transfers into the high-pressure component as the pressure in the chamber decreases (left-hand side of large hump in curve 1514). Energy is lost during this non-work-performing expansion of gas from the chamber into the high-pressure component, i.e., a dead-volume loss occurs.

A similar curve would be traced even if the valve started to transition open at point 1510 when the pressures are equal, due to the nonzero time to open the valve and pressure rise that occurs with a partially open valve. Notably, in systems employing a pressure-driven check valve for V1 rather than an actuated valve, a pressure-volume history similar to that of the Late V 1(B) Opening scenario (curve 1504), although not necessarily so extreme, typically occurs in every compression cycle, as an overpressure (e.g., $P_{H5}$ or some other pressure significantly higher than $P_H$) must be achieved on the chamber side of V1 with respect to the high-pressure-component side of V1 in order for V1 to be actuated. The use of actuated valves rather than check valves in CAES systems is thus advantageous in this, as well as in other, respects.

In the Early V1(B) Opening scenario, V1 is opened at point 1516, by which time the gas in the chamber has reached a pressure of only $P_{H6}$, significantly lower than $P_H$. After the early opening of V1, gas in the high-pressure component flows into the chamber as the pressure in the chamber increases (right-hand side of curve 1506). Energy is lost during this non-work-performing expansion of gas from the high-pressure component into the chamber, i.e., a dead-volume loss occurs.

Figure 16:
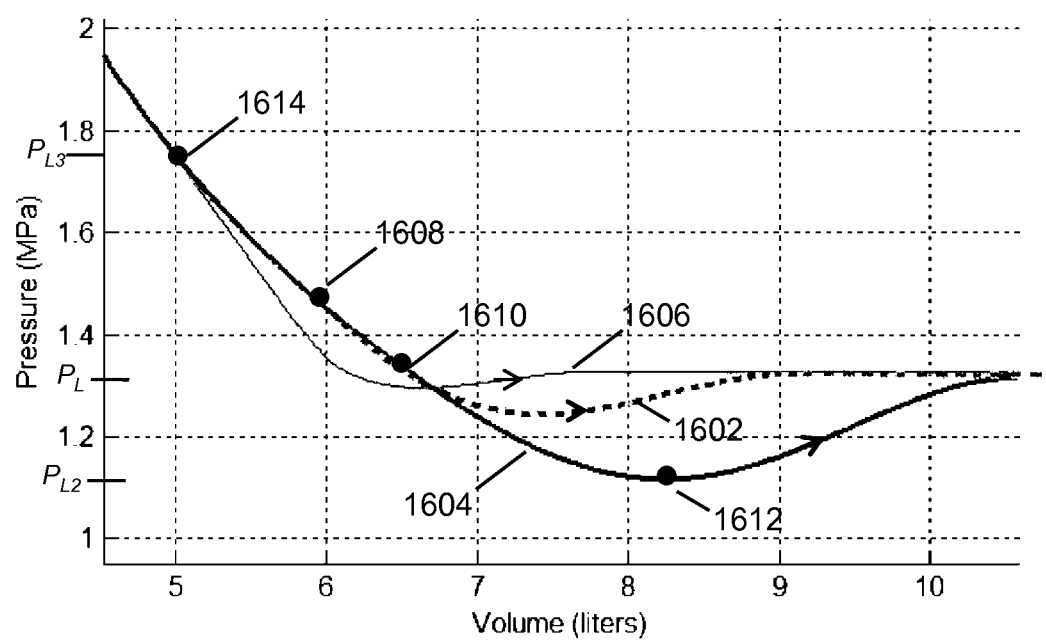
FIG. 16 is an illustrative plot of cylinder chamber pressure as a function of cylinder chamber volume for three different compression scenarios in an illustrative CAES system in accordance with various embodiments of the invention.

FIG. 16 is an illustrative plot of cylinder pressure as a function of cylinder volume for three different compression scenarios in an illustrative CAES system similar or even identical to the system 200 shown in FIG. 2. FIG. 16 shows the effects of early, correctly timed, and tardy opening of valve V2 in the transition (Event D in FIG. 12, defined for compression mode) from regeneration phase to intake phase (i.e., from Curve 4 to Curve 3 in FIG. 12). The region of the expander's pressure-volume cycle portrayed in FIG. 16 corresponds to Point D in FIG. 12 as defined for a compression process.

The dotted curve 1602 represents the pressure-volume history of the gas within the cylinder chamber during the latter part of the regeneration phase (Curve 4 in FIG. 12) for a scenario (the Correct V2(D) Opening scenario) in which opening of V2 in the transition from regeneration phase to intake phase occurs at an optimal time. The thick solid curve 1604 represents the pressure-volume history of the gas in the chamber during the latter part of the compression phase for a scenario (the Late V2(D) Opening scenario) in which opening of V2 in the transition from regeneration phase to intake phase is tardy. The thin solid curve 1606 represents the pressure-volume history of the gas during the latter part of the compression phase for a scenario (the Early V2(D) Opening scenario) in which opening of V2 in the transition from regeneration phase to intake phase occurs too early.

In the system whose behavior is partially depicted in FIGS. 16, V1 and V2 have nonzero actuation times. Therefore, the optimal time of opening of V2 (the timing of V2 opening for the Correct V2(D) Opening scenario) occurs at point 1608, before the pressure in the chamber approximates $P_L$ (the pressure of the low-pressure component that communicates with the cylinder through V2, e.g., vent 223 in FIG. 2). The gas in the cylinder chamber has not yet decreased to the pressure $P_L$ of the gas in the low-pressure component, but only a small amount of gas is throttled through the partly-open valve V2 into the chamber as the pressure-volume state of the gas in the chamber evolves from point 1608 to point 1610, at which time the pressure in the chamber approximates $P_L$. A small amount of pressure overshoot may occur (dip in curve 1602); subsequently, gas is admitted to the chamber during the intake phase at approximately constant $P_L$ from the low-side component to the chamber as the piston continues to descend in the cylinder. The effects of dead volume during the transition from regeneration phase to intake phase are minimal or non-existent in the Correct V2(D) Opening Scenario.

In the Late V2(D) Opening scenario, V2 is opened at point 1612, by which time the gas in the chamber has decreased to a pressure of $P_{L2}$, significantly lower than $P_L$. After the tardy opening of V2, gas from the low-pressure component flows into the chamber as the pressure in the chamber increases (right-hand side of large dip in curve 1604). Energy is lost during this non-work-performing expansion of gas into the chamber from the low-pressure component: i.e., a dead-volume loss occurs.

Notably, in systems employing a pressure-driven check valve for V2 rather than an actuated valve, a pressure-volume history similar to that of the Late V2(D) Opening scenario (curve 1604) typically occurs in every compression cycle, as an underpressure (e.g., $P_{L2}$ or some other pressure significantly lower than $P_L$) must be achieved on the chamber side of V2 with respect to the low-pressure-component side of V2 in order for V2 to be actuated. The use of actuated valves rather than check valves in CAES systems is thus advantageous in this, as well as in other, respects.

In the Early V2(D) Opening scenario, V2 is opened at point 1614, by which time the gas in the chamber has only declined to a pressure of $P_{L3}$, significantly higher than $P_L$. After the early opening of V2, gas in the chamber exits to the low-pressure component as the pressure in the chamber decreases (left-hand side of curve 1606). Energy is lost during this non-work-performing expansion of gas from chamber into the low-pressure component, i.e., a dead-volume loss occurs.

It will be clear to persons familiar with the sciences of hydraulics and pneumatics that considerations similar to those described above with reference to FIGS. 10 and 13-16 also pertain to optimal, early, and late valve actuation at valve transition events not explicitly depicted herein, for both compression and expansion modes of operation of a CAES system. Optimization by the means described of valve actuations at all valve transition events in a CAES system is contemplated and within the scope of the invention. In brief, wherever two or more volumes of gas are to be brought into fluid communication with each other in the course of operating a CAES system, optimally timed valve actuations will generally be those that occur at moments calculated to bring the volumes of gas into fluid communication with each other when their pressures are approximately equal.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Embodiments of the invention may, during operation, convert energy stored in the form of compressed gas and/or recovered from the expansion of compressed gas into gravitational potential energy, e.g., of a raised mass, as described in U.S. patent application Ser. No. 13/221,563, filed Aug. 30, 2011, the entire disclosure of which is incorporated herein by reference.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of increasing efficiency of an energy-recovery process performed in a first cylinder assembly and a second cylinder assembly in which gas is collectively expanded from an initial pressure to a final pressure, the method comprising:
    pre-compressing gas in the first cylinder assembly to approximately the initial pressure;
    following the pre-compression, admitting compressed gas at the initial pressure into the first cylinder assembly, the pre-compression reducing coupling loss during the admission of compressed gas, wherein the admission of compressed gas comprises (i) withdrawing compressed gas from a storage reservoir, (ii) withdrawing heat-transfer fluid from the storage reservoir, (iii) mixing the compressed gas and the heat-transfer fluid within a mixing chamber, separate from the storage reservoir, to form a foam at the initial pressure, and (iv) admitting the foam into the first cylinder assembly;
    substantially isothermally expanding the gas in the first cylinder assembly to a mid-pressure between the initial pressure and the final pressure by mingling, within the foam, substantially all of the gas with heat-transfer fluid in the first cylinder assembly, thereby maintaining substantially all of the gas at substantially the same temperature during expansion;
    completing a partial expansion cycle by exhausting (i) only a portion of the expanded gas and (ii) at least a portion of the heat-transfer fluid out of the first cylinder assembly into a mid-pressure vessel at the mid-pressure;
    mingling compressed gas and heat-transfer fluid within the mid-pressure vessel to form a mid-pressure foam at the mid-pressure;
    admitting mid-pressure foam into a second cylinder assembly;
    expanding the compressed gas of the mid-pressure foam within the second cylinder assembly to the final pressure;
    exhausting gas at the final pressure from the second cylinder assembly; and
    repeating the foregoing steps at least once, thereby performing at least one additional expansion cycle.

2. The method of claim 1, wherein the heat-transfer fluid is sprayed into the gas within the mixing chamber, the mixing chamber comprising a screen therewithin.

3. The method of claim 1, wherein the heat-transfer fluid forms a foam with the gas within the mixing chamber after the compressed gas and the heat-transfer fluid are each withdrawn from the storage reservoir from a different outlet and transferred to the mixing chamber.

4. The method of claim 1, wherein, after expansion of the gas within the second cylinder assembly, at least a portion of the heat-transfer fluid is exhausted out of the second cylinder assembly.

5. The method of claim 1, wherein expanded gas is exhausted to the ambient atmosphere from the second cylinder assembly.

6. The method of claim 1, wherein admitting compressed gas into the first cylinder assembly comprises actuating a valve to establish a connection between the first cylinder assembly and the mixing chamber, the pre-compression reducing an actuation energy required to actuate the valve.

7. The method of claim 1, wherein at least a portion of the gas that is pre-compressed is within dead volume of the first cylinder assembly.

8. The method of claim 7, wherein (i) the first cylinder assembly comprises an interior volume bounded by two opposing ends, (ii) substantially an entire length of the first cylinder assembly between the two opposing ends is swept by a solid piston during expansion therein, and (iii) the dead volume is disposed within a volume between the piston and an end of the first cylinder assembly when the piston is disposed at a limit of travel at the end of the first cylinder assembly.

9. The method of claim 1, wherein exhausting only a portion of the expanded gas out of the first cylinder assembly comprises exhausting substantially all of the expanded gas in the first cylinder assembly that is not within dead volume thereof.

10. The method of claim 9, wherein (i) the first cylinder assembly comprises an interior volume bounded by two opposing ends, (ii) substantially an entire length of the first cylinder assembly between the two opposing ends is swept by a solid piston during expansion therein, and (iii) the dead volume is disposed within a volume between the piston and an end of the first cylinder assembly when the piston is disposed at a limit of travel at the end of the first cylinder assembly.

11. The method of claim 1, wherein an amount of the gas that is pre-compressed is substantially less than an amount of the gas expanded in the first cylinder assembly.

12. The method of claim 1, further comprising monitoring at least one of a temperature, a pressure, or a position of a boundary mechanism within the first cylinder assembly during at least one of gas expansion or gas exhaustion, thereby generating control information.

13. The method of claim 12, further comprising utilizing the control information in a subsequent expansion cycle to control at least one of the pre-compression, expansion, or exhaustion steps.

14. The method of claim 1, wherein the gas expansion drives a load connected to at least one of the first cylinder assembly or the second cylinder assembly.

15. The method of claim 14, wherein the load is a mechanical crankshaft or a hydraulic pump/motor.

16. The method of claim 1, wherein the gas expansion generates electricity.

17. The method of claim 1, wherein exhausting only a portion of the expanded gas out of the first cylinder assembly comprises (i) monitoring at least one of a temperature, a pressure, or a position of a boundary mechanism within the first cylinder assembly, thereby generating control information, and (ii) based at least in part on the control information, discontinuing the gas exhaustion, thereby trapping a remnant portion of the expanded gas within the first cylinder assembly.

18. The method of claim 17, wherein the remnant portion of the expanded gas is determined such that a pre-compression step of a subsequent expansion cycle compresses the remnant portion to approximately the initial pressure.

* * * * *